United States Patent
Lou et al.

(10) Patent No.: US 7,173,935 B2
(45) Date of Patent: Feb. 6, 2007

(54) LAST LEG UTILITY GRID HIGH-SPEED DATA COMMUNICATION NETWORK HAVING VIRTUAL LOCAL AREA NETWORK FUNCTIONALITY

(75) Inventors: Heng Lou, Eagan, MN (US); Clifford A. Davidow, Reno, NV (US)

(73) Assignee: Current Grid, LLC, Germantown, MD (US)

( * ) Notice: Subject to any disclaimer, the term of this patent is extended or adjusted under 35 U.S.C. 154(b) by 1054 days.

(21) Appl. No.: 10/165,451

(22) Filed: Jun. 7, 2002

(65) Prior Publication Data
US 2003/0227373 A1    Dec. 11, 2003

(51) Int. Cl.
*H04L 12/28* (2006.01)

(52) U.S. Cl. .................. 370/395.5; 370/401; 370/419; 370/466; 340/310.11

(58) Field of Classification Search .................. None
See application file for complete search history.

(56) References Cited

U.S. PATENT DOCUMENTS

| | | |
|---|---|---|
| 3,702,460 A | 11/1972 | Blose |
| 3,810,096 A | 5/1974 | Kabat et al. |
| 3,846,638 A | 11/1974 | Wetherell |
| 4,012,733 A | 3/1977 | Whyte |
| 4,016,429 A | 4/1977 | Vercellotti et al. |
| 4,060,735 A | 11/1977 | Pascucci et al. |
| 4,475,209 A | 10/1984 | Udren |
| 4,569,045 A | 2/1986 | Schieble et al. |
| 4,638,298 A | 1/1987 | Spiro |

(Continued)

FOREIGN PATENT DOCUMENTS

EP    0 822 721 A2    2/1998

(Continued)

OTHER PUBLICATIONS

IEEE Std 802.1Q, "IEEE Standards for Local and Metrpolitan Area Networks: Virtual Bridged LANs", 1998, pp. 1-4.*

(Continued)

*Primary Examiner*—Chau Nguyen
*Assistant Examiner*—Jung Park
(74) *Attorney, Agent, or Firm*—Mel Barnes; Capital Legal Group, LLC

(57) ABSTRACT

A power line based communication system includes a power line termination module, a plurality of power line gateways, and a plurality of power line nodes. The power line termination module manages data for local area networks within the power line based communication system. The plurality of power line gateways is arranged in sets of power line gateways, wherein each set of power line gateways constitutes a local area network. Each of the plurality of power line nodes is operably coupled to the power line termination module via a high-speed communication path. In addition, each power line node is operably coupled to set of power line gateways, i.e., to a local area network, via power lines of a local transformer. Each of the power line nodes receives data for its respective LAN from the power line termination module and provides the data to the power line gateways of its LAN via the power lines of the local transformer. Virtual local area networks are enabled between the power line termination module and the power line gateways.

33 Claims, 32 Drawing Sheets

U.S. PATENT DOCUMENTS

| | | | |
|---|---|---|---|
| 4,912,553 | A | 3/1990 | Pal et al. |
| 5,929,750 | A | 7/1999 | Brown |
| 5,933,071 | A | 8/1999 | Brown |
| 5,977,650 | A | 11/1999 | Rickard et al. |
| 5,982,276 | A | 11/1999 | Stewart |
| 6,037,678 | A | 3/2000 | Rickard |
| 6,151,330 | A | 11/2000 | Liberman |
| 6,278,357 | B1 | 8/2001 | Croushore et al. |
| 6,281,784 | B1 | 8/2001 | Redgate et al. |
| 6,282,405 | B1 | 8/2001 | Brown |
| 6,317,031 | B1 | 11/2001 | Rickard |
| 6,480,510 | B1 | 11/2002 | Binder |
| 6,496,104 | B2 | 12/2002 | Kline |
| 6,854,059 | B2 | 2/2005 | Gardner |
| 6,958,680 | B2 | 10/2005 | Kline |
| 7,042,351 | B2 | 5/2006 | Kline |
| 2001/0054953 | A1 | 12/2001 | Kline |
| 2002/0026531 | A1* | 2/2002 | Keane et al. ............... 709/250 |
| 2002/0048368 | A1 | 4/2002 | Gardner |
| 2002/0097953 | A1 | 7/2002 | Kline |
| 2002/0110310 | A1 | 8/2002 | Kline |
| 2002/0110311 | A1 | 8/2002 | Kline |
| 2002/0121963 | A1 | 9/2002 | Kline |
| 2002/0154000 | A1 | 10/2002 | Kline |
| 2003/0067910 | A1 | 4/2003 | Razazian et al. |
| 2003/0103307 | A1 | 6/2003 | Dostert |
| 2003/0129978 | A1 | 7/2003 | Akiyama et al. |
| 2003/0152075 | A1* | 8/2003 | Hawthorne et al. ......... 370/389 |
| 2003/0169155 | A1 | 9/2003 | Mollenkopf et al. |
| 2003/0184433 | A1 | 10/2003 | Zalitzky et al. |
| 2003/0227373 | A1 | 12/2003 | Lou et al. |
| 2004/0032320 | A1 | 2/2004 | Zalitzky et al. |
| 2004/0037317 | A1 | 2/2004 | Zalitzky et al. |
| 2004/0054425 | A1 | 3/2004 | Elmore |
| 2004/0075535 | A1* | 4/2004 | Propp et al. ........... 340/310.01 |
| 2004/0174851 | A1 | 9/2004 | Zalitzky et al. |
| 2004/0227621 | A1 | 11/2004 | Cope et al. |
| 2005/0017825 | A1 | 1/2005 | Hansen |
| 2005/0076148 | A1* | 4/2005 | Chan et al. ................. 709/246 |
| 2005/0076149 | A1* | 4/2005 | McKown et al. ........... 709/249 |

FOREIGN PATENT DOCUMENTS

| | | |
|---|---|---|
| EP | 0 822 721 A3 | 2/1998 |
| EP | 0 933 883 A2 | 8/1999 |
| EP | 0 933 883 A3 | 8/1999 |
| EP | 1 075 091 A1 | 2/2001 |
| GB | 2 342 264 A | 4/2000 |
| WO | WO-92/16920 A1 | 10/1992 |

OTHER PUBLICATIONS

"EMETCON Automated Distribution System: Communications Guide", *Westinghouse ABB Power T & Company Technical Manual 42-6001A.*, (Sep. 1989), 1-55.

"IEEE Guide for Power-Line Carrier Applications, ANSI/IEEE Std 643-1980", *The Institute of Electrical and Electronics Engineers, Inc.*, (1980), 1-80.

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)*, (May 1992), 1-11.

"Summary of an IEEE Guide for Power-Line Carrier Applications", *IEEE Transactions on Power Apparatus and Systems*, (Nov./Dec. 1980), 2334-2337.

Chen, Y-F , et al., "Baseband Transceiver Design of a 128-Kbps Power-Line Modem for Household Applications", *IEEE Transactions on Power Delivery*, (2002), 338-344.

Feduschak, N A., "Waiting in the Wings: Is Powerline Technology Ready to Compete with Cable?", www.cabletoday.com/ic2/archives/0301/0301powerline.htm, (Mar. 2001), 1-5.

Gutzwiller, F W., et al., "Homenet: A Control Network for Consumer Applications", *IEEE Transactions on Consumer Electronics*, (Aug. 1983), 297-304.

Hasler, E F., et al., "Communication Systems Using Bundle Conductor Overhead Power Lines", *IEEE Transactions on Power Apparatus and Systems*, (Mar./Apr. 1975), 344-349.

Lokken, G , et al., "The Proposed Wisconsin Eectric Power Company Load Management System Using Power Line Carrier Over Distribution Lines", 1976 *National Telecommunications Conference, IEEE*, (1976), 2.2-12.2-3.

Meng, H , et al., "A Transmission Line Model for High-Frequency Power Line Communication Channel", *IEEE*, (2002), 1290-1295.

Naredo, J L., et al., "Design of Power Line Carrier Systems on Multitransposed Delta Transmission Lines", *IEEE Transactions on Power Delivery*, (1991), 952-958.

Onunga, J , et al., "Distribution Line Communications Using CSMA Access Control with Priority Acknowledgements", *IEEE Transactions on Power Delivery*, (Apr. 1989), 878-886.

Yoshitoshi, M , et al., "Proposed Interface Specifications for Home Bus", *IEEE Transactions on Consumer Electroncs*, (Aug. 1986), 550-557.

* cited by examiner

LAST LEG UTILITY GRID HIGH-SPEED DATA COMMUNICATION NETWORK HAVING VIRTUAL LOCAL AREA NETWORK FUNCTIONALITY

CROSS REFERENCES TO RELATED APPLICATIONS

This application claims priority to U.S. Regular application Ser. No. 09/860,260, filed May 18, 2001, U.S. Regular application Ser. No. 09/860,261, filed May 18, 2001, U.S. Regular application Ser. No. 09/860,262, filed May 18, 2001, and U.S. Regular application Ser. No. 09/860,263, filed May 18, 2001, all of which are incorporated herein by reference.

BACKGROUND OF THE INVENTION

1. Technical Field of the Invention

The present invention relates generally to communication systems; and more particularly to high data rate communication systems being partially serviced across a utility grid.

2. Related Art

As is known, data may be communicated from one entity (e.g., end user's computer, server, facsimile machine, web browser, et cetera) to another entity via a communication infrastructure. The communication infrastructure may include a public switched telephone network (PSTN), the Internet, wireless communication networks, Local Area Networks (LAN), Wide Area Networks (WAN) and/or any combination thereof. Such communication networks are constantly evolving to provide end users with greater bandwidth such that the user may receive and/or transmit greater amounts of data in shorter times with greater reliability.

In conventional communication systems, an end user is coupled to a communication system, or network, via a wire line or wireless communication path. Wireless communication paths include radio frequency paths and infrared paths, while wire line communication paths include telephone lines, Ethernet connections, fiber optic connections, and/or in-home networks using power outlets. Such in-home networks utilize a home's existing power wiring, which typically carries a 120 VAC or 240 VAC, 60 Hz signal, to carry high frequency signals that represent data. For example, HomePlug Alliance and other home networking committees are attempting to standardize in-home networking over power lines such that any end user device (e.g., personal computer, laptop, facsimile machine, printer, audio/video receiver, audio equipment, video equipment, et cetera) within the home, when plugged into an electrical outlet, is coupled to the home's power line network. As is known, the in-home networking is utilized once the data reaches the home, which may be done using a 56K modem, DSL modem, cable modem, etc.

As is also known, the last hundred feet of a communication system, i.e., the connection to each individual user, is the most costly and most difficult to install. To make individual user connections, the Telephone Company, cable company, etc., incurs a truck roll for in-person installation of the wiring, optics, coaxial cable, splitters, specialized modems, etc. In addition, many homes are very difficult to physically access, making the installation of the local connection even more difficult and more costly.

Power, or utility, companies are currently installing, in ground, fiber optic lines in parallel with the installation and/or repair of, power lines into neighborhoods. Such fiber optics may be used for transceiving high-speed data for users within the neighborhoods. The power companies have similar physical constraints in installing fiber optics to each home as the telephone companies and cable companies, in that many homes are physically difficult to access and/or costly to access. Further, the power companies have been unable to easily complete these high-speed data communication paths to the end user's homes.

Therefore, a need exists for a method and apparatus that enables broadband communications in local area networks of a plurality of homes.

SUMMARY OF THE INVENTION

These needs and others are substantially met by the present invention that, in general, discloses a method and apparatus for power line based communication systems. Such a power line based communication system utilizes the power lines of at least one local distribution transformer, and/or substation transformer, to carry broadband data for a plurality of users that receive power from the at least one local distribution transformer, and/or substation transformer. The power line based communication system includes a power line termination module, a plurality of power line gateways, and a plurality of power line nodes. A power line local area network (LAN, referred to herein as either LAN or power line LAN) of the power line based communication system includes a set of power line gateways and a respective portion of a utility grid over which a set of power line gateways receives communication services. In most embodiments, each of the power line gateways is associated with a respective home. A single power line node typically services each LAN, although a backup power line node may be used for redundancy purposes. In many embodiments, the power line node is physically co-located with a local distribution transformer that services the respective portion of the utility grid, at one of the homes in the LAN, or at any convenient location there between.

Each power line node of each LAN is operably coupled to the power line termination module via a high-speed communication path. In general, the power line termination module manages the broadband data for a plurality of associated LANs Accordingly, the power line termination module includes routing, networking, and switching functions to facilitate the conveyance of data between users of the local area networks and between users of the local area networks and other entities via a communication network or a plurality of communication networks. In some embodiments, a plurality of power line nodes is associated with a power line termination module accumulator that couples the plurality of power line nodes to the power line termination module. Further, in some embodiments, a single power line node includes a plurality of ports, each of which services a plurality of power line gateways coupled to a particular segment of the utility grid. In such case, the single power line node services a plurality of segments of the LAN, each of the plurality of segments being substantially communicatively isolated from each other of the plurality of segments.

The power line node in a LAN is operably coupled to the power line gateways within the LAN via the power lines (serviced by the respective segment of the utility grid). In addition, the power line node is operably coupled to the power line termination module, or switching hub, via a high-speed communication path, such as a fiber optic cable, fixed wireless connection, free space optics, et cetera. As coupled, the power line node of a LAN generally acts as the conduit to the more global communication system for the LAN. Thus, the power line node receives LAN data from the global communication system via the power line termination module, or the like, and provides it to the power line gateways of the LAN. In addition, the power line node receives data from the power line gateways of the LAN and provides the data to the global communication system via the power line termination module, or the like. The data communication within the LAN will be accomplished via IP routing at layer 3 and VLAN switching at layer 2. Over all system Quality of Service (QoS) support will also be included with both inbound and outbound operations (via IEEE 802.1p to IP DiffServ QoS mapping).

To facilitate the transceiving of data on the power lines in a neighborhood, or power line LAN, each of the power line nodes and power line gateways includes an AC coupling module, a power line modem module, a VLAN switch module, and CPU module referred to as a power line LAN interface. In addition, each of the power line nodes and power line gateways includes a splitter to split the transmit data from the receive data. Accordingly, a broadband communication system may now readily be supported via power lines within neighborhoods where only a single fiber optic or other high-speed communication path, or few such connections, are provided to a neighborhood via a power line node, which transceives data via the power lines to other homes within the local are network.

According to another aspect of the present invention, Virtual Local Area Network (VLAN) operations are employed to service high-speed data communications service for a number of power line gateways. With this embodiment, the number of power line gateways serviced is segregated into a plurality of groups of power line gateways. Each group of power line gateways of the plurality of groups of power line gateways receives high-speed data communication services via a respective utility grid segment. For each group of power line gateways of the plurality of groups of power line gateways, a respective port of a power line termination module services the group of power line gateways. Further, for each power line gateway of each group of power line gateways of the plurality of groups of power line gateways, a VLAN is set up between the power line gateway and a respective port of the power line termination module.

In one structure of the power line termination module of the present invention, the power line termination module includes a plurality of ports. Each of this plurality of ports services a VLAN domain. Each VLAN domain has a group ID and includes a particular number of VLAN IDs, e.g., 4,096 VLAN IDs according to limitations defined in IEEE 802.1Q. Because each power line gateway may service a plurality of devices, e.g., digital computer, telephone, set top box, etc., each power line gateway may be assigned a multiple number of VLAN IDs, each VLAN ID corresponding to a unique port of the power line gateway. Because traffic on each of the plurality of ports of the power line termination module is segregated, VLAN IDs may be re-used for each port of the power line termination module. Thus, a VLAN ID associated with one port of the power line termination module may be the same VLAN ID associated with another port of the power line termination module. Because the VLAN domains of the various ports are segregated, however, power line gateway port communications are uniquely identifiable based upon a combination of VLAN ID and power line termination module port.

With the VLAN operations of the present invention, various services and features may be easily enabled. For example, VLAN ID overlays may be used to service broadcast and multicast high-speed data communications to a plurality of power line gateways serviced by a single port of the power line termination module. Further, a QoS level may be defined for each VLAN ID at each port of the power line gateway. Limited bandwidth may be apportioned to various data communications based upon their respective QoS level. The servicing power line nodes also support these QoS operations. Likewise, for power line gateways servicing a number of devices, VLAN IDs may be related to QoS at the power line gateway. When the power line gateway accesses the last-leg utility grid high-speed data communication network, typically in a multicast environment (or voice telephony use), the power line gateway will use an appropriate level of bandwidth serviced by the network to support a respective QoS of a serviced device.

In enabling operation of the various VLAN domains associated with its ports, the power line termination module, power line node, and power line gateways interact via an administrative VLAN. During a setup operation, a power line gateway queries the power line termination module using the administrative VLAN. In some structures, only a processor, and not a user, of the power line gateway has access to the administrative VLAN. Using the administrative VLAN, the power line termination module configures the power line gateway and the power line node for servicing the operations of the power line gateway. The administrative VLAN may also be employed for service provisioning updates, software updates, and other administrative operations.

In servicing operations, the power line termination module receives an incoming data packet on a particular port. The incoming data packet includes an address corresponding to a device serviced by a power line gateway, e.g., MAC address, IP address, etc., as well as a VLAN ID corresponding to the servicing port of the power line gateway. In servicing of this data packet, the power line termination module relates the IP address (or MAC address) to the VLAN ID in a routing table, removes the VLAN ID from the communication, and forwards the data packet on the coupled data network. When the power line termination module receives a response, e.g., from a web server, that includes the IP address (or MAC address) of the power line gateway, the power line termination module determines the VLAN ID for the communication based upon the IP address (or the MAC address), appends the VLAN ID to the data communication, and forwards the data communication to the power line gateway.

The present invention provides a low cost solution for many issues with the open access of a high-speed LAN. These issues include privacy and QoS of each user on an open power line LAN. This invention also retains the nature of effective broadcast and multi-cast capabilities when the needs came from some (multimedia) applications. Other features and advantages of the present invention will become apparent from the following detailed description of the invention made with reference to the accompanying drawings.

DETAILED DESCRIPTION OF THE FIGURES

Figure 1:
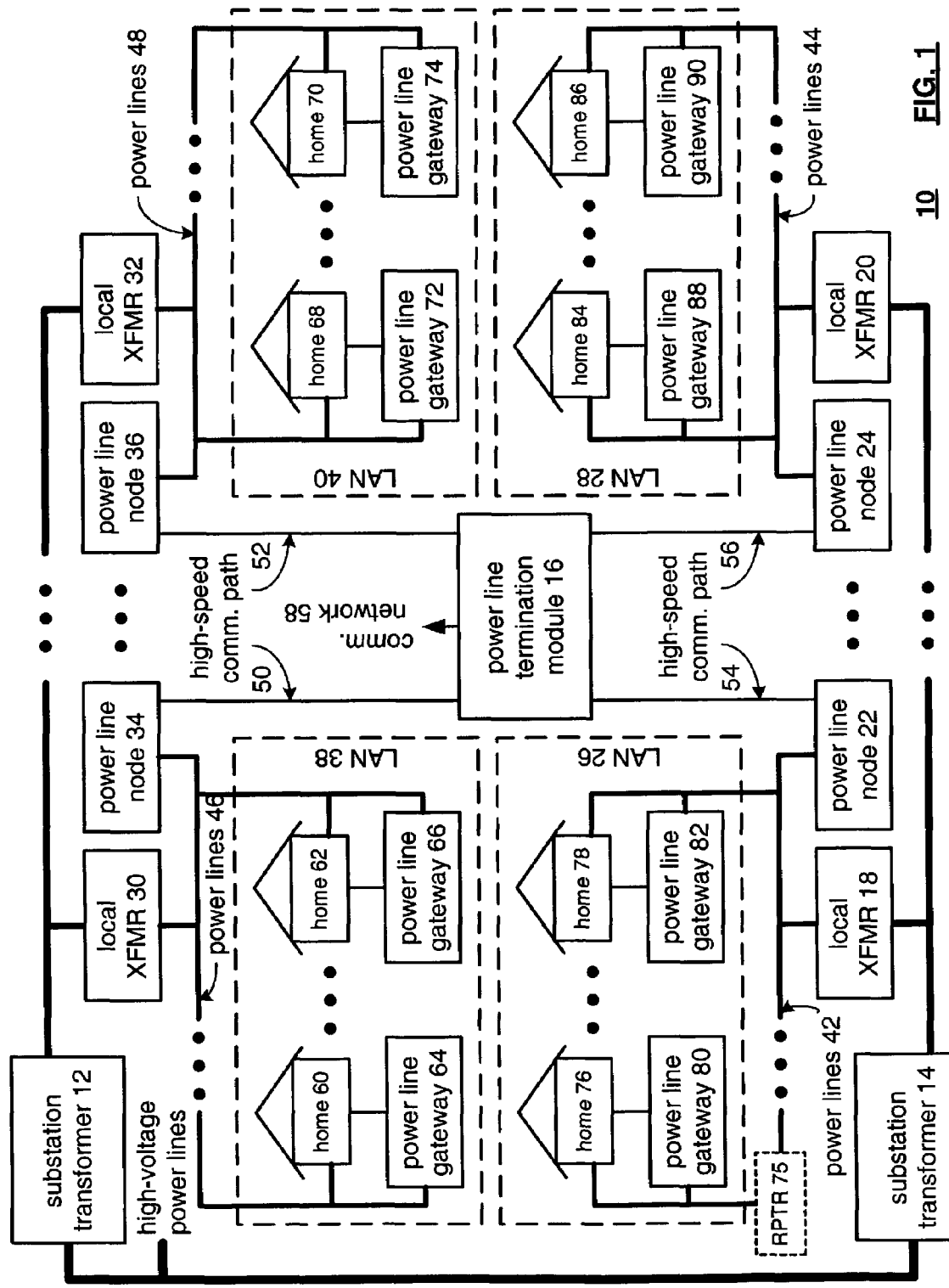
FIG. 1 illustrates a schematic block diagram of a power line based communication system in accordance with the present invention.

FIG. 1 illustrates a schematic block diagram of a power line based communication system 10. The system 10 includes a plurality of substation transformers 12 and 14, a plurality of local transformers 30, 32, 18, and 20, a plurality of power line nodes 34, 36, 22, and 24, a plurality of local area networks 26, 28, 38, and 40, and a power line termination module 16. As one of average skill in the art will appreciate, more or less substation transformers, local transformers, power line nodes, power line termination modules, and local area networks may be included in a communication system that provides similar communication services as that of the power line base communication system 10. Accordingly, the elements illustrated, and the quantities thereof, are in no way to be construed as to limit the number of elements that may be included in the communication system 10 but are shown to illustrate the concepts of the present invention. The same applies to each figure of the present patent application.

As shown, the substation transformers 12 and 14 are coupled to high voltage power lines. The high voltage power lines provide a 3-phase high voltage signal to each of the substation transformers. The voltage of the high voltage signal may be 69 kilovolts AC (KVAC), 138 KVAC, 345 KVAC, etc. The substation transformers 12 and 14 convert the 3-phase high voltage signal into a lower voltage 3-phase signal. The output voltage of each substation transformer 12 and 14 may be 12.5 KVAC, 13.8 KVAC, or 25 KVAC.

Each of the local distribution transformers 18, 20, 30 and 32 receives the 3 phase 12.5, 13.8 KVAC, or 25 KVAC signal from the respective substation transformer 12 or 14 and produces a single-phase 120 volt AC (VAC) or 240 VAC output. Accordingly, the single-phase 120 VAC or 240 VAC output is provided to a plurality of homes 60–62, 68–70, 76–78, and 84–86 within each local area network 26, 28, 38 and 40 via power lines 46, 48, 42, and 44. Accordingly, each home within a local area network is coupled to each other home in the LAN via power lines of its local transformer. As such, the power lines 42, 44, 46 or 48, carry the single phase 120 VAC or 240 VAC signal to each of the homes to supply the home with its requisite energy needs.

Each local area network 26, 28, 38 and 40 has a power line node 22, 24, 34 and 36 operably coupled to it. As shown, each power line node 22, 24, 34 and 36 is operably coupled to the local area network 26, 28, 38 and 40 via power lines 42, 44, 46 and 48 and also to a power line termination module 16 via a high-speed communication path 50, 52, 54 and 56. As configured, the power line nodes 22, 24, 34 and 36 provide the last 100 feet, or so, of broadband coupling for the local area networks 26, 28, 38 and 40. As is known, the last 100 feet, or so, of a communication path is one of the most financially significant portion of the communication network. As such, the power line nodes 22, 24, 34 and 36 in combination with the power line gateways 64, 66, 72, 74, 80, 82, 88 and 90 provide an economical and reliable communication network for the last 100 feet, or so, of a communication system.

In general, the power line nodes 22, 24, 34 and 36 transceive data via the high-speed communication paths 50, 52, 54 and 56 with the power line termination module 16 for their respective local area networks. The power line termination module 16 is operably coupled to a communication network 58, which may be the Internet, public switched telephone network (PSTN), wireless network, Ethernet network, public wide area network, private wide area network, and/or any other network that routes data amongst a plurality of users as electrical signals and/or as light waves. As such, the power line termination module 16 acts as a local switch for the power line nodes 22, 24, 34 and 36 and their respective local area networks.

Each of the power line nodes 22, 24, 34 and 36 transceives data via the high-speed communication path 50, 52, 54 and 56. The inbound data received by the power line node 22, 24, 34 or 36 is destined for one or more of the users (i.e., homes, within the respective local area network). The inbound local area network data is processed then and modulated onto the power lines 42, 44, 46 or 48. Each of the power line gateways 64, 66, 72, 74, 80, 82, 88 and 90 include AC coupling to receive the modulated signal from the power lines. The power line gateways 64, 66, 72, 74, 80, 82, 88 and 90 demodulate the data, process the data and retrieve the local area data for its respective home, (i.e., user). A user may be a personal computer, printer, facsimile machine, audio equipment, video equipment, in-home network, and/or any device that can receive and/or transmit digital information. In addition, each of the power line gateways 64, 66, 72, 74, 80, 82, 88 and 90 receives data from a user within the respective home, processes the data and modulates it onto the respective power lines. The respective power line node receives the modulated data, demodulates it, processes it, and places it on the high-speed communication path for transmission to the power line termination module 16. The power line termination module 16 then processes the data and routes it either to another user within one of the other local area networks or to the communication network 58.

Figure 2:
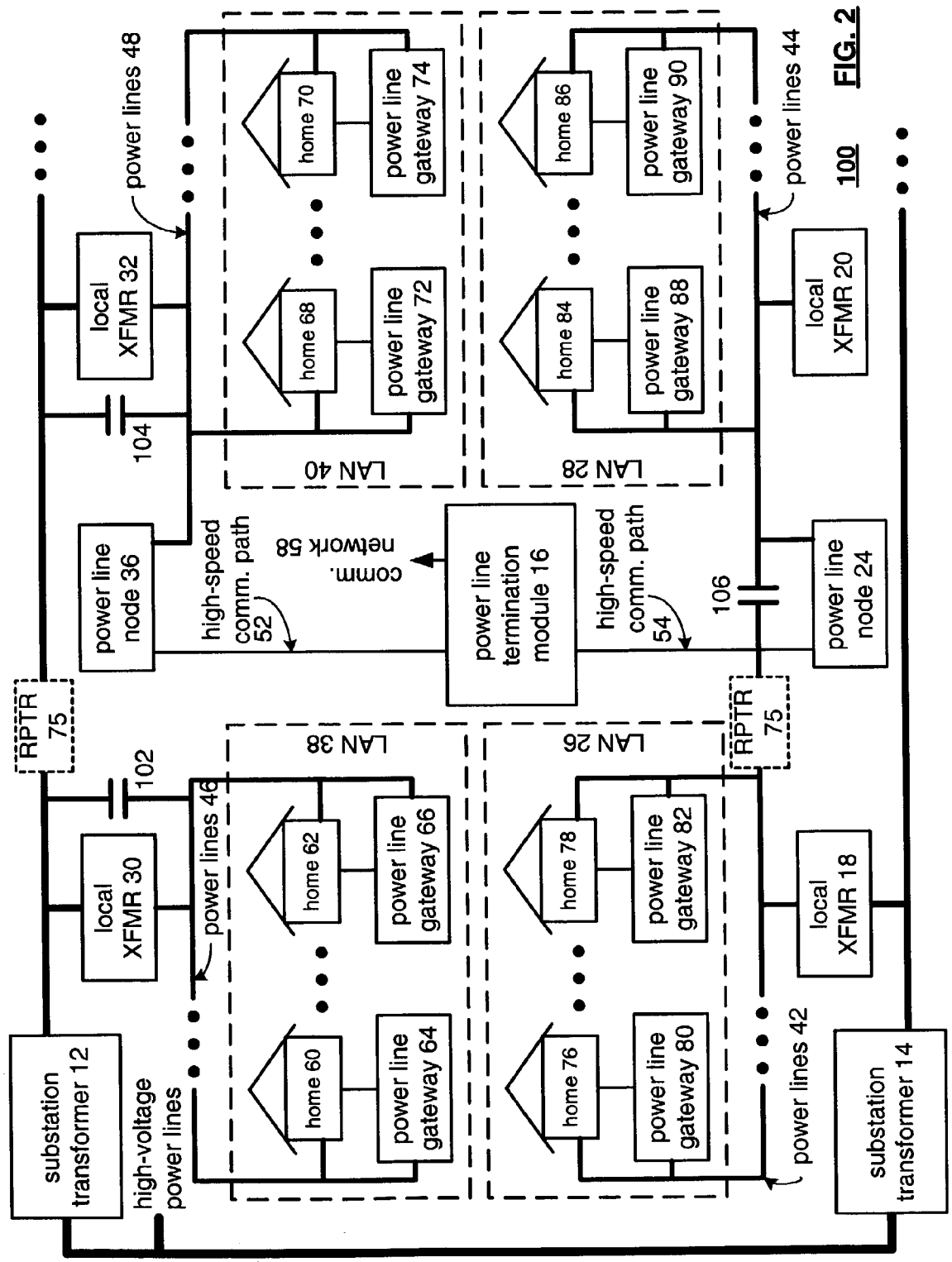
FIG. 2 illustrates a schematic block diagram of an alternate power line based communication system in accordance with the present invention.

FIG. 2 illustrates a schematic block diagram of another power line base communication system 100. In this example of a power line base communication system, the system 100 includes four local area networks 26, 28, 38 and 40, a pair of substation transformers 12 and 14, a plurality of local distribution transformers 18, 20, 30 and 32 and a pair of power line nodes 24 and 36. Each of the local area networks 26, 28, 38 and 40 include a plurality of homes 76–78, 84–86, 60–62, and 68–70, respectively. Associated with each home in each local area network is a power line gateway. For instance, power line gateway 64 is associated with home 60; power line gateway 66 is associated with home 62, et cetera.

Local distribution transformer 30 is shown to include a high voltage capacitor 102 coupled in parallel with its primary and secondary windings. In addition, local distribution transformer 32 also includes a high voltage capacitor 104 coupled in parallel with its primary and secondary windings. As coupled, the high voltage capacitors 102 and 104 provide a low impedance path for the modulated data produced by the power line gateways 64, 66, 72 and 74 to the power line node 36. As such, in this configuration, power line node 36 may act as the conduit with the power line termination module 16 for both LAN 39 and LAN 40. As one of average skill in the art will appreciate, the high voltage capacitors 102 and 104 may be a single high voltage capacitor having a capacitance of 100 pF to 10 µF and have a voltage rating in excess of 240 VAC. As one of average skill in the art will also appreciate, the high voltage capacitors 102 and 104 may include multiple capacitors coupled in series and/or in parallel to achieve a desired capacitance and voltage rating. As one of average skill in the art will further appreciate, multiple capacitors may be used to coupled multiple taps, or nodes, of the primary winding to multiple taps, or nodes, of the secondary winding, and are coupled to the same phases of the primary and secondary winding for multiple phase transformers.

Local distribution transformers 18 and 20 have their secondary windings operably coupled together via high voltage capacitor 106. As coupled, the modulated data produced by the power line gateways within local area networks 26 and 28 are readily coupled to the power line node 24. As such, power line node 24 supports both local area networks 26 and 28. In this embodiment, power line node 24 acts as the conduit to the power line termination module 16, and hence the communication network, for all users within local area network 26 and 28.

In some installations, the local transformers 32 and 30 will have sufficiently low series impedance in a frequency of interest so that the modulated data will pass through the transformers 30 and 32 substantially or fully unattenuated. In this case, coupling capacitors 102 and 104 are not required.

Modulated data propagating along the power lines over a distance will attenuate and the signal to noise ratio of the modulated data will decrease. Further, Electromagnetic Interference (EMI) will also reduce the signal to noise ratio as the modulated data propagates. Thus, repeaters 75 may be required to boost the signal strength of the modulated data. Whether repeaters 75 will be required, placement of the repeaters 75, and the gain required for the repeaters 75 will typically be unique to each installation. A repeater 75 was shown in FIG. 1 and other repeaters 75 are shown in the subsequent Figures.

As in the embodiment of FIG. 1, the system 100 of FIG. 2 provides the last 100 feet, or so, of a communication network (i.e., the individual coupling to each home within each LAN, or neighborhood) is provided via the power line nodes 24 and 36, the power line gateways 64, 66, 72, 74, 80, 82, 88 and 90 and the existing power lines associated with the local distribution transformers.

For the systems shown in FIGS. 1 and 2, the power line nodes 22, 24, 34 and 36 may be mounted near the local distribution transformers (i.e., on the same pole), incorporated into the local distribution transformer box, mounted at one of the homes within the local area network, or any convenient location between the transformer and the homes of the LAN. As previously mentioned, a local area network may generally be viewed as the homes within a neighborhood wherein each home within the neighborhood is powered by the same local distribution transformer. As such, each LAN network may include 1–500 homes, small businesses, or other structures.

To provide filtering with the local distribution transformers 18, 20, 30, and 32 and/or to prevent unwanted feedback to the substation transformers, each of the local distribution transformers may include a modified fuse to have a desired frequency response. For example, the modified fuse may have a predetermined inductance that provides high-frequency isolation to upstream data and filtering for downstream data. As a further example, the fuse may include a desired resistance and/or a desired capacitance to provide a more complex frequency response.

Figure 3:
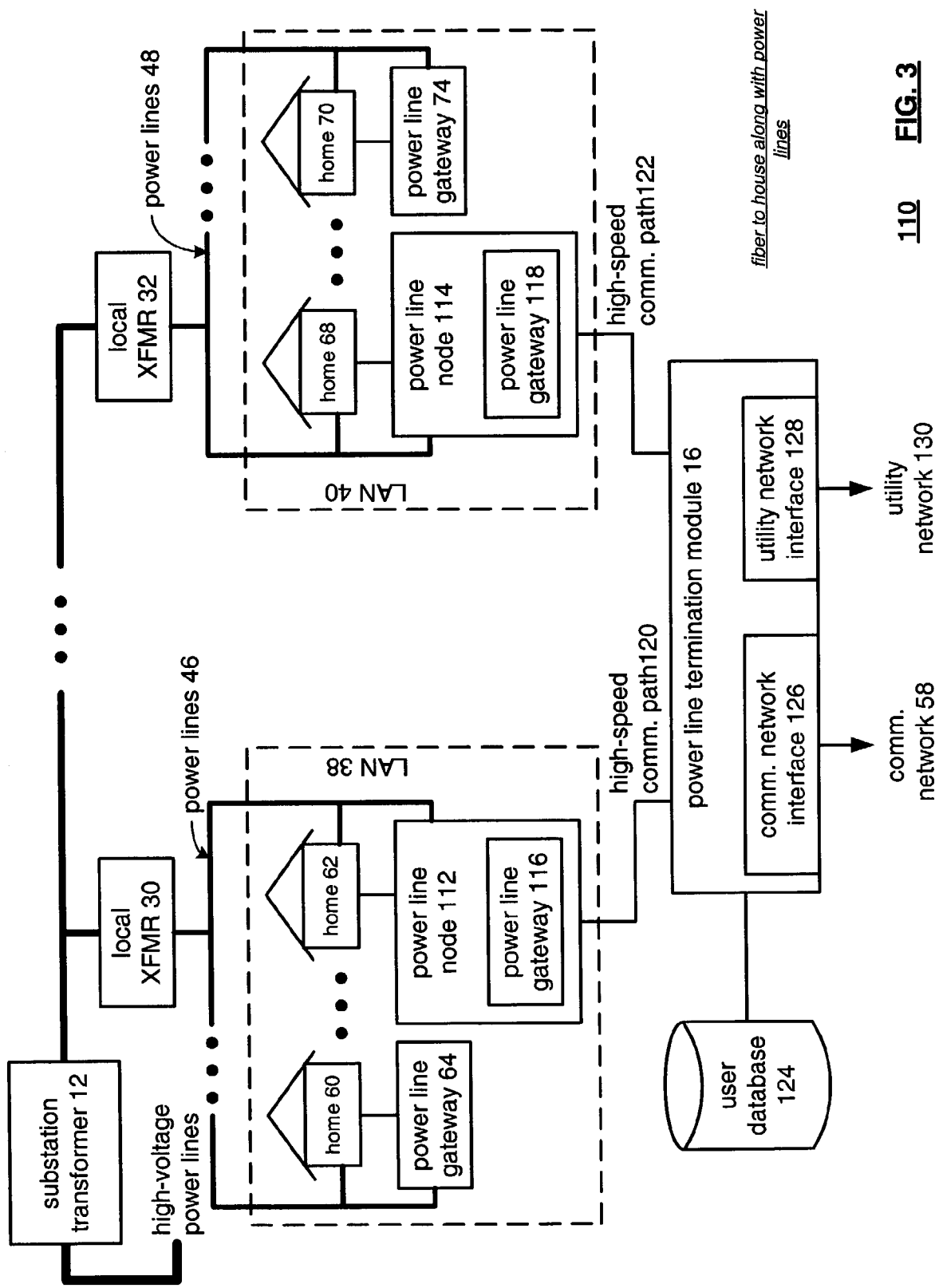
FIG. 3 illustrates a schematic block diagram of another power line based communication system in accordance with the present invention.

FIG. 3 illustrates a schematic block diagram of another power line base communication system 110. The system 110 includes a plurality of substation transformers (only one shown), a plurality of local distribution transformers 30 and 32, and a plurality of local area networks 38 and 40. In this example system, power line nodes 112 and 114 are associated with an individual home 62 and 68, respectively, within the LAN they support. In addition, each of the power line nodes 112 and 114 include a power line gateway 116 and 118 to facilitate transceiving data for the individual home 62 or 68. Each of the power line nodes 112 are operably coupled to the power line termination module 116 via a high-speed communication path 120 or 122, which may be a fiber optic cable, wireless communication path, and/or any communication medium that allows 2 devices to transmit analog and/or digital information there between.

The power line termination module 16 includes a communication network interface 126 and a utility network interface 128. The communication network interface 126 allows the power line termination module 16 to be operably coupled to a communication network 58. The communication network interface 126 includes the multiplexing and de-multiplexing, switching, routing and/or other interconnections required to interface a plurality of local users with the communication network 58.

The utility network interface 128 provides a similar function but with respect to a utility network 130. Most power companies have their own network to allow communication with substations, local distribution transformers, etc. As such, the utility network 130 may be utilized as at least a portion of the switching fabric to couple multiple local area networks associated with various substations together. The utility network will run on a given VLAN, which is totally separated with other users to ensure the security, privacy and QoS of the operation.

The power line termination module 16 also includes a user database 124, which includes a listing of each user associated with each of the local area networks serviced by the power line termination module 16. Such information includes, but is not limited to, user identification code, user access code, type of use, type of service, access information, access privileges, et cetera. In general, the power line termination module 16 provides the platform for system management and controls the high-speed data paths. In one embodiment, the power line termination module includes a fully redundant architecture that provides fault protection for the control of the system and for the connection to the communication network 58. In addition, the power termination module 16 provides platform interfaces for element management to support customers, or users on the network.

The power line nodes of FIGS. 1, 2 and 3 generally provide the platform for a conversion of the high-speed electrical of light signals, which may be carried via wires, radio frequencies, and/or fiber optics, from the network into electrical signals that are transmitted over the power line infrastructure to the users of the LANs. The power line nodes may physically reside at a location that provides the best intersection of the signal to the power network. Such possible locations include at the customer side of the substation transformer, at the customer side of the local distribution transformer, or at a home within the neighborhood serviced by the local distribution transformer. In addition, each of the power line nodes should be weather proof such that no additional environment protection is needed.

As previously mentioned, each of the substation transformers produces a 3-phase high voltage signal. In accordance with the present invention, each phase produced by the substation transformer may carry separate modulated data for a local area network or a plurality of local area networks. For example, when the services for a particular local area network are relatively low speed, a power line node may be located at the substation transformer on a one per phase basis (i.e., line to ground) to provide services such as meter reading, turn on-off electrical equipment within the home, burglar alarm activation/deactivation, et cetera. In addition, low speed signaling may be used to test particular power networks to verify bandwidth capabilities.

In one embodiment, a power line node would typically serve in the range of 1–15 homes. In an area where more than 15 homes are supported by a local distribution transformer, a plurality of power line nodes may be utilized. To provide isolation on the power lines from power line node to power line node, and from local area network to local area network, different modulation frequencies may be utilized, the power lines may be frequency division multiplex, time division multiplex, and/or any other mechanism for isolating multiple signals on a single transmission path.

As one of average skill in the art will appreciate, the power line nodes and power line gateways may include a battery backup, generator, and/or a fuel cell to power respective portions of the local area network as well as provide in home power when local services have been disrupted.

As one of average skill in the art will further appreciate, a power line base communication system may be configured in accordance with FIGS. 1, 2 and/or 3. For example, one local area network may include a power line node that is affiliated with a particular home, one local area network may be supported by a power line node that is physically co-located with the local distribution transformer, while multiple local area networks may be supported by a single power line node wherein AC coupling provides connectivity between local area networks. In addition, the substation transformer may include the power line node that provides communication to the entire network affiliated with that particular substation.

Figure 4:
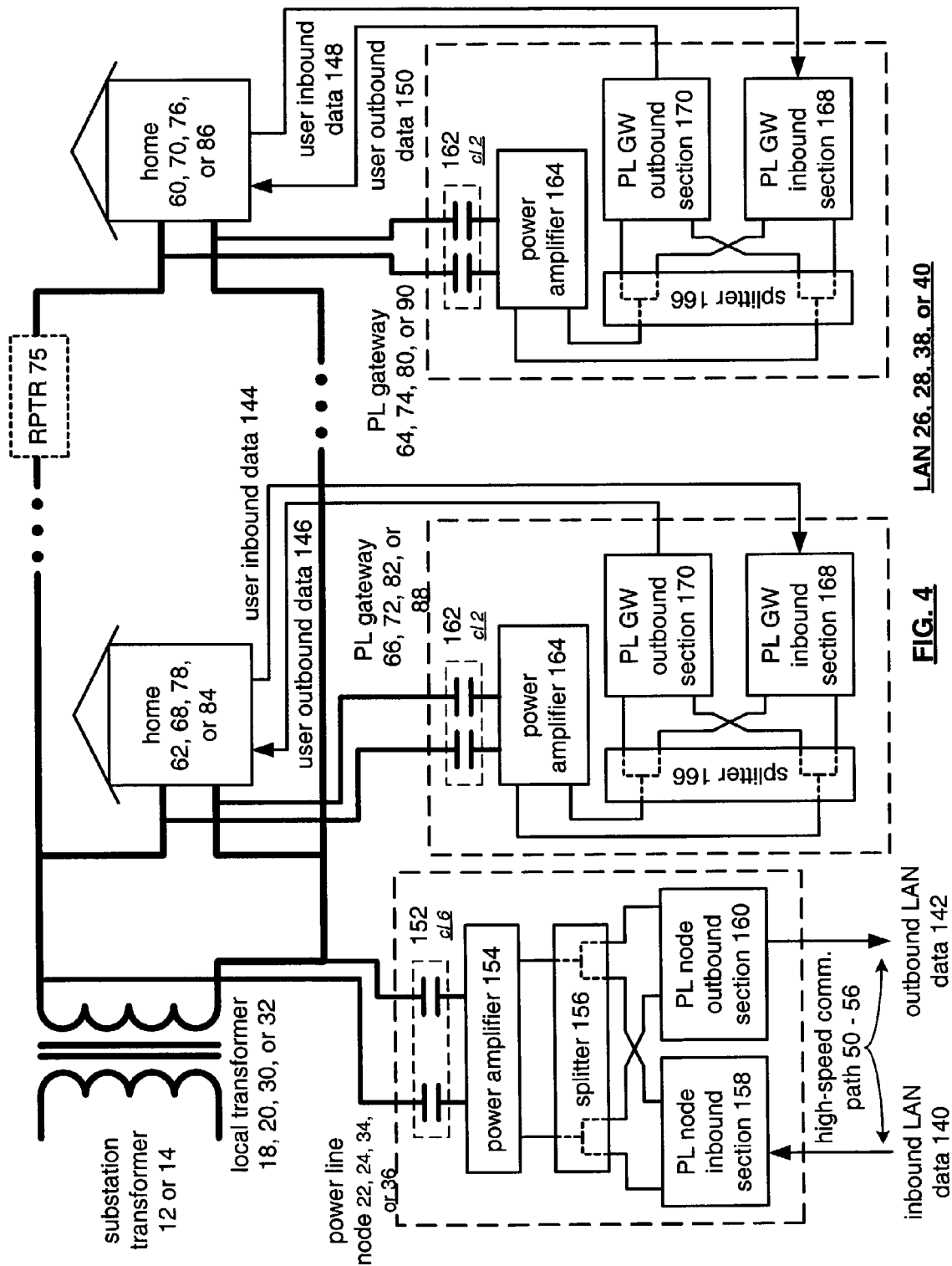
FIG. 4 illustrates a schematic block diagram of a power line node and power line gateway in accordance with the present invention.

FIG. 4 illustrates a schematic block diagram of a representative local area network wherein the power line nodes 22, 24, 34 and 36 are shown in greater detail as well as the power line gateways 64, 66, 72, 74, 80, 82, 88 and 90. As shown, the power line node, 22, 24, 34 or 36 includes an AC coupling module 152, a power amplifier 154, a splitter 156, a power line node inbound section 158 and a power line node outbound section 160. The inbound and outbound sections 158 and 160 are operably coupled to the high-speed communication path 50 through 56. As coupled, the power line node 22, 24, 34 or 36 process inbound local area network data 140 and outbound local area network data 142.

In general, inbound section 158 of the power line node 22, 24, 34 or 36 processes the inbound local area network data 140 based on a desired communication convention. As such, the inbound local area network data 140 is received via the high-speed communication path 50 through 56 in accordance with a particular communication convention.

Upon receipt, the inbound section 158 deciphers the local area network data 140 to identify the individual addressees, i.e., the individual users within the local area network it supports. The processed data is then modulated in accordance with a modulation protocol of the LAN and provided to splitter 156. As will be further described with reference to FIGS. 21–25D, the power line gateways 64, 66, 72, 74, 80, 82, 88 and 90, the power line nodes 22, 24, 34, or 36, and the power line termination module 16 (as shown in FIGS. 1–3) each include one or more VLAN Switch modules. The VLAN operations of the present invention will be described further with reference to FIGS. 21–29.

Each of the power line gateways, 64, 66, 72, 74, 80, 82, 88 and 90 are operably coupled to the power lines at the respective homes. Each of the power line gateways includes an AC coupling module 162, a power amplifier 164, a splitter 166, a power line gateway inbound section 168 and a power line gateway outbound section 170. The modulated data that has been placed on the power lines by the AC coupling module 152 of the power line node is received via the AC coupling module 162 of the power line gateways. The received modulated signals are provided to power amplifier 164, which also may be of a conventional modem construct, amplifies the signals and provides the amplified signals to splitter 166. The splitter 166, which may be of conventional construct, separates the outbound signals, (i.e., the modulated signals received from the power line node) from the inbound signals (i.e., the received signals from the user that are to be modulated and provided to the power line node).

As one of average skill in the art will appreciate, for full duplex operation, the inbound data will be modulated at a different frequency than the outbound data. As such, the transmit path (i.e., from the power line node to the power line gateways) and receive path (i.e., from the power line gateways to the power line node) within the local area network will operate at different frequencies. If half duplex conveyance of data is desired, the same frequency may be used for transmit and receive paths. As such, at certain times, or as indicated by the power line node, the communication path will be used for data transmission, i.e., from the power line node to the power line gateways, or data reception, i.e., from the power line gateways to the power line node.

Once the modulated data has been amplified and separated by the splitter 164, the power line gateway outbound section 170 demodulates the data in accordance with the modulation/demodulation protocol of the LAN. The outbound section 170 then processes the demodulated data in accordance with the LAN communication convention to produce retrieved data. The outbound section 170 then provides the retrieved data to the home as user outbound data 146. Each power line gateway will perform a similar function with respect to modulated inbound data on the power lines.

The coupling of the power line gateway to the home may be done through a modem, a direction connection, a connection into an in-home network, or any other means for provided data to a user. Once the data is in the home, it may be routed in accordance with whatever in-home networking, or direct connect, convention used therein to a desired end-user.

Each of the users within the homes 60, 62, 68, 70, 76, 78, 84 or 80 also produce user inbound data 144 or 148. The user inbound data 144 or 148 is data generated by a user who desires to transmit it to the communication network to another user via the power line node. Note that if the user is communicating from home to home within the local area network, the power line node may facilitate the switching of the data such that the data is not provided on the high-speed communication path 50 or 56. Similarly, if the initiating user and target user are supported by the same power line termination module, the power line termination module may provide the appropriate switching, and/or routing, to facilitate the communication.

Once a user has generated the user inbound data 144 or 148, it is processed by the power line gateway inbound section 168. The power line gateway inbound section 168 processes the data in accordance with the desired communication convention of the LAN and then modulates the process data in accordance with the modulation protocol of the LAN. The modulated data is provided to splitter 166 and then amplified by power amplifier 164. The amplified signal is placed on the power lines via the AC coupling module 162, which includes a pair of high voltage capacitors.

The power line node receives the user inbound modulated user data via the power lines and the AC coupling module 152, which provides the received signals to the power amplifier 154. The power amplifier 154 amplifies the received inbound modulated user data and provides the amplified data signals to the splitter 156. The splitter 156 separates the user inbound modulated data 144 or 148 from the inbound local area network data 140. The power line node outbound section 160 receives the modulated user data, demodulates it based on the modulation/demodulation protocol of the LAN to produce demodulated data. The outbound section then processes the demodulated data from the plurality of power line gateways based on the communication convention of the high-speed communication path 50–56. Once the data has been processed, the outbound section 160 places the data on the high-speed communication path 50–56 such that the power line termination module 16 subsequently receives it. Alternatively, the power line node may be coupled via the high-speed communication path to the communication network, such that the processed data is directly routed to the communication network.

As one of average skill in the art will appreciate, the communication convention used to transceive data via the high-speed communication path 50–56 between the power line nodes and the communication network and/or the power line termination module 16, may be a different communication convention from the one used within each of the local area networks. For example, the transmission of user inbound data 144 may utilize a CSMA type process while the data on the high-speed communication path 50–56 may utilize a frame relay communication convention, ATM communication convention, other data packetized communication convention, or a frame based communication convention. In addition, each local area network with the power line based communication system may use a different communication convention, however, the communication convention between the power line nodes and the power line termination module will be the same. Further, the modulation/demodulation protocol, which may be amplitude modulation, frequency modulation, frequency shift keying, phase shift keying, quadrature amplitude modulation, discrete multi-tone, orthogonal frequency division multiplexing, and code division multiple access, used in each LAN may be the same or varying from LAN to LAN.

Figure 5:
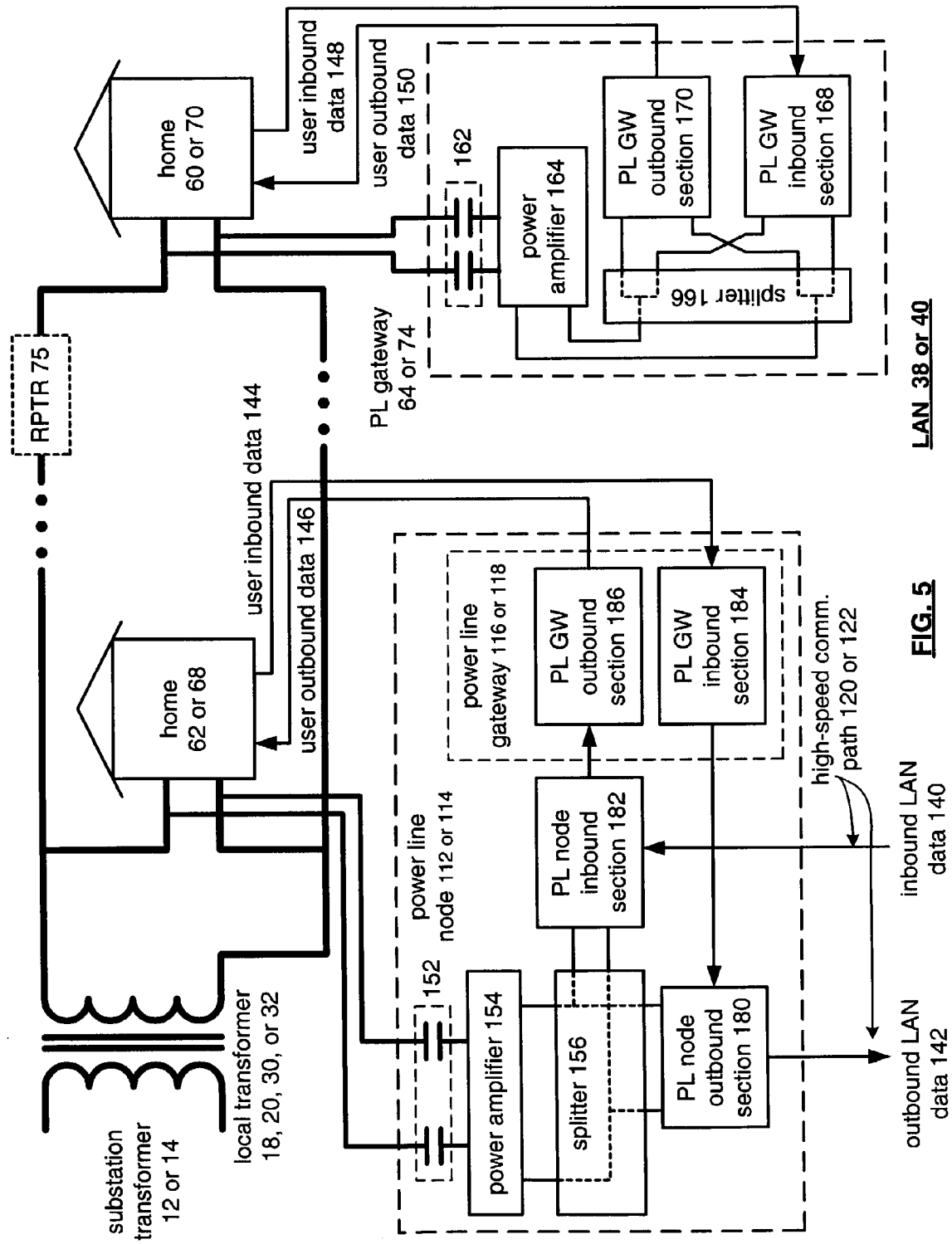
FIG. 5 illustrates a schematic block diagram of an alternate power line node and power line gateway in accordance with the present invention.

FIG. 5 illustrates a schematic block diagram of the local area network 38 or 40 of FIG. 3. In this illustration, power line node 112 includes a power line gateway 116 or 118 and is associated with home 62 or 68. In addition, the power line node 112 includes the AC coupling module 152, the power amplifier 154, the splitter 156, a power line node inbound section 182 and a power line node outbound section 180. The power line node inbound section 182 is operably coupled to the high-speed communication path 50–56 to receive inbound local area network data 140. The power line node inbound section 182 interprets the inbound local area network data 140 to determine whether any of the data is destined for a user within home 62 or 68. If so, the home's data is separated from the remainder of the LAN data and provided to the power line gateway 116. The power line gateway outbound section 186 processes the local area data for the user within home 60 or 62 and provides the user outbound data 146 to the home. The remainder of the inbound local area network data 140 is processed by the power line node inbound section 182 in a similar fashion as the inbound local area network data was processed by power line node inbound section 158 of FIG. 4.

The user at home 62 or 68 generates user inbound data 144. The power line gateway inbound section 184 of power line gateway 116 or 118 receives the user inbound data 144, processes it in accordance with the communication convention and provides it to the power line node outbound section 180. Alternatively, the power line gateway inbound section 184 passes the user outbound data 146 directly to the power line node outbound section 180. The power line node outbound section 180 processes the received user outbound data 146 with the other data it receives via the power lines, the AC coupling module 152, and the splitter 156. The functionality of the power line node output section 180 is similar to the functionality of the power line node output section 160 of FIG. 4.

The power line gateway 64 or 74 as shown in FIG. 5 functions in a similar way as the power line gateways discussed with reference to FIG. 4. As such, in this configuration, the power line node 112 or 114 is mounted to an individual home wherein the high-speed communication path 120 or 122 is provided directly to the home. As such, power companies may provide a single fiber optic line, or other high-speed communication link, to one home within a neighborhood supporting a power line node as opposed to running such high-speed communication links to each home in the neighborhood. The one high-speed communication link, via the power line node, supports the data needs of the entire neighborhood. By having one home directly coupled to a high-speed communication path as opposed to many, there is substantial installation cost savings. The cost savings in each neighborhood is achieved by having the power line node 112 or 114 and a plurality of power line gateways providing the final 100 feet, or so, of a communication system. In addition, many homes that are physically inaccessible, or physically difficult to reach, can now receive broadband communication services.

Figure 6:
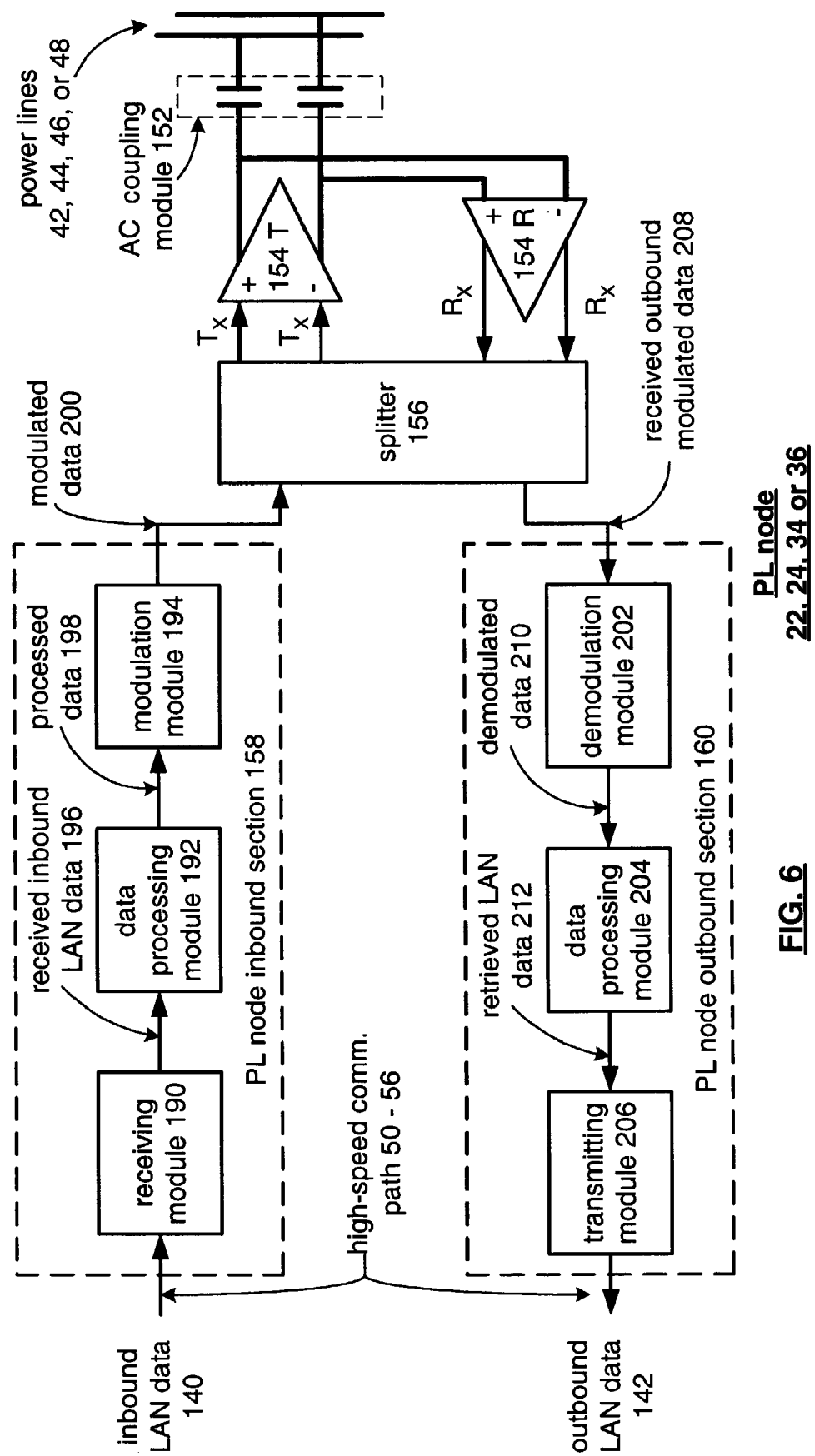
FIG. 6 illustrates a more detailed schematic block diagram of a power line node in accordance with the present invention.

FIG. 6 illustrates a more detailed schematic block diagram of power line nodes 22, 24, 34 or 36. As shown, the AC coupling module 152 includes a pair of high voltage capacitors, which have a capacitance value depending on the frequency of the modulated data. For example, frequencies in the kilohertz range may require a relatively large capacitor, in the range of 10 to 100 μF (micro Farads), whereas modulated data in the megahertz range would require capacitors in the nF (nano Farad) range. Each of the capacitors should have a sufficient voltage rating to withstand a voltage differential supported by the power lines. For example, if the power lines are supporting 240 volts, the voltage rating of the capacitor should be in excess of 240 volts.

As shown, the high voltage capacitors of the AC coupling module 152 directly couple the power lines 42, 44, 46, and 48, to the differential output of a transmit power amplifier 154T and to the inputs of a receiving power amplifier 154R. The receiving power amplifier 154R provides a differential output to the splitter 156. The splitter 156 also provides a differential input to the transmit power amplifier 154T. The splitter 156 outputs the received differential signal as the received output modulated data 208 to the power line node outbound section 160.

The power line node output section 160 includes a demodulation module 202, a data processing module 204, and a transmitting module 206. The demodulation module 202 receives the outbound modulated data 208, demodulates it to produce demodulated data 210. The demodulation module 202 uses a demodulation scheme that is dependent on the modulation scheme used to produce the modulated data 208. For example, the modulation, and hence the corresponding demodulation scheme, may be amplitude modulation, frequency modulation, frequency shift keying, phase shift keying, quadrature amplitude modulation, discrete multi-tone encoding, orthogonal frequency division multiplexing, spread spectrum modulation, and/or any technique for transmitting and/or receiving data using a carrier frequency or plurality of carrier frequencies.

The data processing module 204 receives the demodulated data 210 and processes it in accordance with the desired communication convention to produce retrieved local area network data 212. The communication convention may be time division multiplexing, frequency division multiplexing, CSMA, CSMA with collision avoidance, CSMA with collision detection, decryption, buffering, frame processing, data packetized information processing, and/or any other convention for conveying data through a switching fabric between users.

The transmitting module 206 receives the retrieved local area network data 212 and provides it as outbound local area network data 142 on the high-speed communication path. The transmit module 206 may include an electrical interface such as a connector, may include an electrical to an optical interface, may include buffering, and/or any means for transmitting optical and/or electrical signals.

The power line node inbound section 158 includes a receiving module 190, a data processing module 192, and a modulation module 194. The receiving module 190 is operably coupled to receive inbound local area network data 140 via the high-speed communication path 50–56. The receiving module 190 may include an electrical interface, an optical to an electrical interface, buffering, and/or any means for receiving optical and/or electrical signals. The data processing module 192 receives the inbound local area network data 196 and processes it in accordance with the communication convention to produce process data 198. As mentioned, the communication convention may be in accordance with frame relay processing, time division multiplexing, ATM data packetizing data, other data packetizing conventions, label switched networks, multiple protocol label switching, CSMA, CSMA with collision avoidance, CSMA with collision detection, encryption, and/or buffering.

The modulation module 194 receives the processed data 198 and produces there from modulated data 200. The modulation module 194 modulates the processed data in accordance with the modulation protocol used within the LAN. Such a modulation protocol includes amplitude modulation, frequency modulation, frequency shift keying, phase shift keying, quadrature amplitude modulation, discrete multi-tone modulation, orthogonal frequency division multiplexing, spread spectrum encoding, and/or any other modulation technique for placing a data signal onto a carrier frequency or a plurality of carrier frequencies.

The splitter 156 receives the modulated data 200 and provides it to the transmit power amplifier 154T. The power amplifier 154T produces a differential output that is provided to the AC coupling module 152. The amplified modulated data 200 is then placed on power lines 42, 44, 46 or 48, which may be received by one or more of the power line gateways coupled to the respective power lines.

Figure 7:
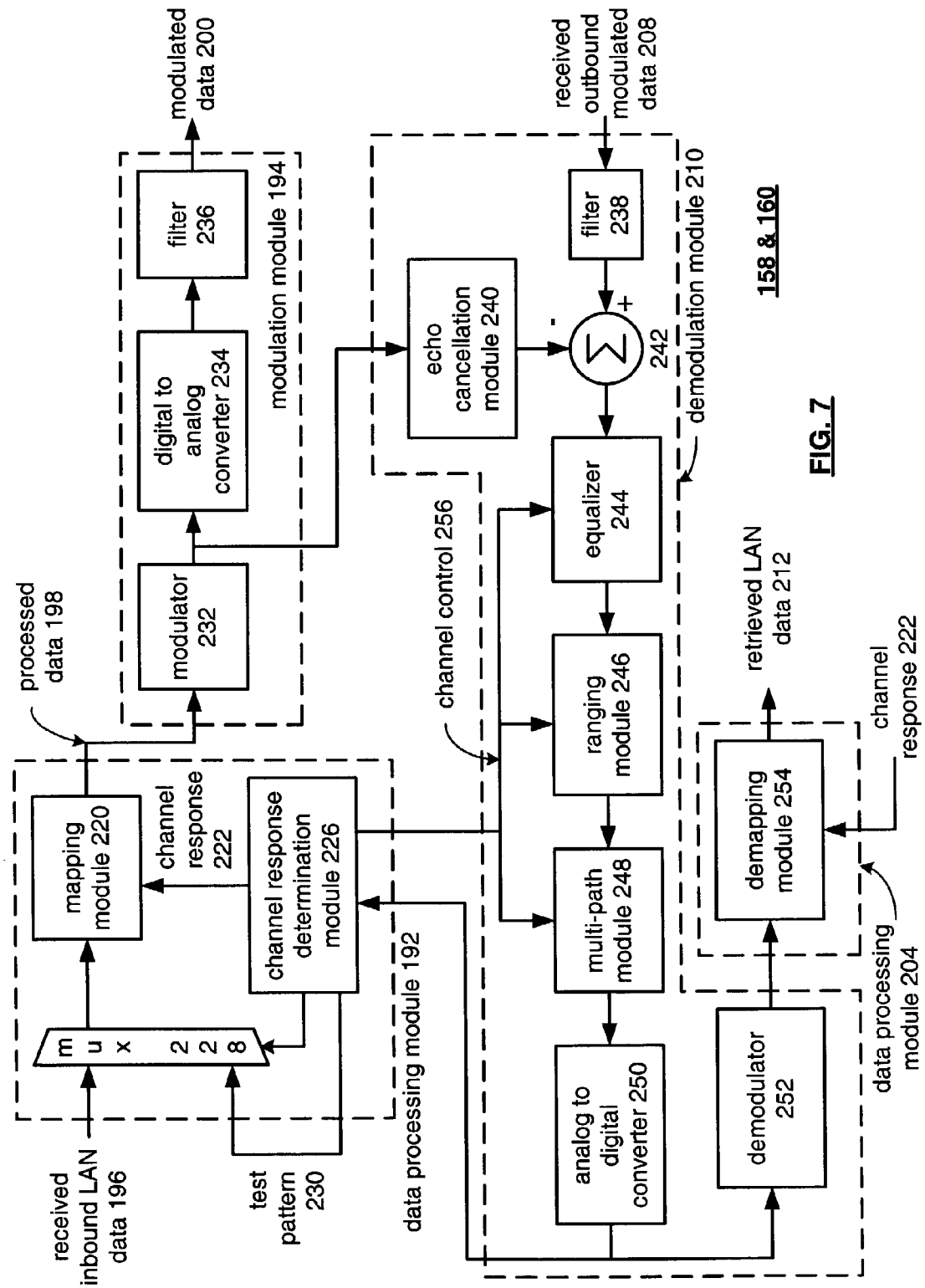
FIG. 7 illustrates a detailed schematic block diagram of a portion of the power line node of FIG. 6.

FIG. 7 illustrates a more detailed schematic block diagram of an embodiment of the power line node inbound section 158 and power line node outbound section 160 of FIG. 6. As shown, the data processing module 192 of the inbound section 158 includes a multiplexer 228, a channel response determination module 226 and a mapping module 220. The multiplexer 228 is controlled by the channel response determination module 226 to output either received inbound local area network data 196 or test pattern data 230. In normal operation, the multiplexer 228 will output the received inbound local area network data 196. In test mode and/or set-up mode, the channel response determination module 226 produces test patterns 230 (i.e., known signals), which are outputted by multiplexer 228. The test patterns are generated to enable the channel response determination module 226 to determine the frequency characteristics of the power lines within the local area network.

The mapping module 220 receives the inbound LAN data 196 or the test pattern 230 and maps the data into frequency bins based on the channel response 222 of the power lines. The mapped, or processed, data 198 is then provided to the modulation module 194. The functionality of the data processing module 192 will be described in greater detail with reference to FIGS. 8 and 9.

The modulation module 194 includes a modulator 232, a digital to analog converter 234, and a filter 236. The modulator 232 modulates the processed data 198 in accordance with the modulation protocol incorporated by the local area network. The modulated data is then converted to an analog signal via the digital to analog converter 234. The analog signal is then filtered via filter 236 and provided as modulated data 200. The output of modulator 232 is also provided to an echo cancellation module 240 of the demodulation module 210.

The demodulation module 210 includes a filter 238, a summing module 242, the echo cancellation module 240, an equalizer 244, a ranging module 246, a multipath module 248, an analog to digital converter 250, and a demodulator 252. The data processing module 204 includes a demapping module 254. The demodulation module 210 may further include an error correction module that provides CRC verification, forward error correction, and/or any other type of conventional error correction to compensate for impulse noise, line variations, etc.

The filter 238 is operably coupled to filter the outbound modulated data 208. The summing module 242 subtracts the modulated data 200 via the echo cancellation module 240 from the filtered outbound modulated data 208. As one of average skill in the art will appreciate, the magnitude of the modulated data 200 will in many cases be substantially greater than the magnitude of the outbound modulated data 208. Thus, echo cancellation is required to accurately interpret the outbound modulated data 208.

The equalizer 244 is operably coupled to receive the output of summing module 242 and is programmed by the channel response determination module 226 via a channel control signal 256 to equalize the magnitude of the signals in the frequency bins across the frequency of interest. As one of average skill in the art will appreciate, carrier frequencies having lower frequencies typically have a greater magnitude when transmitted over a distance than carrier frequencies having higher frequencies. In addition, environmental conditions cause variations in the performance of the power lines such that such frequency bins may have varying amplitudes. Accordingly, the equalizer 244 is programmed based on the channel response determination module to equalize the energies within the frequency bins across the frequencies of interest. The channel response determination module 226 determines the channel control signal 256 for the equalizer based on the processing of the test patterns 230 when received via the demodulation module 210.

The ranging module 246 is programmed via the channel response determination module 226 via the channel control signal 256 to account for impedance variations of the loading on the power line.

The multipath module 248 is operably coupled to receive the output of the ranging module 246 to provide for compensation for multipath errors on the power lines. The level of error correction is based on a channel control signal 256 as determined by the channel response determination module 226. As one of average skill in the art will appreciate, the demodulation module 210 may include one or more of the equalizer, ranging module 246 and multipath module 248. If the demodulation module 210 includes each of these elements, the control channel signal 256 will include separate signaling for each of these modules such that each module may be separately programmed. The correction for multipath error, ranging, and equalization of signals is known, thus no further discussion will be presented except to facilitate the understanding of the present invention. As one of average skill in the art will further appreciate, the power lines may be pre-tested (i.e., prior to the installation of the power line node and associated power line gateways), using a device that includes the channel response module 226, the equalizer 244, the ranging module 246, and/or the multi-path module 248. By pre-testing the response of the power lines, the elements of the power line node and power line gateways may be tuned to provide more reliable initial operation.

The analog to digital converter 250 receives the output of the multipath module 248 and produces a digital representation thereof. The digital representation is provided to the channel response determination module 226 and to demodulator 252. The demodulator 252 demodulates the digital signal based on a demodulation protocol, which corresponds to the modulation protocol utilized to produce the modulated data 200, to retrieve the data. The demodulated data is provided to the demapping module 254, which, based on the channel response 222, produces the retrieved local area network data 212.

Figure 8:
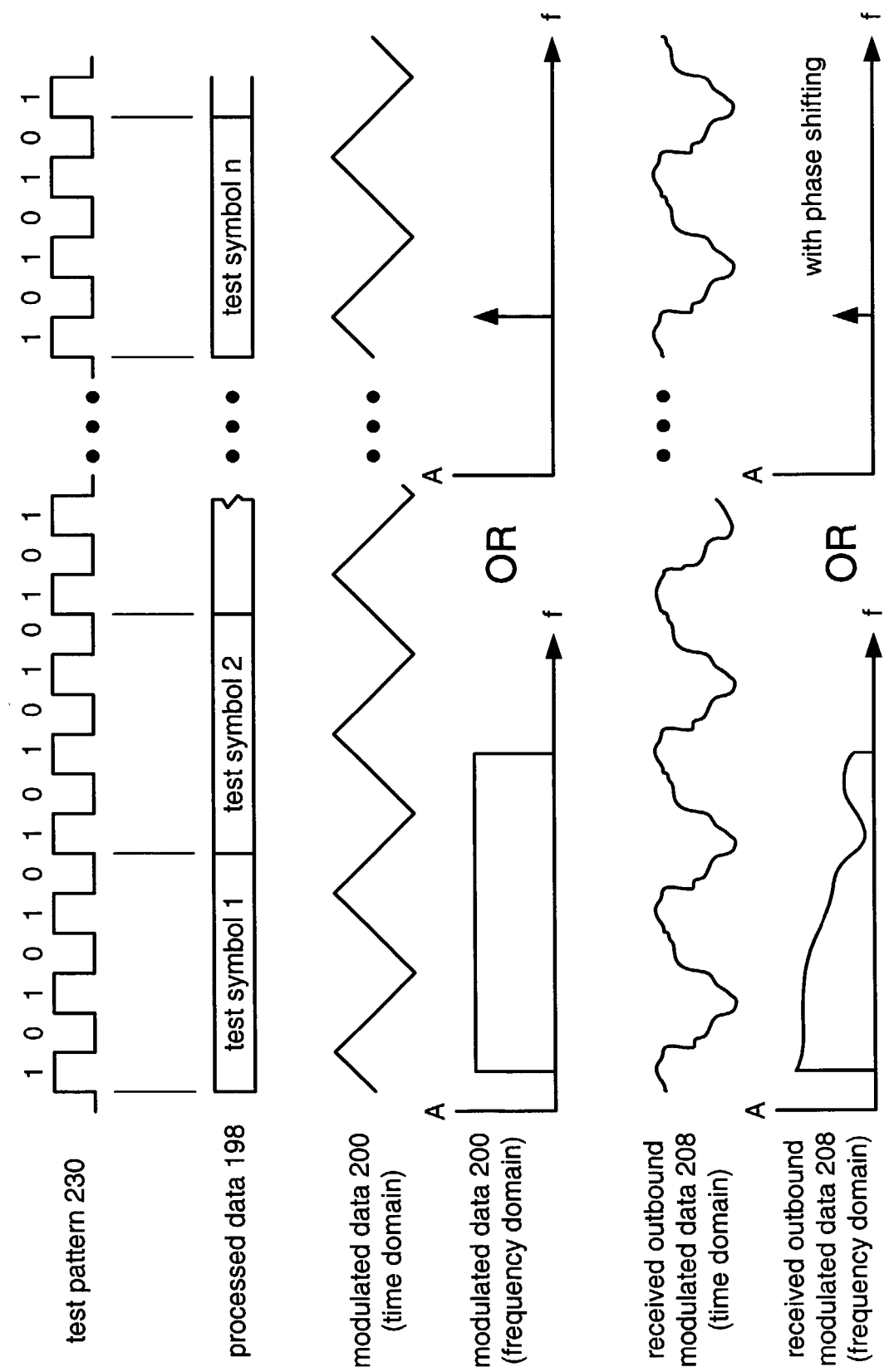
FIGS. 8 and 9 illustrate a graphical representation of the general operation of the power line node in accordance with the present invention.
Figure 9:
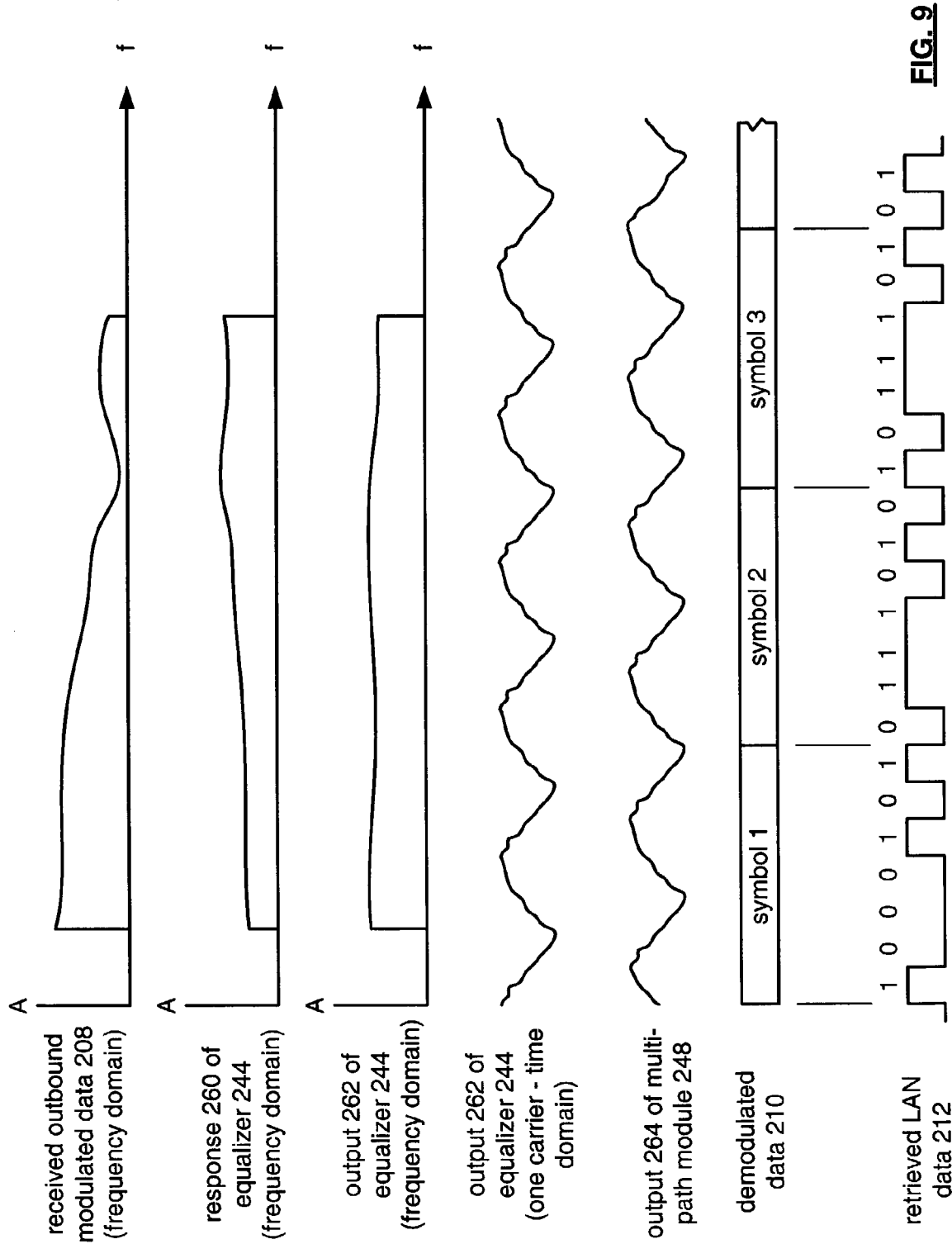

FIGS. 8 and 9 illustrate a graphical representation of the operation of the circuit of FIG. 7. As shown in FIG. 8, a test pattern 230 is generated to include a series of bits, which may be representative of a pulse tone similar to the training sequences used in DSL modem-central office interaction. The mapping module 220, based on the channel response 222, produces processed data 198. In essence, the mapping module 220 maps the data of the test pattern 230 into test symbols identified by test symbol 1, test symbol 2, through test symbol n. The test symbols may be formatted in accordance with frame relay transmissions, data packetized transmissions, and/or label switching data packets.

The processed data 198 is modulated into an analog signal via the modulation module 194. The modulated data 200 is shown in the time domain for a single carrier frequency. If the modulation scheme utilizes a plurality of frequency bins, each frequency bin would have its own analog signal having a unique frequency. This is shown as the time domain representation of the modulated data 200. The modulated data 200 is also shown in the frequency domain. The $1^{st}$ representation of the frequency domain illustrates the modulated data 200 spanning a multitude of frequencies (e.g., 1 MHz to 10 MHz). The range of frequencies includes a plurality of frequency bins for transporting the processed data 198 once modulated. Conversely, if the modulation scheme incorporates a single carrier frequency, the frequency domain representation of the modulated data 200 is shown in the right portion of the figure. As one of average skill in the art will appreciate, if the mapping module processes the received inbound local area network data 196, the processed data 198 will include symbols representing the inbound local area network data 196 as opposed to the test symbols representing the test pattern 230. The representation of the modulated data in the time and frequency domain will be similar.

In the test mode, the plurality of power line gateways may echo back the test patterns received from the power line node, or may generate their own test patterns to transmit to the power line node. In either situation, the demodulation module 210 receives the outbound modulated data 208. The outbound modulated data 208 is shown in both the time and frequency domains. As shown in the time domain, the triangular waveform of the modulated data 200 has been distorted into a triangle-like shape signal due to distortion caused by the characteristics of the power line. The frequency domain representation of the modulated data 208 has the amplitude, or available bits per carrier frequency, vary with respect to the frequency. If the modulation, and corresponding demodulation technique utilizes a single carrier frequency, the frequency domain representation of the output modulated data 208 would appear on the right and have some corresponding phase shifting.

The channel response determination module 226 receives the outbound modulated data 208 via the analog to digital converter. Based on the difference between the modulated data 200 and the received outbound modulated data 208 during the test condition, the channel response determination module 206 generates the channel control signal 256 for the equalizer 244, the ranging module 246 and/or the multipath module 248. In addition, the channel response determination module 226, based on the frequency domain of the output modulated data, generates the channel response information 222 that is used by the mapping module 220. For instance, as shown in FIG. 8 with respect to the frequency domain representation of the outbound modulated data 208, the amplitude of the signal drops dramatically as the frequency increases such that the bit capacity with bins in that frequency range may be unusable. As such, the channel response information provided to mapping module 220 would indicate that the bins in this frequency range would not carry data or would carry a minimal amount of data.

FIG. 9 illustrates a portion of the demodulation module 210 after the equalizer 244, ranging module 246, and multipath module 248 have been programmed via the channel response determination module 226. As shown at the top of FIG. 9, the received outbound modulated data in the frequency domain is represented. Based on this information, the channel response determination module 226 determines the response 260 of the equalizer 244. This is shown in the frequency domain. By applying the response 260 of equalizer 244 to the received outbound modulated data 208, the output 262 of equalizer 244, in the frequency domain, is more linear. This is represented as the output 262 of equalizer 244. If the modulation and corresponding demodulation scheme utilizes a single carrier frequency, the output 262 of equalizer 244 is shown in the time domain. In this example, the output of equalizer 262 is more representative of a triangular waveform, which corresponds to the modulated data 200. Note that the ranging module 246 adjusts the reflected impedance of the demodulation module 210 based on the impedance of the power line.

The multipath module 248 corrects for multipath error, which distorts the signal. As such, the multipath modulator 248 corrects for phase shifting irregularities and distortion due to multipath error. The single carrier time domain representation of the output of multipath module 248 is shown as output 264. The analog signals, or signals of the modulated data 208, after being processed by the equalizer 244, the ranging module 246 and/or the multipath module 248, are converted into a digital signal via the analog to digital converter 250. The demodulator 252 demodulates the digital signals to produce the demodulated data 210. The demodulated data is represented by symbols 1, 2, 3, et cetera. The demapping module 254 receives the demodulated data 210 represented by symbols to produce the retrieved local area network data 212.

Figure 10:
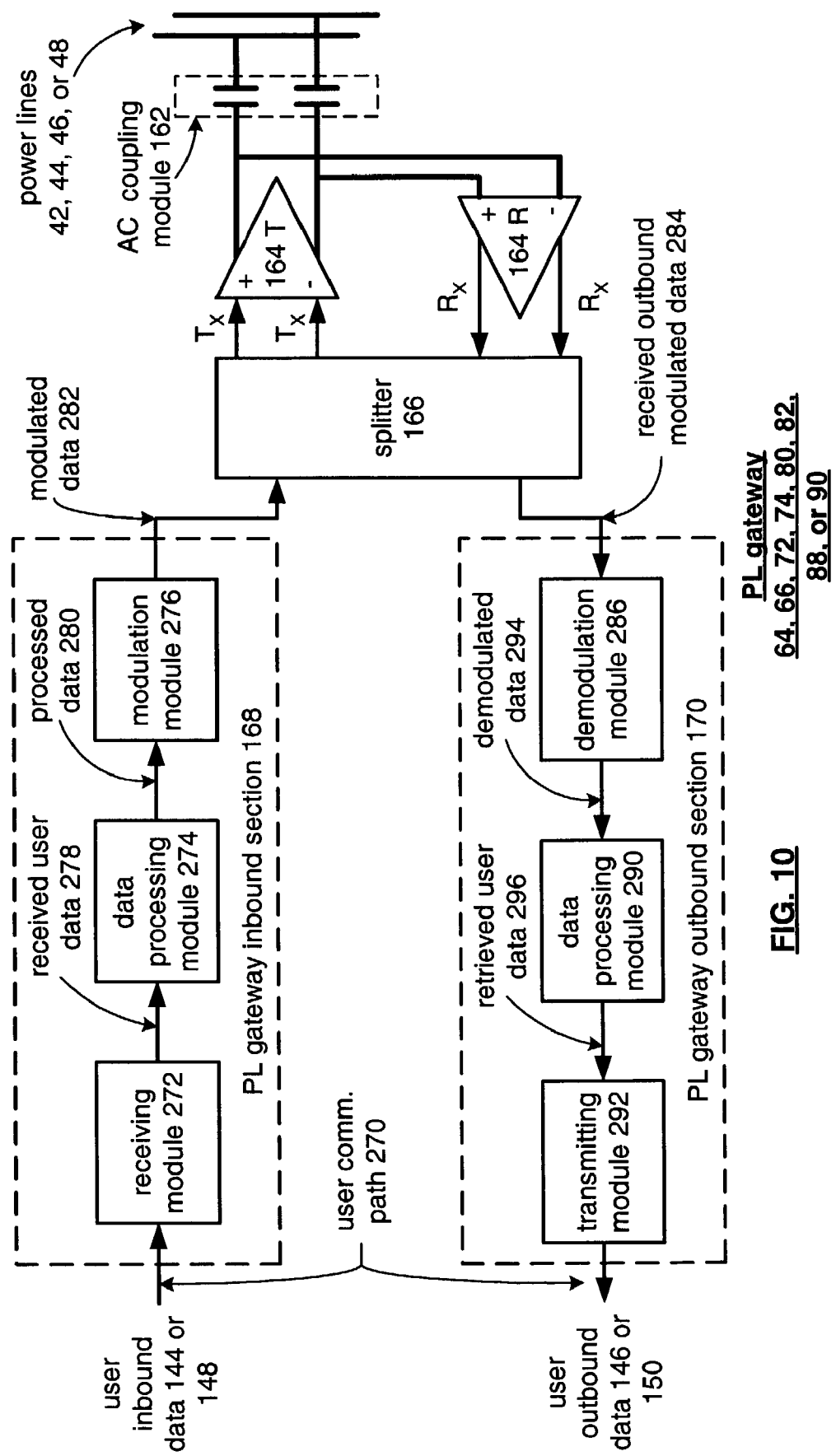
FIG. 10 illustrates a schematic block diagram of a power line gateway in accordance with the present invention.

FIG. 10 illustrates a graphical representation of the power line gateways 64, 66, 72, 74, 80, 82, 88 or 90. The gateway includes a power line gateway inbound section 168, a power line gateway outbound section 170, a splitter 166, Tx and Rx power amplifiers 164T and 164R, and an AC coupling module 162. The power line gateway inbound section 168 includes a receiving module 272, a data processing module 274, and a modulation module 276. The receiving module 272, which may be an electrical interface, an optical to electrical interface, and/or a buffer, receives the user inbound data 144 or 148 via a user communication path 270. The user communication path may be an in-home system, phone lines, Ethernet connection, direct connect, wireless connection, and/or any mechanism within a home to couple data to a device outside of the home.

The data processing module 274 receives the inbound user data 278 and processes it in accordance with the desired communication convention to produce the processed data 280. This module is a VLAN Switch, with a subset protocol defined in the IEEE 802.1Q and IEEE 802.1P.

The modulation module 276 receives the processed data 280 and produces there from modulated data 282. The modulation module 276 utilizes a modulation protocol to produce the modulation data. The modulation protocol is as previously discussed which may be, but is not limited to, amplitude modulation, frequency modulation, frequency shift keying, phase shift keying, quadrature amplitude modulation, discrete multi-tone modulation, orthogonal frequency division multiplexing, spread spectrum encoding, and/or any other technique for modulating data on a carrier frequency or a plurality of carrier frequencies.

The splitter 166 receives the modulated data 282 and provides it to the transmit power amplifying 164T. The power amplifier 164T produces a differential output that is provided to the AC coupling module 162. The AC coupling module 162 includes a pair of high voltage capacitors that provide AC coupling of the output of the power amplifier 164T to power lines 42, 44, 46 or 48.

In addition, the AC coupling module 162 provides AC coupling of modulated data on power lines 42, 44, 46 and 48 to the inputs of the receive power amplifier 164R. The differential output of received power amplifier 164R is provided to splitter 166. The splitter 166 provides the received outbound modulated data 284 to the power line gateway outbound section 170.

The power line gateway outbound section 170 includes a demodulation module 286, a data processing module 290, and a transmitting module 292. The demodulation module 286 receives the received outbound modulated data 284 and demodulates it based on the modulation/demodulation protocol. The data processing module 290 receives the demodulated data 294 and processes it in accordance with the desired communication convention to produce retrieved user data 296. The transmitting module 292 provides the retrieved user data 296 as user outbound data 146 or 150 to the user via the user communication path 270.

Figure 11:
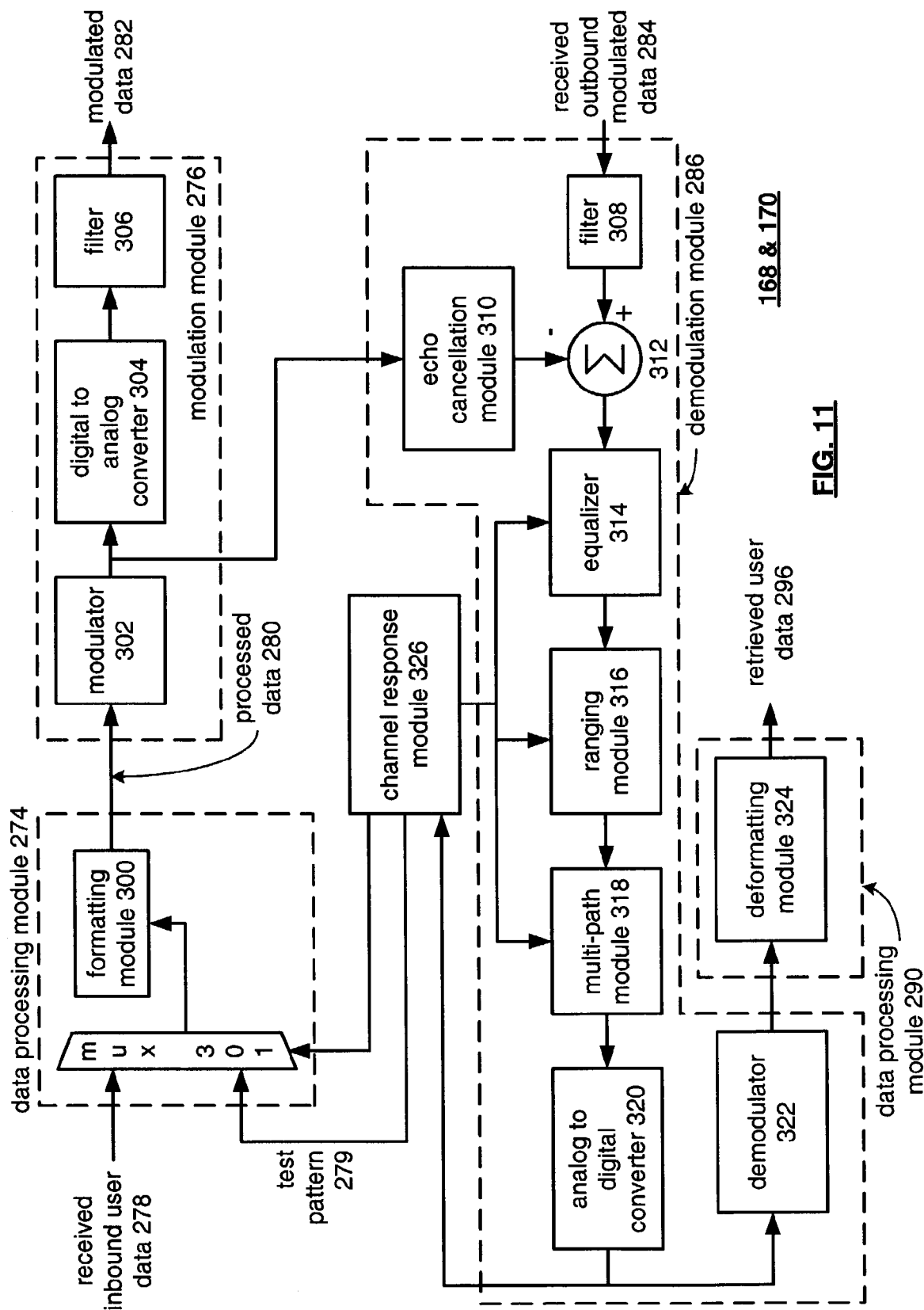
FIG. 11 illustrates a more detailed schematic block diagram of a portion of the power line gateway of FIG. 10.

FIG. 11 illustrates a more detailed schematic block diagram of the power line gateway inbound section 168 and power line gateway outbound section 170 of FIG. 10. As shown, the data processing module 274 includes a multiplexer 301 and a formatting module 300. The multiplexer 301 is operably coupled to receive either received inbound user data 278 or test pattern data 279. The selection is based on an input received via the channel response module 326. The channel response module 326 functions in a similar manner as the channel determination module 226 of FIG. 7. In normal mode, the multiplexer 301 outputs the received inbound user data 278. In test mode, (i.e., in a mode to determine the characteristics of the power lines) the multiplexer 301 outputs the test patterns 279.

The formatting module 300 is operably coupled to receive the output of multiplexer 301 and format the data to produce processed data 280. The formatting of the data is in accordance with the communication convention used within the local area network. For example, the formatting may be data packetizing the data, placing the data in a corresponding time frame, and/or any other communication convention for relaying data via a switching fabric.

The modulation module 276 includes a modulator 302, a digital to analog converter 304 and a filter 306. The modulator 302 is operably coupled to receive the processed data 280 and produce there from modulated data. The digital to analog converter 304 converts the modulated data into an analog signal that is filtered and outputted as the modulated data 282.

The demodulation module 286 includes a filter 308, an echo cancellation module 310, a summing module 312, an equalizer 314, a ranging module 316, a multipath module 318, an analog to digital converter 320, and a demodulator 322. The functionality of these elements, as well as the functionality of the channel response module 326, is similar to the functionality of corresponding elements of the demodulation module 210 as shown in FIG. 7. While the functionalities are similar, each power line gateway will determine its own channel response characteristics to provide the necessary equalization for equalizer 314 as well as separate multipath error correction and ranging functions.

The data processing module 290 includes a deformatting module 324 that deformats the data to produce the retrieved user data 296. The deformatting used by deformatting module 324 is the inverse of the protocol used by formatting module 300.

Figure 12:
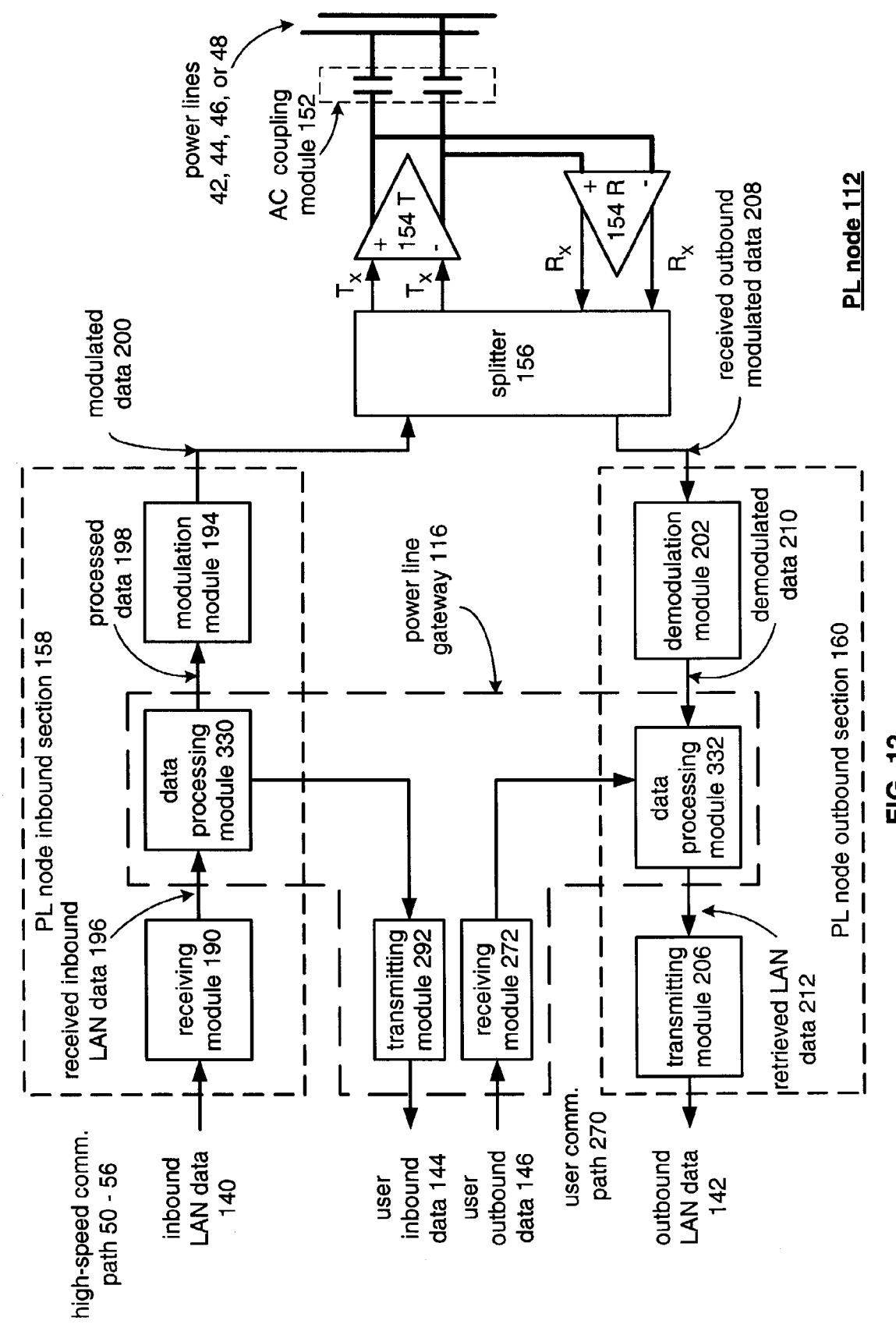
FIG. 12 illustrates a schematic block diagram of an alternate power line node in accordance with the present invention.

FIG. 12 illustrates a schematic block diagram of the power line node 112 of FIG. 5. The power line node 112 includes a power line node inbound section 158, a power line gateway 116, a power line node outbound section 160, splitter 156, transmit and receive power amplifiers 154T and 154R, and an AC coupling module 152. The functionality of splitter 156, power amplifiers 154 and AC coupling module 152 are as previously described.

The power line node inbound section 158 includes a receiving module 190, data processing module 330, and modulation module 194. The receiving module 190 and the modulation module 194 functions in a similar manner as the same reference numbered modules of FIG. 6. The data processing module 330 is included within the power line node inbound section 158 as well as within the power line gateway 116. In operation, the data processing module 330 will identify the user inbound data 144 contained within the inbound local area network data 140. When the data processing module 330 recognizes the user inbound data 144, it provides the data to the transmitting module 292. As such, the user inbound data 144 is not modulated nor is it propagated onto the power lines. The remainder of the inbound local area network data 140 is processed to produce the processed data 198 and propagated via the modulation module 194, splitter 156, power amplifier 154T and AC coupling module 152 onto the power lines.

The power line node outbound section 160 includes a demodulation module 202, a data processing module 332, and a transmitting module 206. The transmitting module 206 and demodulation module perform in a similar fashion as like referenced elements of FIG. 6. The data processing module 332 is operably coupled to receive demodulated data 210 via the demodulation module 202 and user outbound data 146 via the receiving module 272. The data processing module 332 processes the user outbound data 146 and the demodulated data 210 to produce retrieved local area network data 212. The retrieved local area network data 212 is outputted via transmitting module 206 as output local area network data 142.

The transmitting module 292 and receiving module 272 communicate via the user communication path 270 with the affiliated user of the power line node 112. As one of average skill in the art will appreciate, by incorporating the power line node 112 as shown in FIG. 12, the power line node 112 may be mounted at the home of a user. As such, fiber, or other high-speed communication path, is routed to one individual home within a local area network, or neighborhood, where the power line node 112 provides the conduit for high-speed communications for other homes within the neighborhood via the power lines without the need for installation of high-speed communication paths to each of the homes in the local area network. Since a substantial portion of the cost of installing a communication system is the equipment of the last 100 feet, the power line node and power line gateways of the present invention substantially reduce the cost of bringing broadband communications to users that already have electricity.

Figure 13:
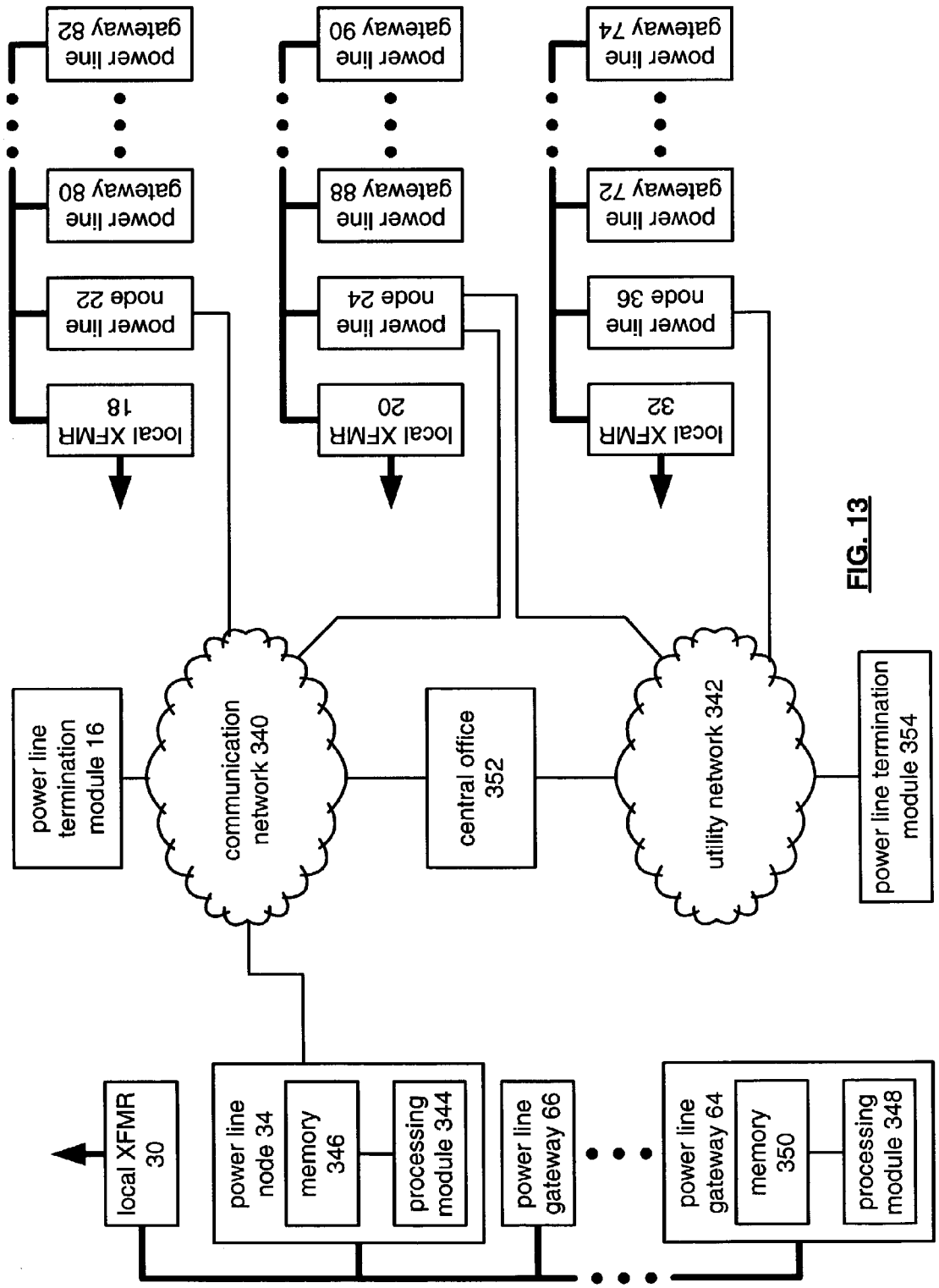
FIG. 13 illustrates a distributed power line based communication system in accordance with the present invention.

FIG. 13 illustrates a schematic block diagram of a distributed power line base communication system. The power line base communication system includes a communication network 340, a utility network 342, a central office 352, a plurality of power line termination modules 16 and 354, a plurality of power line nodes 34, 22, 24 and 36, a plurality of local distribution transformers 18, 20, 30 and 32, and a plurality of power line gateways 64, 66, 72, 74, 80, 82, 88 and 90. In this configuration, the power line nodes 22, 24, 36, 34 and 36 are coupled via a high-speed communication path to the communication network 340 and/or the utility network 342. The communication network 340 may be the Internet, wide area network, wireless communication system, public switch telephone network, Ethernet network, and/or any other type of networking system.

The utility network 342 is a communication network private to a utility company or power company used to communicate with substations, local distribution transformers, and other nodes within a power system throughout a geographic region. The central office 352 coordinates the communication throughout the communication system of FIG. 13. Each of the power line termination modules 16 and 354 supports a portion of the system of FIG. 13.

Each of the power line nodes includes a processing module 344 and memory 346. The processing module 344 may be a single processing device or a plurality of processing devices. Such a processing device may be a microprocessor, micro controller, digital signal processor, state machine, logic circuitry, programmable gate array, analog circuitry, and/or any device that manipulates signals (analog or digital) based on operational instructions. The memory 346 may be a single memory device or a plurality of memory devices. Such a memory device may be a read only memory, random access memory, re-programmable memory, system memory, magnetic tape memory, and/or any device that stores digital information. Note that when the processing module implements one or more of its functions via a state machine, logic circuitry, and/or analog circuitry, the memory storing the corresponding instructions is embedded within the circuitry comprising the state machine, logic circuitry, and/or analog circuitry. The operational instructions stored in memory 346 and performed by processing module 344 are discussed in greater detail with reference to FIGS. 18 through 20.

Each of the power line gateways includes a processing module 348 and memory 350. The processing module 348 may be a single processing device or a plurality of processing devices. Such a processing device may be a microprocessor, micro controller, digital signal processor, state machine, logic circuitry, programmable gate array, analog circuitry, and/or any device that manipulates signals (analog or digital) based on operational instructions. The memory 350 may be a single memory device or a plurality of memory devices. Such a memory device may be a read only memory, random access memory, re-programmable memory, system memory, magnetic tape memory, and/or any device that stores digital information. Note that when the processing module implements one or more of its functions via a state machine, logic circuitry, and/or analog circuitry, the memory storing the corresponding instructions is embedded within the circuitry comprising the state machine, logic circuitry, and/or analog circuitry. The operational instructions stored in memory 350 and performed by processing module 348 are discussed in greater detail with reference to FIGS. 18 through 20.

As configured, a power line node may have a high-speed communication path to the communication network 340 and/or to the utility network 342. In this manner, the power line termination module 16 and/or 354 coordinates the communication via local area networks utilizing networks 340 and/or 342.

Figure 14:
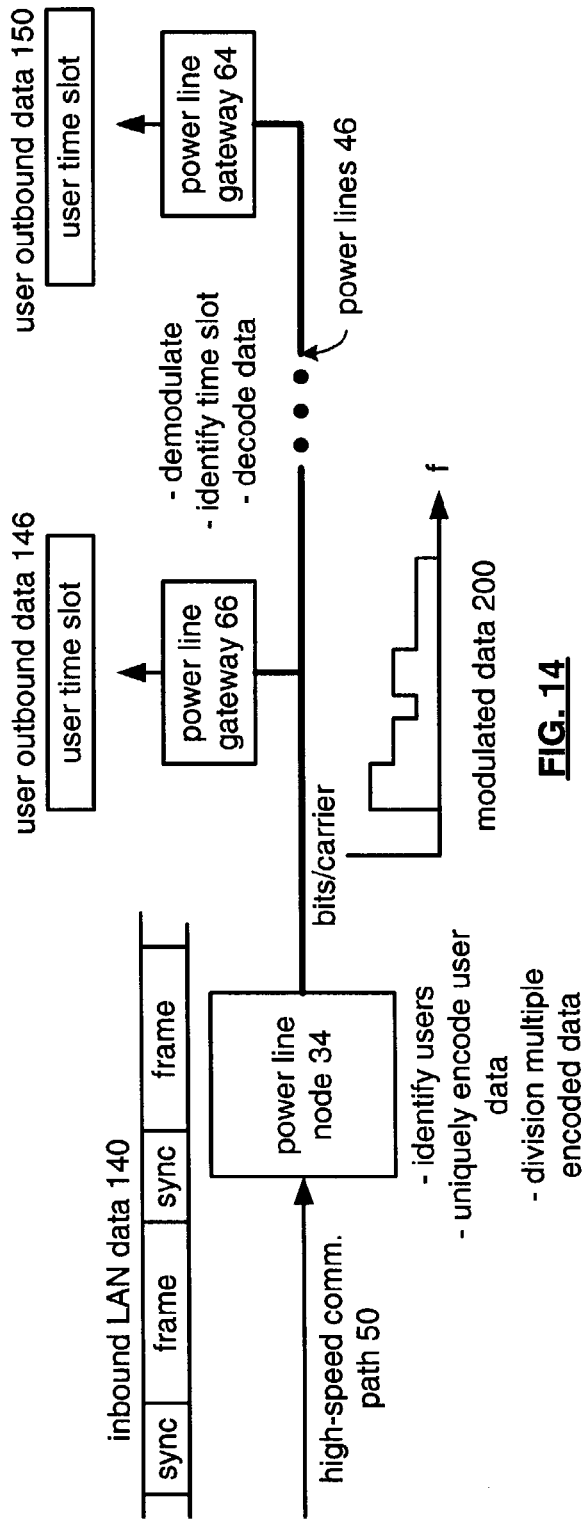
FIG. 14 illustrates a graphical representation of processing inbound local area network data in accordance with the present invention.

FIG. 14 illustrates a graphical representation of processing of inbound local area network data 140 when the data is formatted in accordance with IEEE 802.1Q VLAN. As shown, the inbound local area network data 140 includes frame sync information and data within a frame. The power line node 34 receives the inbound local area network data 140 via the high-speed communication path 50. The power line node 34 identifies the users, and/or addressees, within the frame of information based on time slot allocations within the frame. Having identified each user and its corresponding data, the power line node 34 uniquely encodes the data based on the users individual encoding and/or encryption mechanism. The data is then time and/or frequency division multiplexed and transmitted as modulated data 200 via the power lines 46 to the power line gateways 66 and 64. The modulated data will have a varying bit per carrier ratio over the frequency range of interest. This is illustrated as the modulated data 200.

Each of the gateways 64 and 66 will demodulate the modulated data 200 and identify its corresponding timeslot for its respective user. Having done this, the data is decoded and/or decrypted based on the individual encoding and/or encryption of the individual user to retrieve the data contained within the user's timeslot or slots. Such data is then presented as user outbound data 146 or 150 to the respective user.

Figure 15:
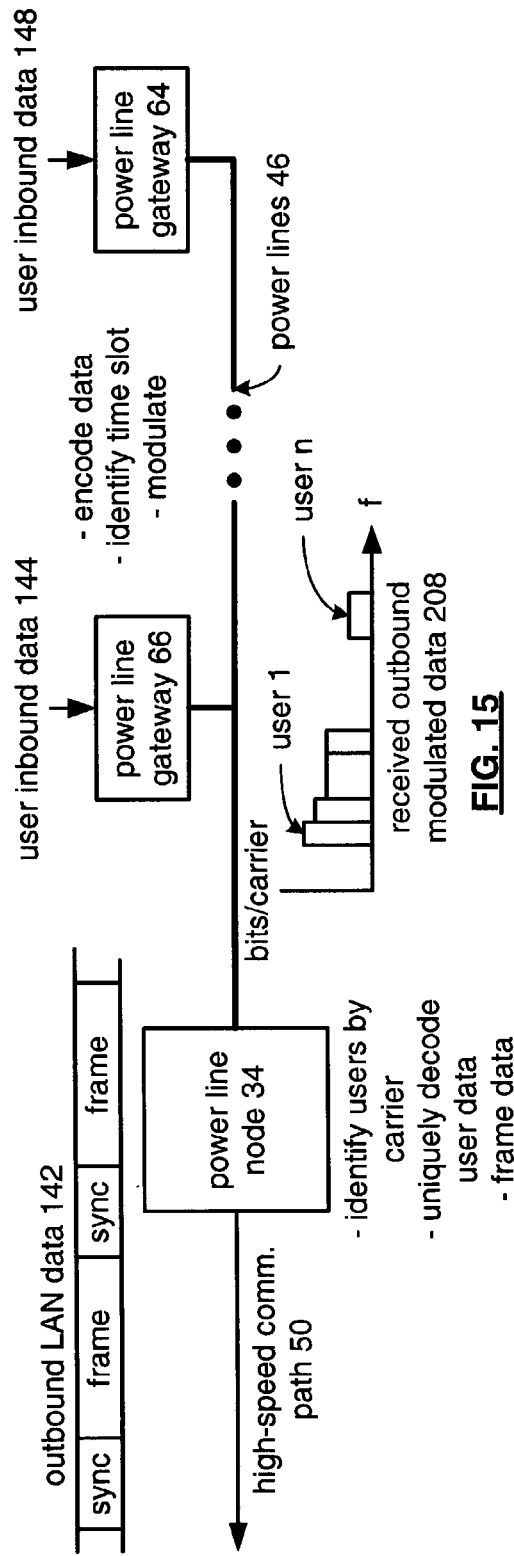
FIG. 15 illustrates a graphical representation of processing outbound local area network data in accordance with the present invention.

FIG. 15 illustrates a graphical representation of processing outbound local area network data 142 by power line node 34. As shown, the outbound local area network data 142 is organized as frames of data. Each frame is separated by frame syncing information such that the alignment of frames can be readily obtained to ensure proper transmission of data. The outbound local area network data 142 is transmitted via the high-speed communication path 50. In this example, each of the power line gateway 64 and 66 receive user inbound data 144 or 148. The user inbound data is encoded utilizing a unique encoding and/or encryption scheme for the individual users. The encrypted data is then placed in a corresponding timeslot or slots for the individual user and the data is modulated to produce the modulated data 200. In one embodiment, each power line gateway 66 may have a corresponding frequency bin or plurality of frequency bins to provide its modulated data to the power line node 34. Alternatively, each of the power line gateways 64 will transmit its data in a particular time increment utilizing the entire frequency spectrum allocated for demodulated data 200.

The power line node 34 identifies the users by the carrier frequencies, and/or the time of the data being received. The data is then decoded utilizing the unique decoding scheme and/or decryption scheme for the individual users. The user data is then placed into frames according to timeslot allocations and provided as the output local area network data 142.

Figure 16:
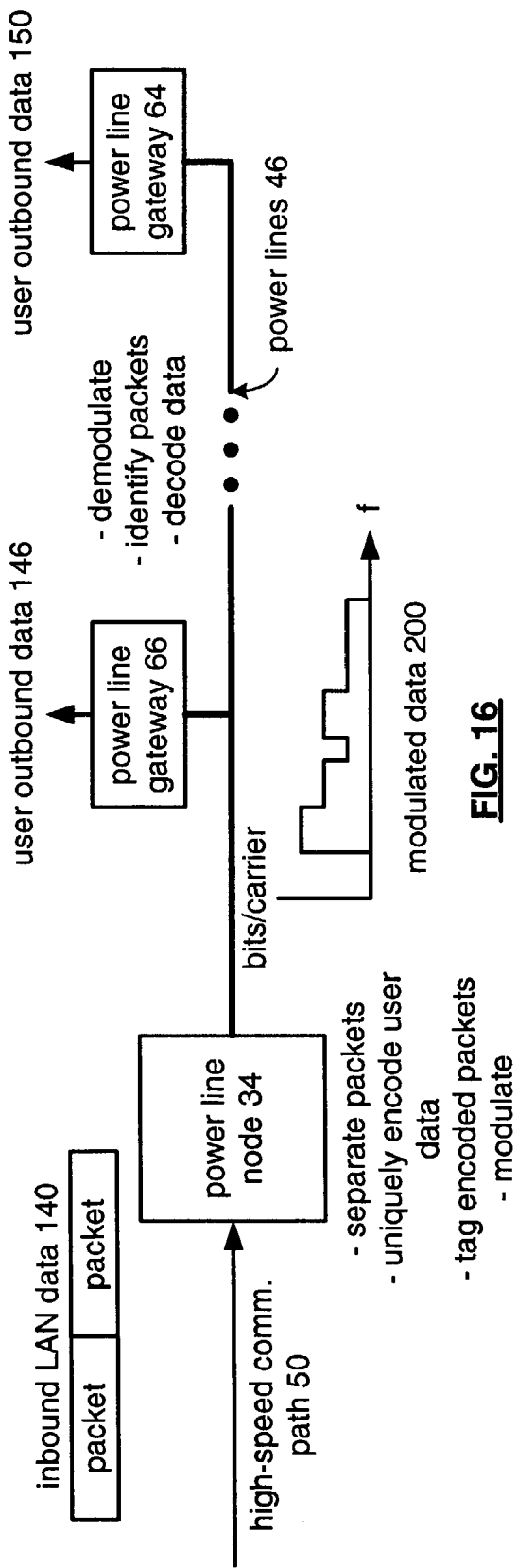
FIG. 16 illustrates a graphical representation of processing inbound local area network data in accordance with the present invention.

FIG. 16 illustrates a graphical representation of the power line node 34 processing inbound local area network data 140 when the data 140 is data packetized data. In this example, the power line node 34 receives the data packets of data via the high-speed communication path 50 using orthogonal frequency division multiplexing (OFDM). The power line node 34 separates the data packets to identify the individual addressees of the data. Utilizing a unique encoding and/or encryption scheme for each user, the separated data is encoded. The encoded data packet for each user is then tagged and modulated. The modulated data 200 is provided on power lines 46 to power line gateways 64 and 66.

Each of the power line gateways 64 and 66 demodulates the received modulated data 200 to retrieve the data packets of data. The data packets of data are then identified to determine whether they are addressed for the individual user associated with the power line gateway. If so, the corresponding data packets are decoded and/or decrypted to retrieve the user outbound data 146 or 150.

Figure 17:
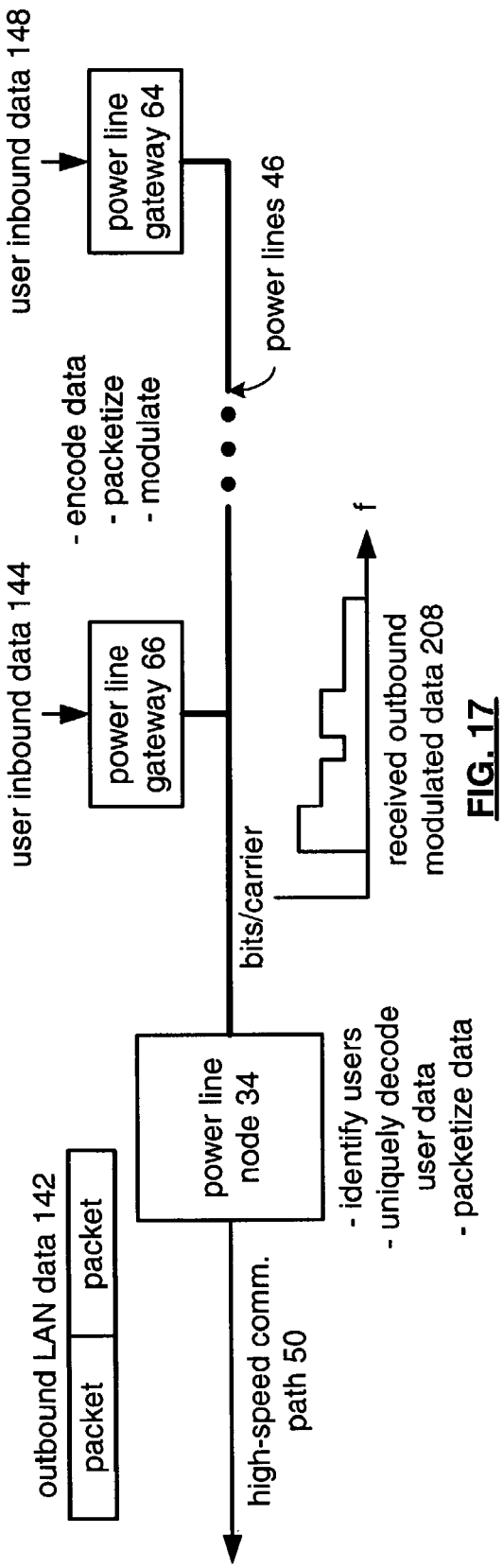
FIG. 17 illustrates an alternate graphical representation of processing outbound local area network data in accordance with the present invention.

FIG. 17 illustrates a graphical representation of producing outbound local area network data 142 in a data packetized format. In this illustration, each of the power line gateways 64 and 66 receive user inbound data 144 or 148 via its corresponding user. Each power line gateway 64 encodes the corresponding data, packetizes it and then modulates it onto power lines 46. The transmission of the modulated data onto the power lines 46 may be done in a CSMA manner, and/or time allocated manner.

The power line node 34 receives the outbound modulated data 208 and identifies the particular users. Having identified the particular users, the data is decoded and/or decrypted based on the individual encoding and/or encryption scheme for the corresponding user. The data for the local area network is then data packetized and placed on the high-speed communication path 50 as the outbound local area network data 142.

Figure 18:
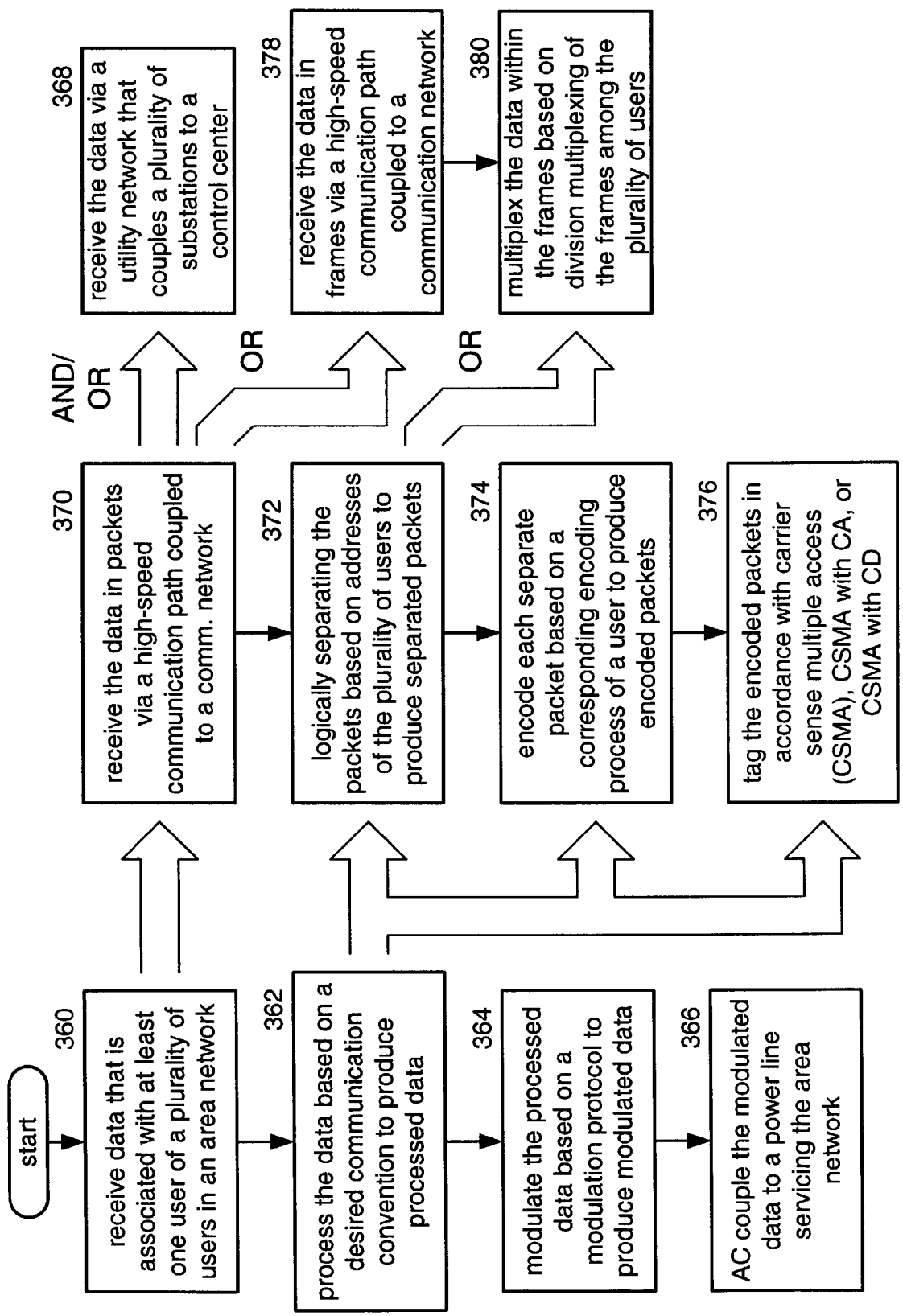
FIG. 18 illustrates a logic diagram of a method for providing broadband communication over power lines in accordance with the present invention.

FIG. 18 illustrates a logic diagram of a method for providing broadband communication over power lines. The process begins at Step 360 where data that is associated with at least one user of a plurality of users in an area network (e.g., wide area network or local area network) is received. The data may be received in a variety of manners, which will be subsequently described. The process then proceeds to Step 362 where the data is processed based on a desired communication convention to produce process data. The desired communication convention is IEEE 802.1Q VLAN. A more detailed discussion of the processing of the data in accordance with the desired communication convention will be subsequently described.

The process then proceeds to Step 364 where the processed data is modulated based on a modulation protocol. The modulation protocol may be amplitude modulation, frequency modulation, frequency shift keying, phase shift keying, quadrature amplitude modulation, discrete multi-tone modulation, orthogonal frequency division multiplexing, and/or spread spectrum modulation. The process then proceeds to Step 366 where the modulated data is AC coupled to the power lines servicing the area network. This was graphically illustrated with reference to FIGS. 1 through 7.

The receiving of data may be done in a variety of ways. For instance, at Step 370, the data may be received in data packets via a high-speed communication path that is coupled to a communication network. When the data is received in this manner, the processing of the data corresponds to Steps 372 through Step 376. At Step 372, the data is logically separated based on addresses of the plurality of users to produce separated data packets of data. The process then proceeds to Step 374 where the separate data packets of data are encoded based on a corresponding encoding process of the user. Note that each user of the local area network has an individual encoding scheme and/or encryption scheme. As such, even though the data is placed on a shared communication path, only the addressed user may receive it since only the addressed user has the corresponding encryption/decryption and/or encoding/decoding scheme. The process then proceeds to Step 376 where the encoded data packets are tagged in accordance with CSMA, CSMA with collision avoidance, and/or CSMA with collision detection.

As an alternate mechanism for receiving the data, the data may be received as shown at Step 368 where it is received via a utility network. The utility network couples a plurality of substations to a control center. In this coupling, and reception of data, the data is relatively low speed to provide the control central office with remote metering, enabling/disabling of electronic devices within a home, and/or other functions to control the transient use of power within a given area supported by a local distribution transformer and/or substation.

As a further alternate mechanism for receiving the data, the data may be received as shown at Step 378 where it is received in frames via a high-speed communication path coupled to a communication network. If the data is received in this manner, the processing is done as shown in Step 380. At Step 380, the data is multiplexed within the frames based on division multiplexing (e.g., time division multiplexing and/or frequency division multiplexing) of the frames among the plurality of users. This was graphically illustrated in FIGS. 14 and 15.

Figure 19:
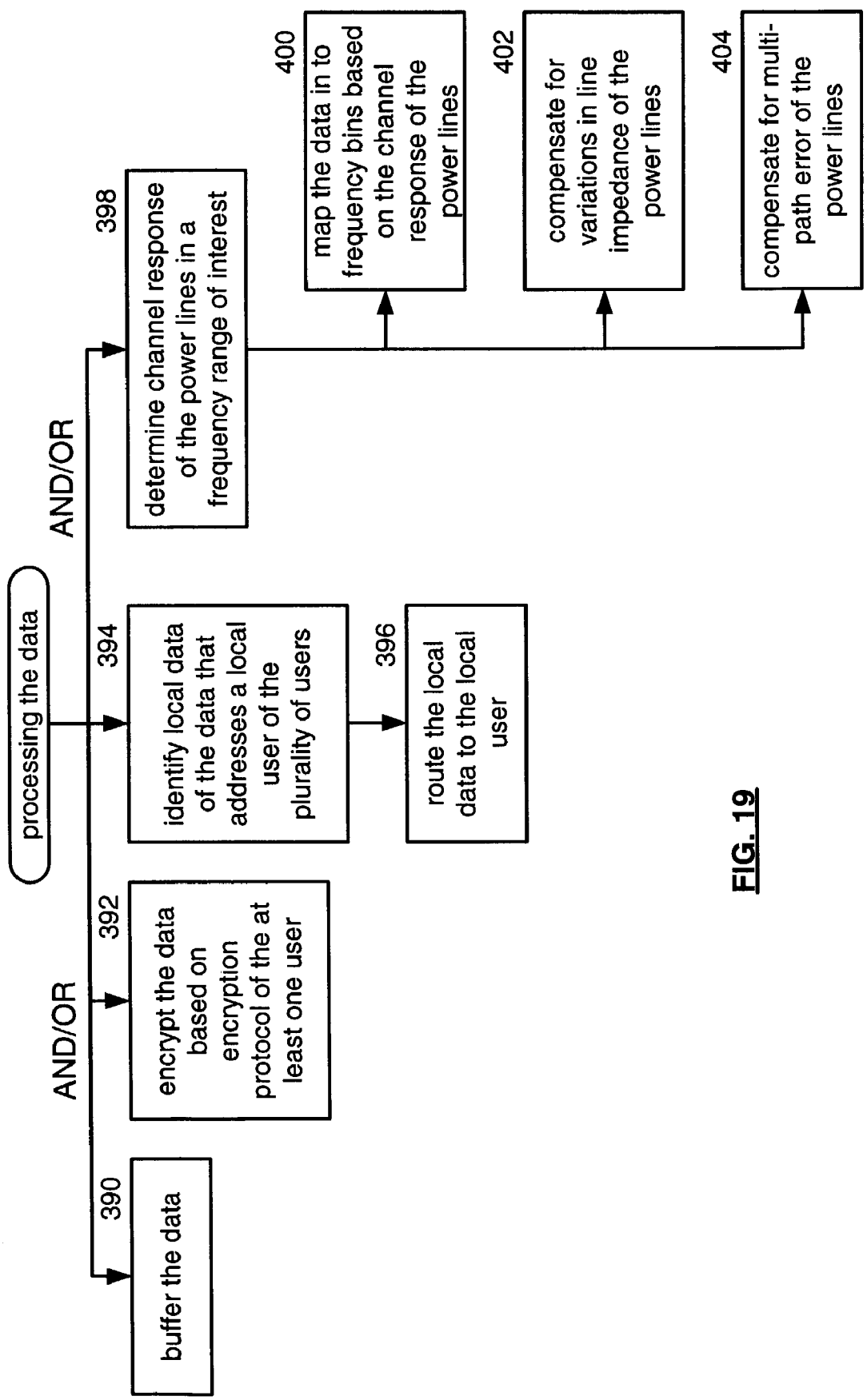
FIG. 19 illustrates a logic diagram of further processing of the data of Step 362 of FIG. 18.

FIG. 19 illustrates a logic diagram of further processing options of the data of Step 362 of FIG. 18. Each of these paths provides alternate and/or cumulative processing of the data. At Step 390, the data may be buffered. At Step 392, the data may be encrypted based on an encryption protocol that is unique to each user within the system. At Step 394, local data may be identified wherein the local data addresses a user affiliated with the power line node. The process then proceeds to Step 396 where the local data is routed to the local user without further processing.

At Step 398, the processing may include determining the channel response of the power lines over a frequency range of interest. For example, if the data is being transmitted via a plurality of carrier frequencies in the range of 100 kilohertz to 5 megahertz, the channel response in this frequency range is of interest. The process then proceeds to one or more of Steps 400 through 404. At Step 400, the data is mapped into frequency bins based on the channel response of the power lines. At Step 402, variations in the line impedance of the power lines are compensated for based on the response of the power lines. At Step 404, multipath errors are compensated for of the power line in response to determining the power line frequency performance response.

Figure 20:
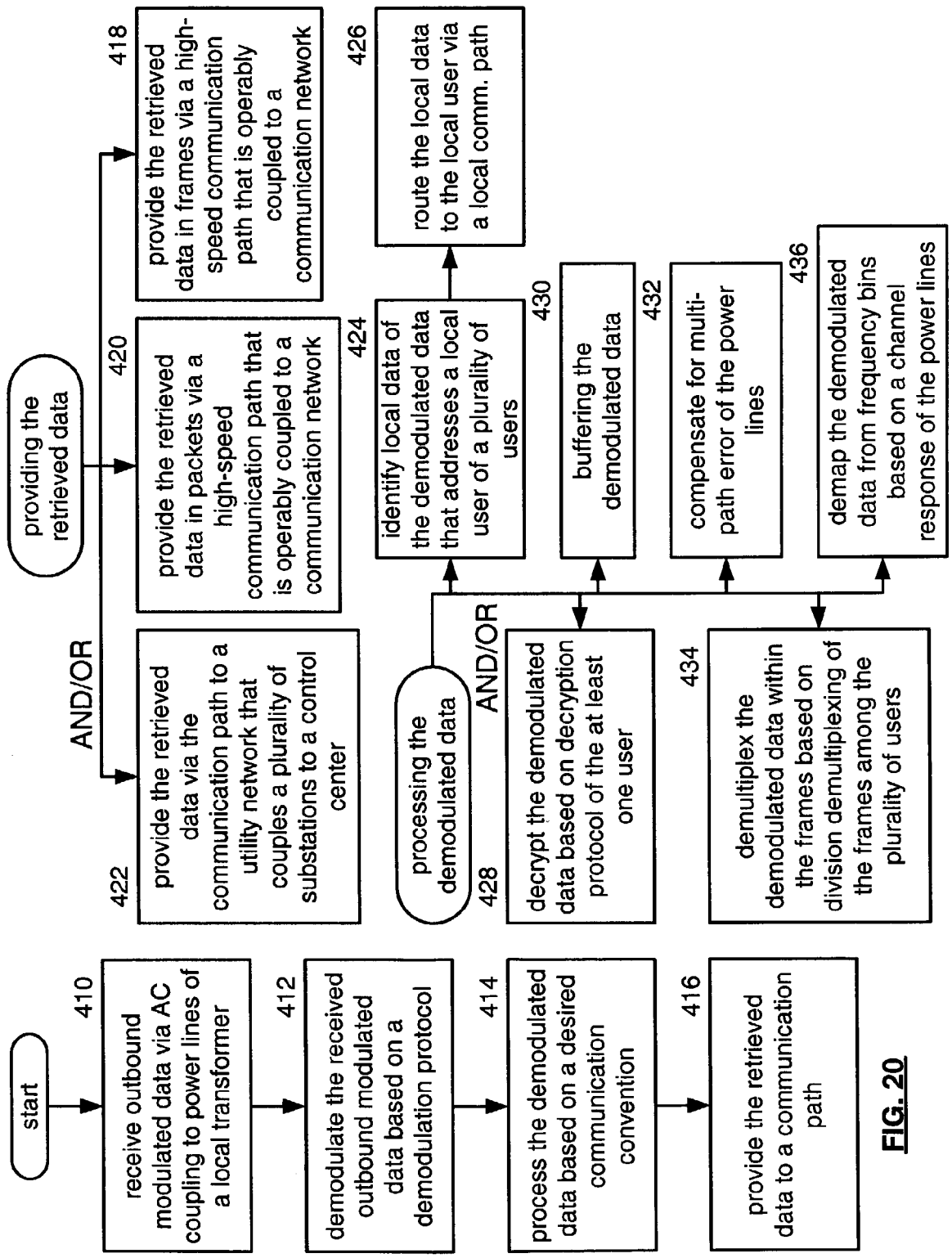
FIG. 20 illustrates a logic diagram of a method for providing broadband communication over power lines in accordance with the present invention.

FIG. 20 illustrates a logic diagram of a method for providing broadband communications over power lines. The process begins at Step 410 where outbound modulated data is received via AC coupling to power lines of a local transformer. The process then proceeds to Step 412 where the received outbound modulated data is demodulated based on a demodulation protocol. The particular demodulation protocol will be the inverse of the modulation protocol used to modulate the data. The process then proceeds to Step 414 where the demodulated data is processed based on the desired communication convention. The processing of the data will be further discussed with reference to Steps 424 through 436. The process then proceeds to Step 416 where the retrieved data is provided to a communication path. The providing of the retrieved data will be further discussed with reference to Steps 418 through 422.

The providing of the retrieved data may include one or more of the processing steps shown in Steps 418 through 422. At Step 418, the retrieved data is provided in frames via a high-speed communication path to a communication network. At Step 420, the retrieved data is provided in data packets via a high-speed communication path to a communication network. At Step 422, the retrieved data is provided via a communication path to a utility network that couples a plurality of substations to a control center. Alternately, the retrieved data may be user data and is provided to a user via a user communication path.

The processing of the demodulated data may be done utilizing one or more of the steps represented by Steps 424 through 436. At Step 424, local data of the demodulated data is identified based on the address of a local user of the plurality of users. Once the local data is identified, the process proceeds to Step 426 where the local data is routed to the local user via a local communication path.

At Step 428, the demodulated data may be decrypted based on a decryption protocol of the at least one user wherein the decryption protocol corresponds to the modulation protocol. At Step 430, the demodulated data may be buffered for controlling the timing of processing the data. At Step 432, the demodulated data may be processed to compensate for multipath errors of the power lines.

At Step 434, the demodulated data may be demultiplexed within the frames based on division demultiplexing (time and/or frequency) of the frames amongst the plurality of users. At Step 436, the demodulated data may be demapped from the frequency bins based on a channel response of the power lines.

Figure 21A:
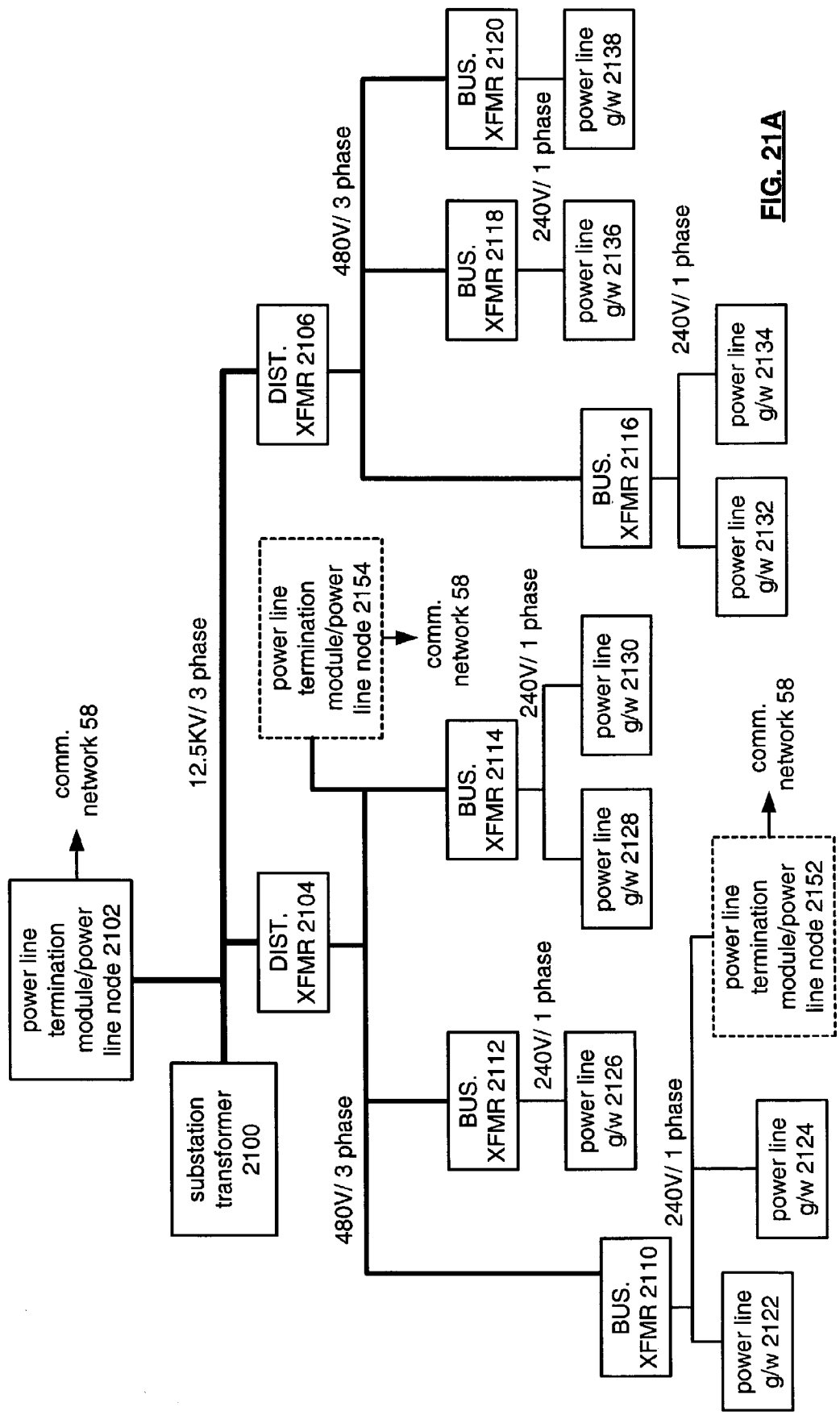
FIG. 21A is a block diagram illustrating various system configurations of the present invention in which one or more transformers reside within signal paths between power line nodes and power line gateways.

FIG. 21A is a block diagram illustrating various system configurations of the present invention in which one or more transformers reside within signal paths between power line nodes and power line gateways. Three separate power line termination modules/power line nodes 2102, 2152, and 2154 are shown in FIG. 21A, any of which could service the high-speed communication requirements of each of the power line gateways 2122, 2124, 2126, 2128, 2130, 2132, 2134, 2136, and 2138. As is shown in FIG. 21A, however, each of the power line termination modules/power line nodes 2102, 2152, and 2154 couple to the utility grid at different locations. Thus, when servicing any of the power line gateways 2122–2138, each of the power line termination modules/power line nodes 2102, 2152, and 2154 will use different signal paths through the utility grid.

The utility grid of FIG. 21A includes a substation transformer 2100 that couples on its high side to a high voltage 3 phase power line, e.g., 138 KV, and services a 12.5 KV/3 phase distribution line on its low side. Distribution transformers 2104 and 2106 couple to the 12.5 KV/3 phase distribution line on their high side and service 480V/3 phase lines on their low sides. A plurality of business transformers 2110, 2112, 2114, 2116, 2118, and 2120 couple on their high sides to the 480V/3 phase lines and provide service to businesses at 240V/1 phase voltage levels. Each of the business transformers 2110–2120 services at least one, and at most a few, businesses. Each of the power line gateways 2122–2138 is shown as coupling to the 240V/1 phase portion of the utility grid. However, in other embodiments, some or all of the power line gateways 2122–2138 could couple to other portions of the utility grid.

The transformers and conductors of the utility grid are designed to service the low frequency, e.g., 50 Hz, 60 Hz, power signal that is employed to provide electrical utility service to the business customers of the utility grid. The operating characteristics of the substation transformer 2100, distribution transformers 2104 and 2106, business transformers 2110–2120, and power lines of the utility grid are well understood within this frequency band. However, the high-speed communication system of the present invention operates in a much higher frequency band, e.g., 3–30 MHz. The operational characteristics of the utility grid components within this frequency band are not well understood. For example, each of the transformers introduces signal attenuation for data communication signals passing through the transformers, e.g., 20–30 dB.

Further, the operational characteristics of the utility grid itself are not well understood within this frequency band. The utility grid includes a plurality of conductive paths required to service the electrical utility needs of the customer. However, these conductive paths produce significant reflections when the utility grid is used to service high-speed data communications. Further, the various utility grid components that provide benefit for power factor correction, e.g., capacitor banks, may significantly affect the ability to use the utility grid to service high-speed data communications. The input impedance seen by the power line nodes and the power line gateways may be such as to limit the ability of the devices to transmit signals within the utility grid. Further, the utility grid itself may offer varying impedance to the devices and cause frequency selective amplitude and phase distortion.

Figure 21B:
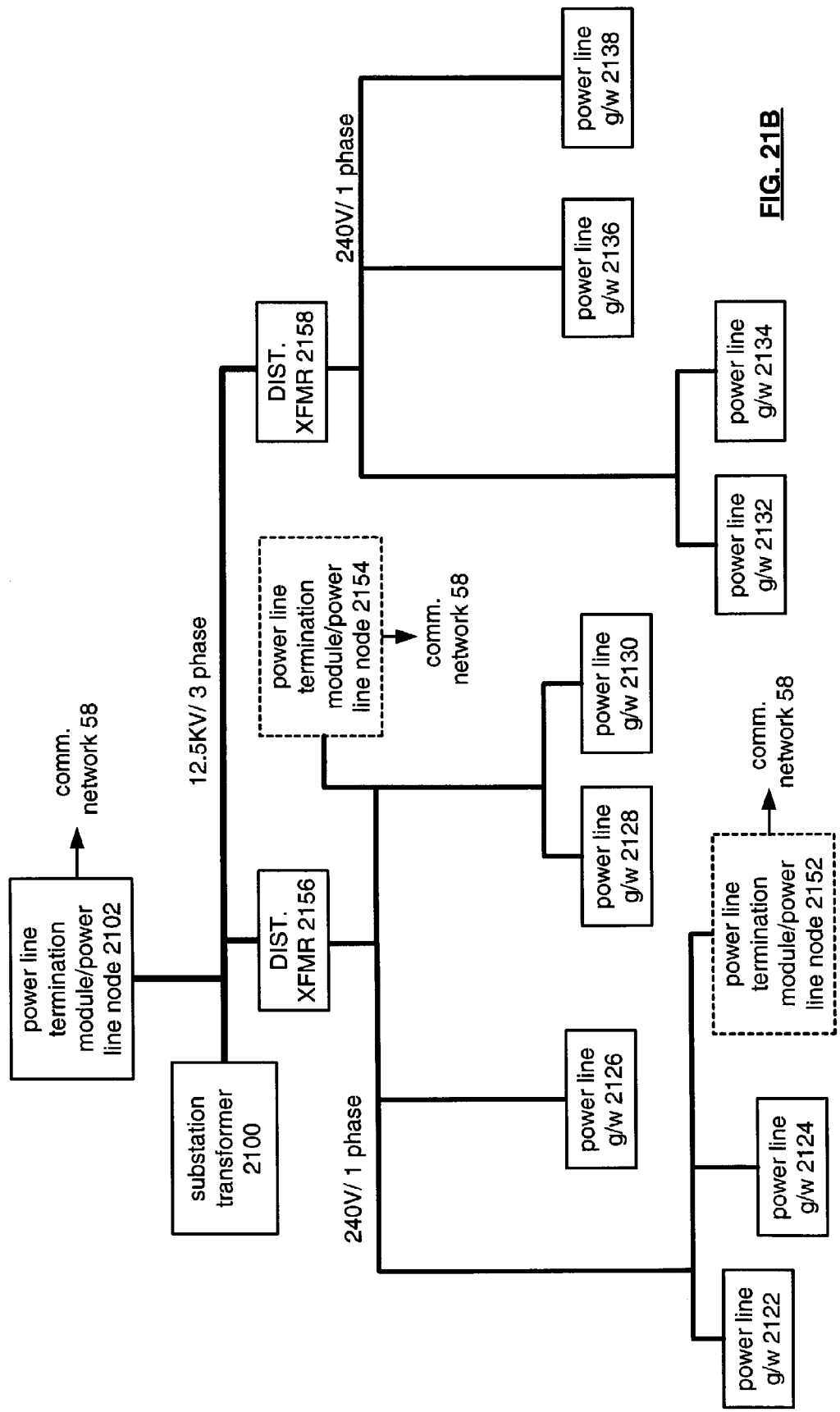
FIG. 21B is a block diagram illustrating another system configuration of the present invention in which one or more transformers reside within signal paths between power line nodes and power line gateways.

FIG. 21B is a block diagram illustrating another system configuration of the present invention in which one or more transformers reside within signal paths between power line nodes and power line gateways. As contrasted to the structure of FIG. 21A, the structure of FIG. 21B includes only the 12.5KV/3 phase and 240V/1 phase lines of the utility grid. In this case, distribution transformers 2156 and 2158 couple on their high sides to the 12.5 KV/3 phase voltage and couple on their low sides to the 240V/1 phase lines. Each of the power line gateways 2122–2138 couple to the 240V/1 phase lines and corresponding homes are serviced at this same voltage. As was the case with the structure of FIG. 21A, power line node 2102 couples to the 12.5 KV/3 phase line while power line nodes 2152 and 2154 couple to the 240V/1 phase lines.

The structure of FIG. 21B is typically more common in a residential area while the structure of FIG. 21B is more typical in a commercial/industrial area. Of course, the teachings of the present invention apply equally as well to commercial/industrial areas as well as to strictly residential area. Further, the system of the present invention may be employed to service a mixed commercial/industrial and residential neighborhood.

Figure 22:
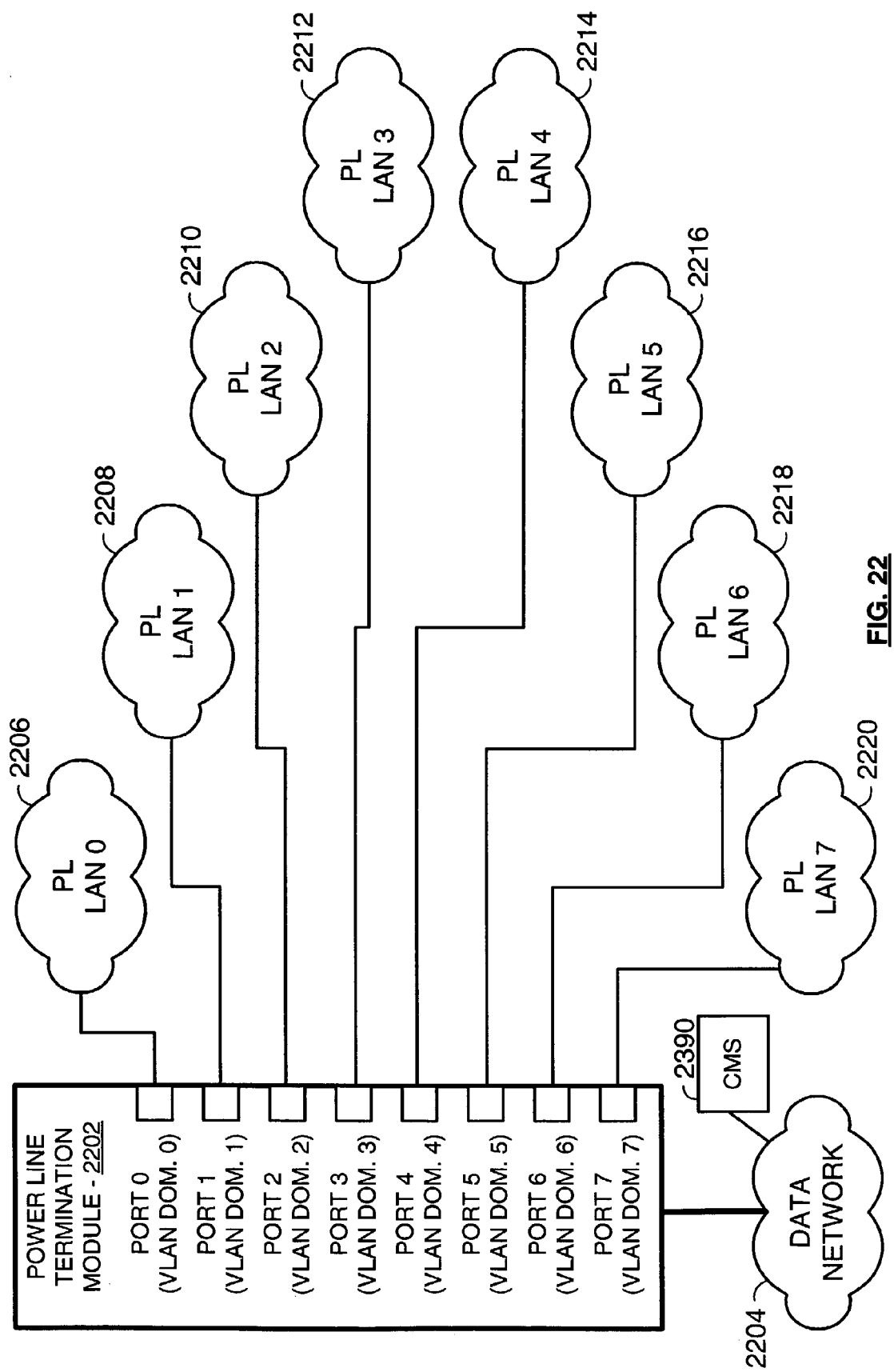
FIG. 22 is a system diagram illustrating at a high level a power line termination module and a plurality of power line local area networks serviced according to the present invention.

FIG. 22 is a system diagram that illustrates at a high level a power line termination module and a plurality of power line local area networks (LANs) serviced according to the present invention. Power line termination module 2202 includes a plurality of ports, port 0 through port 7. Each of this plurality of ports services a respective power line LAN. In such case, port 0 services power line LAN 2206, port 1 services power line LAN 2208, port 2 services power line LAN 2210, port 3 services power line LAN 2212, port 4 services power line LAN 2214, port 5 services power line LAN 2216, port 6 services power line LAN 2218, and port 7 services power line LAN 2220. The power line termination module 2202 also couples to data network 2204, e.g., high-speed data networks such as the Internet. The power line termination module 2202 serves as a Layer 3 edge router that connects the power line LANs to the data packet data network 2104, e.g., IP network and provides Wide Area Network (WAN) access for a plurality of serviced power line gateways. The power line termination module 2202 supports network security operations, Quality of Service (QoS) operations, and Privacy operations, among other operations.

Each port of the power line termination module 2202 supports a VLAN domain and has assigned thereto a VLAN group ID. Such VLAN domains may operate consistently with IEEE 802.1Q. In IEEE 802.1Q, a VLAN domain allows the addressing of 4,096 particular VLAN IDs. Thus, each port may service 4,096 individual VLANs according to the present invention. The power line termination module 2202 performs VLAN-based traffic control, data packet data translations, and additional functions in servicing a plurality of respective power line gateways. In other embodiments, each port of the power line termination module 2202 may address a differing number of VLAN IDs. In any case, VLAN IDs may be reused at each port of the power line termination module 2202 because the ports of the power line termination module 2202 are physically isolated from one another and service differing power line LANs that are communicatively isolated from one another.

As will be described further with reference to FIGS. 23 through 29, by assigning a VLAN ID to each serviced power line gateway (or to each device serviced by each power line gateway), significant operational advantages are achieved. These advantages include the ability to facilitate privacy on the serviced LANs, the ability to broadcast and multicast communications on the LANs, the ability to manage QoS for serviced power line gateways/devices coupled to serviced power line gateways, the ability to privately provision services for the power line gateways, and the ability to update software of the power line gateways. Each VLAN domain is on a subnet since the power line termination module 2202 is also an Edge Router that links the VLANs and data network 2204 in providing QoS WAN services.

A Configuration Management Server (CMS) 2390 couples to the power line termination module 2202 via the data network 2204. In another embodiment, the CMS 2390 couples directly to the power line termination module. However, by having the CMS 2390 couple to the power line termination module via the data network 2204, the CMS 2390 is more readily able to service a plurality of power line termination modules. In its operations, the CMS 2390 services service provisioning operations, service updating operations, and other administrative functions required to service the system. These operations will be described further with reference to FIGS. 26–29.

Figure 23:
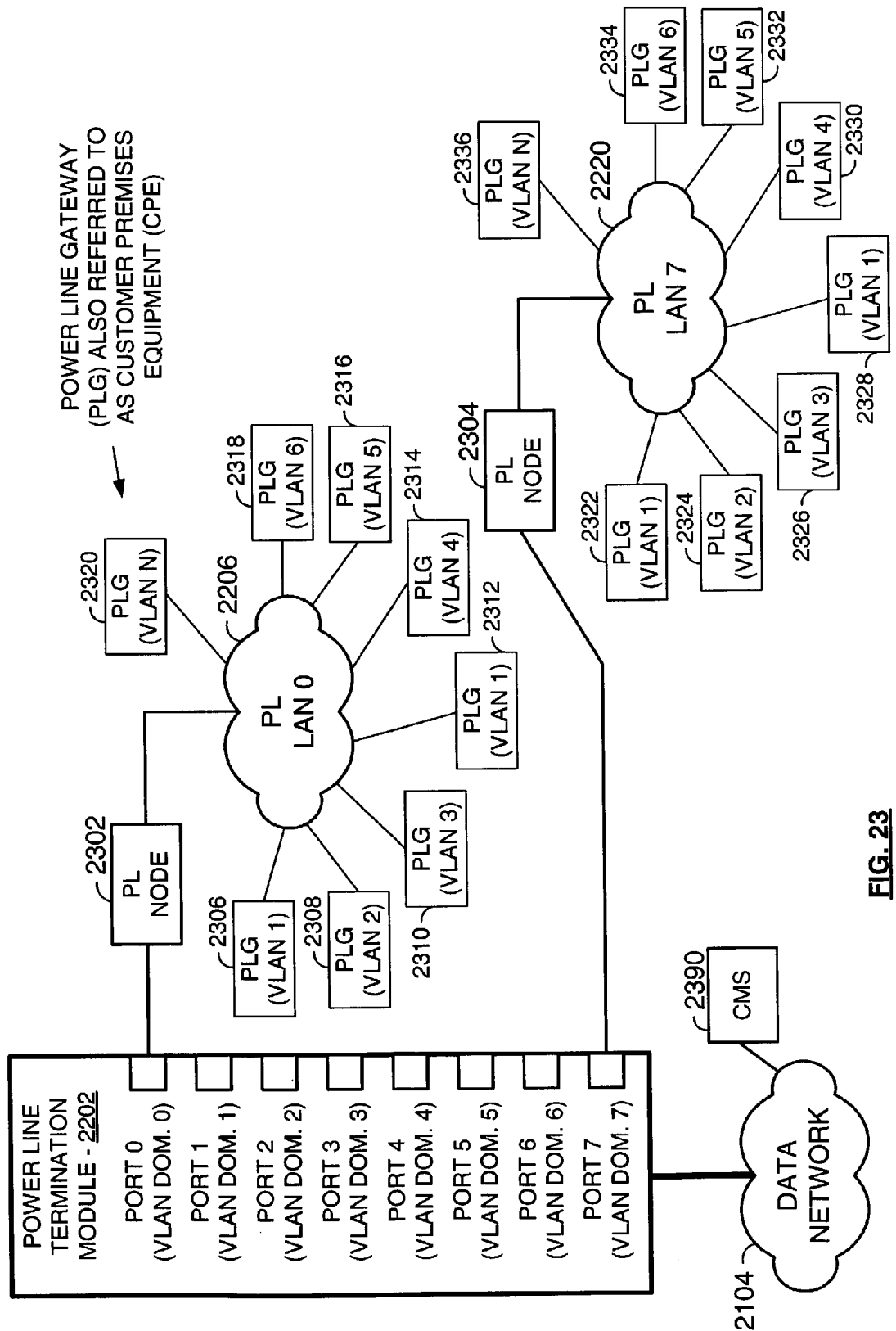
FIG. 23 is a partial system diagram illustrating in more detail the system of FIG. 22.

FIG. 23 is a partial system diagram illustrating in more detail the system of FIG. 22. As is also shown in FIG. 23, power line termination module 2202 includes eight ports, port 0 through port 7, each of which is capable of servicing a respective group of power line gateways coupled to the power line termination module 2202 via a power line LAN. Further, as is shown, power line nodes 2302 and 2304 couple between the ports of the power line termination module 2202 and the respective serviced power line LANs. In particular, port 0 of power line termination module 2202 couples to power line node 2302, which services power line LAN 2206. The structure of the power line nodes has been previously described herein in detail and will be further described with reference to FIG. 25C. Power line LAN 2206 services a plurality of power line gateways that are coupled to a respective utility grid segment. These power line gateways include power line gateways 2306, 2308, 2310, 2312, 2314, 2316, 2318, and 2320.

As is illustrated, each of these power line gateways 2306–2320 has at least one VLAN ID therewith associated. Power line gateways are also referred to herein and otherwise as customer premises equipment (CPE). The power line gateways are referred to as CPEs because the power line gateways will be resident at the customer premises and will typically serve at least one device. Port 7 of the power line termination module 2202 couples to power line node 2304 and services power line LAN 2220. Power line LAN 2220 corresponds to a respective utility grid segment. Serviced by power line LAN 2220 are power line gateways 2322–2336. As is shown, each power line gateway 2322–2336 includes a unique VLAN ID. As will be further described herein, each power line gateway may be assigned multiple VLAN IDs, each of which corresponds to a device serviced by the power line gateway.

As is indicated within FIG. 23, VLAN IDs may be reused for each port such that power line gateways serviced by differing ports may have the same VLAN ID. This operation is possible because the power line termination module 2202 performs translation operations between VLAN IDs and data packet addresses, e.g., MAC address, IP address, etc. Such VLAN ID and data packet address translation is based upon the identity of devices coupled to serviced ports of the power line gateways. Because the VLAN domains serviced by the ports of the powerline terminal module 2202 are physically isolated, the use of the same VLAN IDs on differing ports does not cause address conflicts within the power line termination module 2202.

The manner in which power line LANs are defined such that they are associated with the respective utility grid segments has been previously described herein. For particular examples of such descriptions see FIGS. 1–3, 21A and 21B. Generally, each power line LAN accesses the power line termination module 2202 via a unique servicing port. However, each power line gateway serviced by the power line LAN operates in a multiple access arrangement with each other power line gateway serviced by the power line LAN. In this case, the power line gateways 2322–2336 of power line LAN 2220 operate in a multiple access arrangement with collision avoidance mechanisms in place. Because each of these power line gateways 2322–2336 share the physical media of the power line LAN 2220, each power line gateway may receive transmissions from each other of the power line gateways. As will be further described with reference to FIGS. 28 and 29, the VLAN operations of the present invention serve to privatize communications on the power line LAN 2220 thus precluding power line gateways that share the power line LAN 2220 from receiving each other's communications. The VLAN operations of the present invention also support QoS operations on the power line LAN 2220 and support a number of other operations that provide significant benefits in the operation of the power line LAN 2220 and other power line LANs.

Figure 24A:
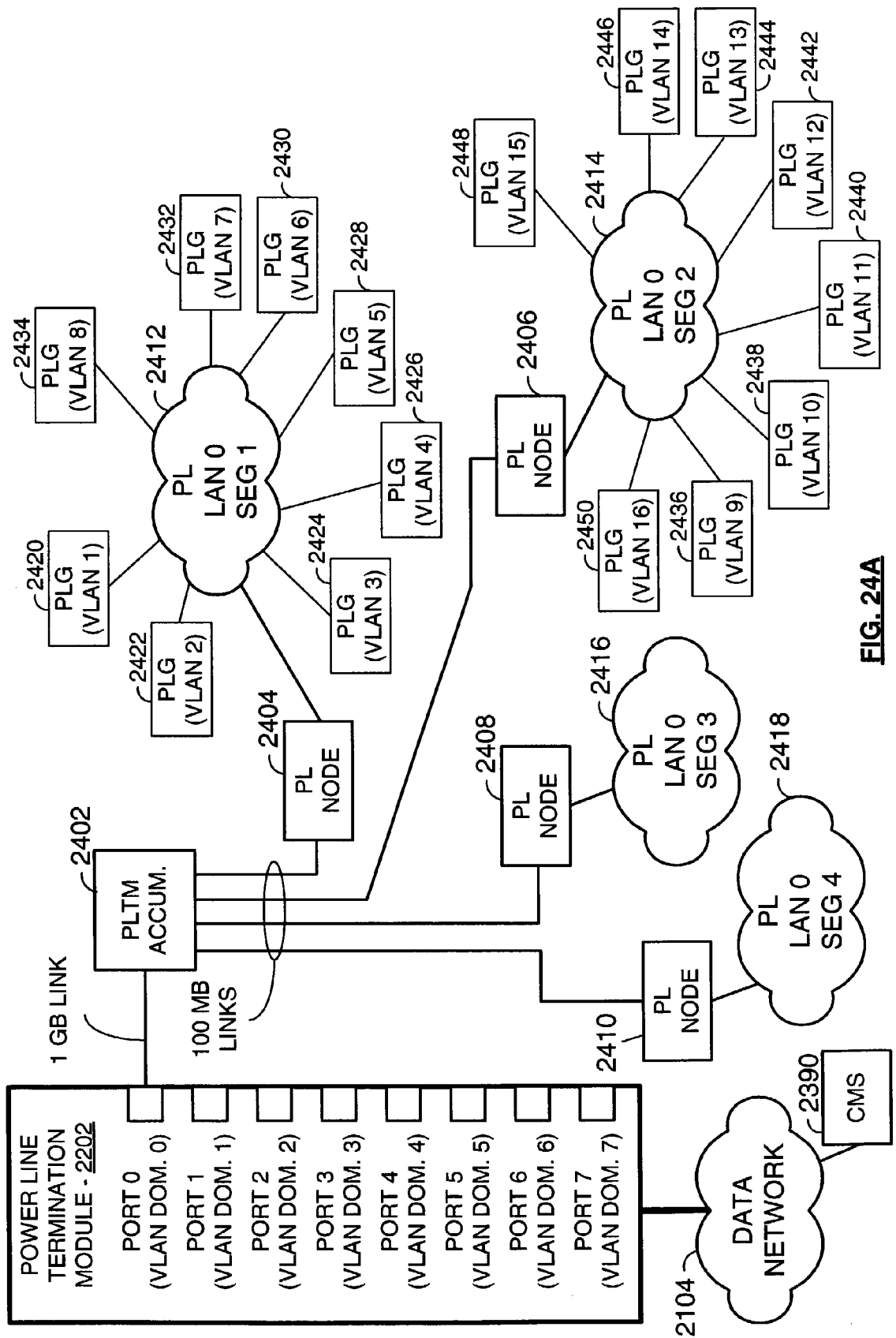
FIG. 24A is a system diagram illustrating a first alternate embodiment of the last-leg utility grid high-speed data communication network previously illustrated in FIGS. 22 and 23.

FIG. 24A is a system diagram illustrating a first alternate embodiment of the last-leg utility grid high-speed data communication network previously illustrated in FIGS. 22 and 23. As is shown in FIG. 24A, the power line termination module 2202 couples to data network 2104 and includes a plurality of ports, i.e., port 0 through port 7. However, as contrasted to the structure of FIGS. 22 and 23, the power line LAN 0 has a plurality of unique segments, segments 1–4. While the power line termination module 2202 services each of these power line LAN 0 segments 2412, 2414, 2416, and 2418 using a particular port, port 0, the manner in which communications are linked to these power line LAN segments 2412–2418 differs from the manner described with reference to FIGS. 22 and 23.

With the structure of FIG. 24A, a power line termination module accumulator 2402 couples to port 0 of power line termination module 2202 via a 1 GB optical link. The power line termination module accumulator 2402 couples to power line nodes 2404, 2406, 2408, and 2410 that service power line power line LAN 0 segments 2412, 2414, 2416, and 2418, respectively. The coupling between power line termination module accumulator 2402 and power line nodes 2404–2410 is serviced via respective 100 MB optical links. Coupling at the lower capacity 100 MB links allows less expensive optical ports to be employed to service the same subscriber base. Such is the case because the higher rate 1 GB link is significantly more expensive than are 100 MB optical links. In one particular embodiment of the structure, the 1 GB link is serviced according to the 1 Gig-E optical standard, while the 100 MB links are serviced according to the 100 FX optical standard. With this embodiment, the power line termination module accumulator 2402 operates as an ISO Layer 2 aggregation switch.

An advantage of the structure of FIG. 24A is that a single power line termination module 2202 may service in excess of 25,000 power line gateways. These power line gateways may be disbursed over a relatively large geographic area. With the structure of FIG. 24, the power line termination module accumulator 2402 may be located geographically closer to serviced power line gateways than is the power line termination module 2202. Further, each power line node 2404–2410 may be located geographically close to its serviced power line LAN 0 segment 2412–2418, respectively. In such case, significant advantages are obtained not only in bandwidth throughput and reduced device costs, but reduced deployment costs as well. Because footprint requirements for the power line termination module 2202 can be great, it is advantageous to locate the power line termination module 2202 at a geographic location having minimal cost. In such case, the 1 GB link and 100 MB links, or such other links as appropriate, may be run between the power line termination module 2202, power line termination module accumulator 2402, and the power line nodes 2404–2410. Not only can the power line termination module, power line termination module accumulator 2402 and power line nodes 2404–2410 be economically placed, but they can be placed such that they are optimally located with respect to their serviced power line gateways.

As is shown, each power line node 2404, 2406, 2408, and 2410 services a respective set of power line gateways coupled to corresponding LAN 0 segment 2412, 2414, 2416, and 2418, respectively. For example, power line node 2404 services power line gateways 2420–2434. Each of these power line gateways 2420–2434 has at least one unique VLAN ID associated therewith. Likewise, power line node 2406 services power line gateways 2436–2450. Further, each of the power line gateways 2436–2450 has associated therewith at least one unique VLAN ID. This is further the case for power line node 2408 servicing power line LAN segment 2416 and power line node 2410 servicing power line LAN segment 2418. Not shown in FIG. 24 are a plurality of power line gateways serviced by each of these power line LAN segments 2416 and 2418.

As was previously described, each port of the power line termination module 2202 services its own VLAN domain. Because only a single VLAN domain is serviced by port 0, each VLAN ID may be used only a single time within the combined segments of power line LAN 0 (including LAN 0 segments 2412, 2414, 2416, and 2418). With this structure, the power line termination module accumulator 2402 may simply be a data packet switch, which performs no operations relevant to the VLAN system of the present invention. However, in another embodiment, the power line termination module accumulator 2402 may perform some of the VLAN operations of the present invention.

Figure 24B:
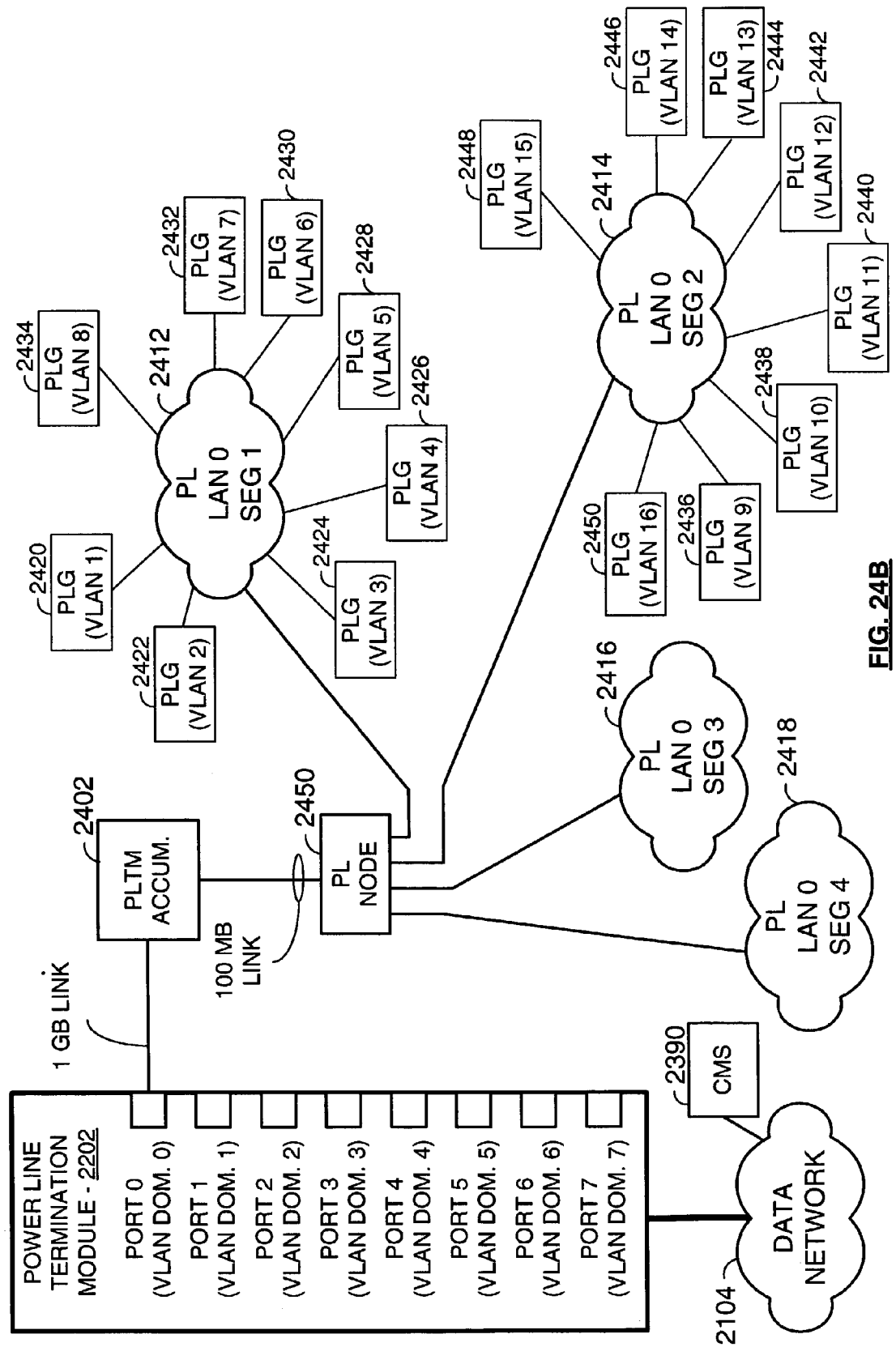
FIG. 24B is a system diagram illustrating a second alternate embodiment of the last-leg utility grid high-speed data communication network previously illustrated in FIGS. 22 and 23.

FIG. 24B is a system diagram illustrating a second alternate embodiment of the last-leg utility grid high-speed data communication network previously illustrated in FIGS. 22 and 23. As contrasted to the structure of FIG. 24A, with the structure of FIG. 24A, a single power line node 2450 includes a plurality of ports, each of which services a particular power line LAN, 241, 2414, 2416, and 2418. A structure of the power line node 2450 that supports this architecture is described in detail with reference to FIG. 25C.

Figure 25A:
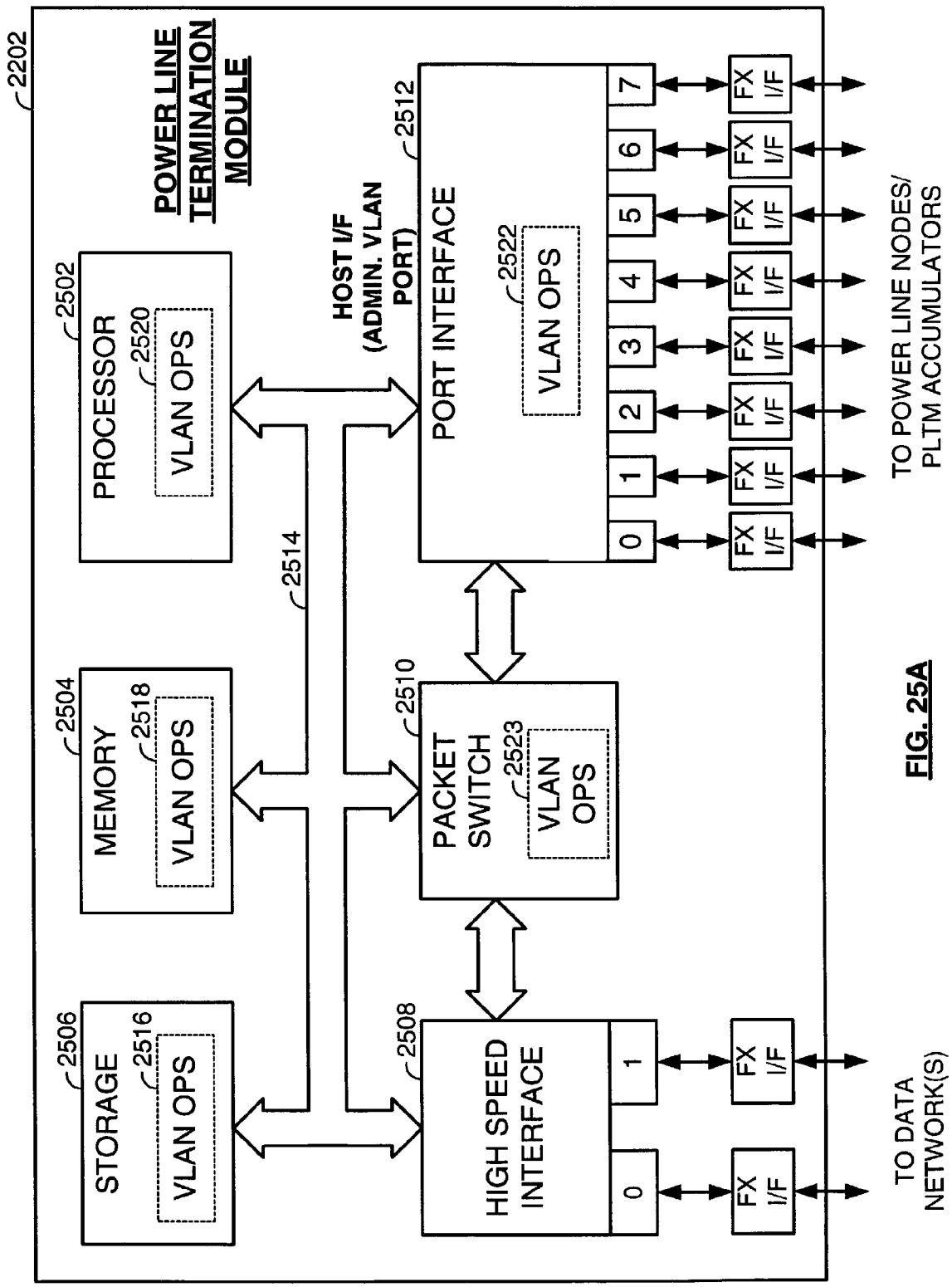
FIG. 25A is a block diagram illustrating a power line termination module constructed according to the present invention.

FIG. 25A is a block diagram illustrating a power line termination module 2202 constructed according to the present invention. The structure illustrated in FIG. 25A is a diagrammatic representation of the structure of the power line termination module 2202 with minimal detail. As the reader will appreciate, many various other structures may perform operations according to the present invention in servicing a last-leg utility grid high-speed data communication network. The power line termination module 2202 includes a processor 2502, memory 2504, storage 2506, a high speed interface 2508, and a port interface 2512, all of which couple via a system bus 2514. Also contained within the power line termination module 2202 is a data packet switch 2510 that couples to high-speed interface 2508, a port interface 2512, and the system bus 2514. The high-speed interface 2508 couples to either a plurality of data networks or couples redundantly to a single data network. Such data network is referred to as "2204" in FIGS. 22, 23, 24A, and 24B. This data network may be an Internet, an Intranet, or another high-speed data packetized data network.

The port interface 2512 supports the eight ports of the power line termination module 2202 and couples to a respective power line node or power line termination module accumulator via an interface, e.g., FX fiber interface. Other embodiments of the power line termination module may include a greater number, or a lesser number of ports. Each port of the port interface 2512 implements a particular VLAN domain. VLAN operations and administrative operations are enabled by a plurality of software instructions that are executed by the power line termination module 2202. Further, various other modifications of the power line termination module 2202 may be required to implement VLAN operations of the present invention. Software instructions that cause the VLAN operations upon execution, referred to as VLAN operations, are initially stored as VLAN operations 2516 in storage 2506. The storage 2506 may be an optical media, a hard drive, or other substantially static storage device. Memory 2504 may include dynamic random access memory, read-only memory, or another type of memory that is known in the arts to facilitate the storage of instructions and data and that may be accessed by processor 2502. Processor 2502 may be a single microprocessor, multiple microprocessors, a processing module, or another processing device that is capable of executing software instructions and controlling the operation of other components coupled via system bus 2514.

In executing the VLAN operations 2516, the VLAN operations 2516 are copied from storage 2506 to memory 2504 as VLAN operations 2518 and then read by the processor 2502 from memory 2504 as VLAN operations 2520. The execution of these software instructions by the processor 2502 causes the processor to program/control the operation of the port interface 2512 to perform VLAN operations 2522 according to the present invention. In combination, the VLAN operations 2520 performed by the processor and the VLAN operations 2522 performed by the port interface 2512 enable the power line termination module 2202 to execute the VLAN operations of the present invention.

The data packet switch 2510 is generally known in the art to switch data packet data between coupled devices, e.g., between the high-speed interface 2508 and the port interface 2512. In some operations, the processor 2502 controls the operation of the data packet switch 2510 to operate upon data packet data according to the present invention. In other operations, the processor 2502 programs the data packet switch 2510 to operate according to the present invention. With these operations, for example, when data packet data is received via the high-speed interface 2508 and is intended for a power line gateway coupled to one of the ports of the port interface 2512, the data packet switch 2510 will perform data packet identification and may perform data packet modification to support the VLAN operations of the preset invention. Likewise, when a data packet is received in the port interface 2512 that is intended for a device coupled via the high-speed interface 2508, the data packet switch 2510 may modify the received data packet prior to passing the data packet to the high-speed interface 2508. In such case, the VLAN operations 2520 executed by processor 2502 will cause the processor 2502 to interface with the data packet switch 2510 across system bus 2514 to enable these operations.

Figure 25B:
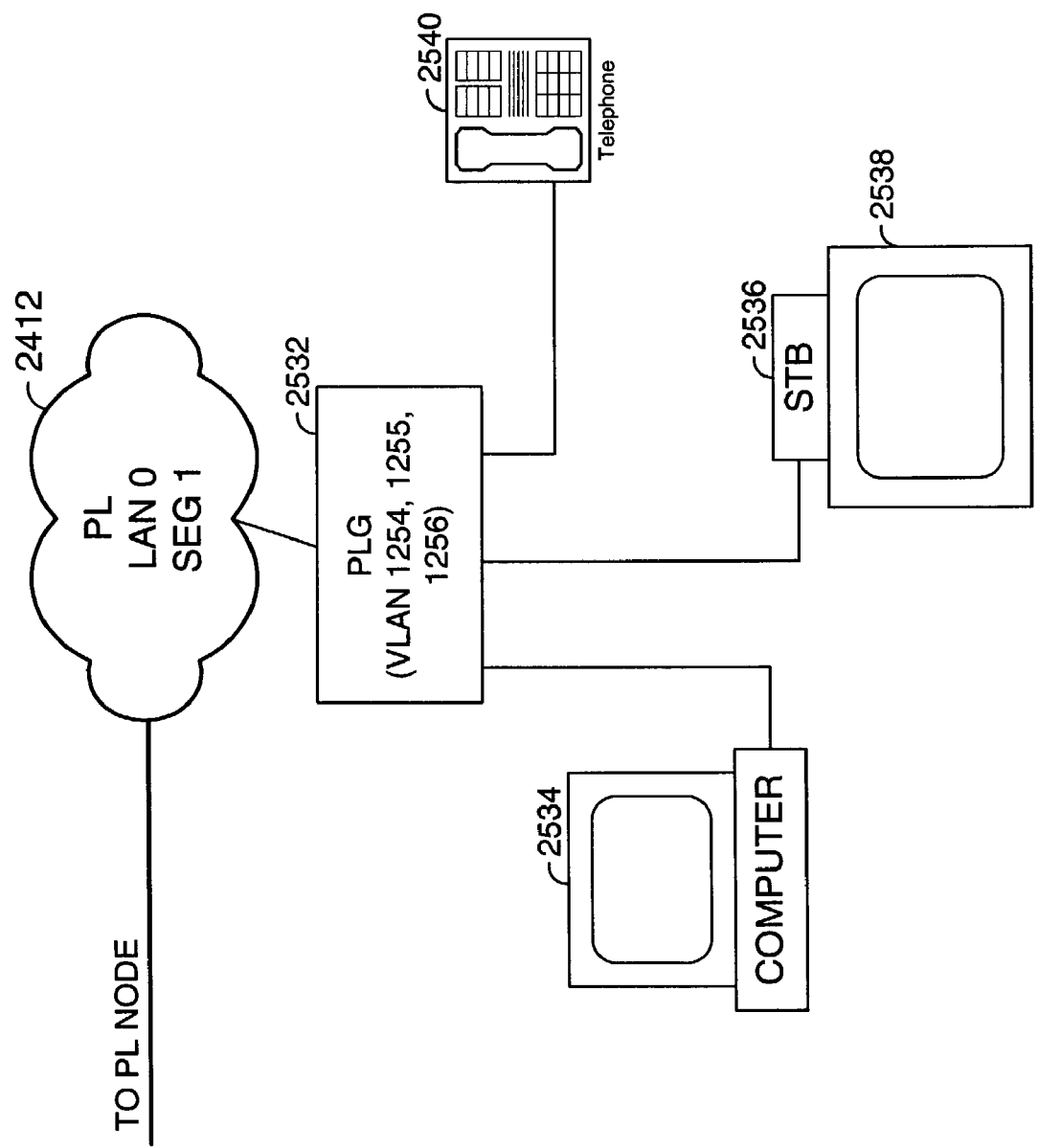
FIG. 25B is a partial system diagram illustrating the manner in which a power line gateway services a plurality of devices.

FIG. 25B is a partial system diagram illustrating the manner in which a power line gateway services a plurality of devices. Power line gateway 2532 couples to power line LAN 0 segment 1 2412, which was previously illustrated in FIGS. 24A and 24B. The power line gateway 2532 services digital computer 2534, set top box 2536, which couples to television 2538, and telephone 2540. In such case, the power line gateway 2532 provides data service to computer 2534, provides digital television service to set top box 2536, and provides voice service to telephone 2540.

Because the power line gateway 2532 services three separate devices, the power line termination module 2202 enables at least three VLAN IDs within the power line gateway 2532. The VLAN IDs are illustrated to be 1254, 1255, and 1256. VLAN ID 1254 is associated with computer 2534 such that data communications between the power line termination module 2202 and computer 2534 are all associated with VLAN ID 1254. Communications between set top box 2536 and power line termination module 2202 are each associated with VLAN ID 1255. Finally, all communications between telephone 2540 and power line termination module 2202 are associated with VLAN ID 1256.

As will further be described with reference to FIGS. 26–29, VLAN operations may define a QoS for each serviced device. In particular, with reference to FIG. 25B, telephone 2540 services voice communications. Thus, VLAN ID 1256 associated with telephone 2540 must receive a sufficient QoS to service voice communications. Further, set top box 2536 receives digitized audio/video information from the power line termination module 2202. Thus, a quality of service associated with VLAN ID 1255 must be sufficient to service the audio/visual requirements of the set top box 2536. The power line gateway 2532 may service multiple VLAN IDs for each of its serviced ports. For example, in one operation, the power line gateway 2532 services both a dedicated VLAN ID and a multicast/broadcast VLAN ID for the set top box 2506, e.g., for pay-per-view events, premium services, etc.

Figure 25C:
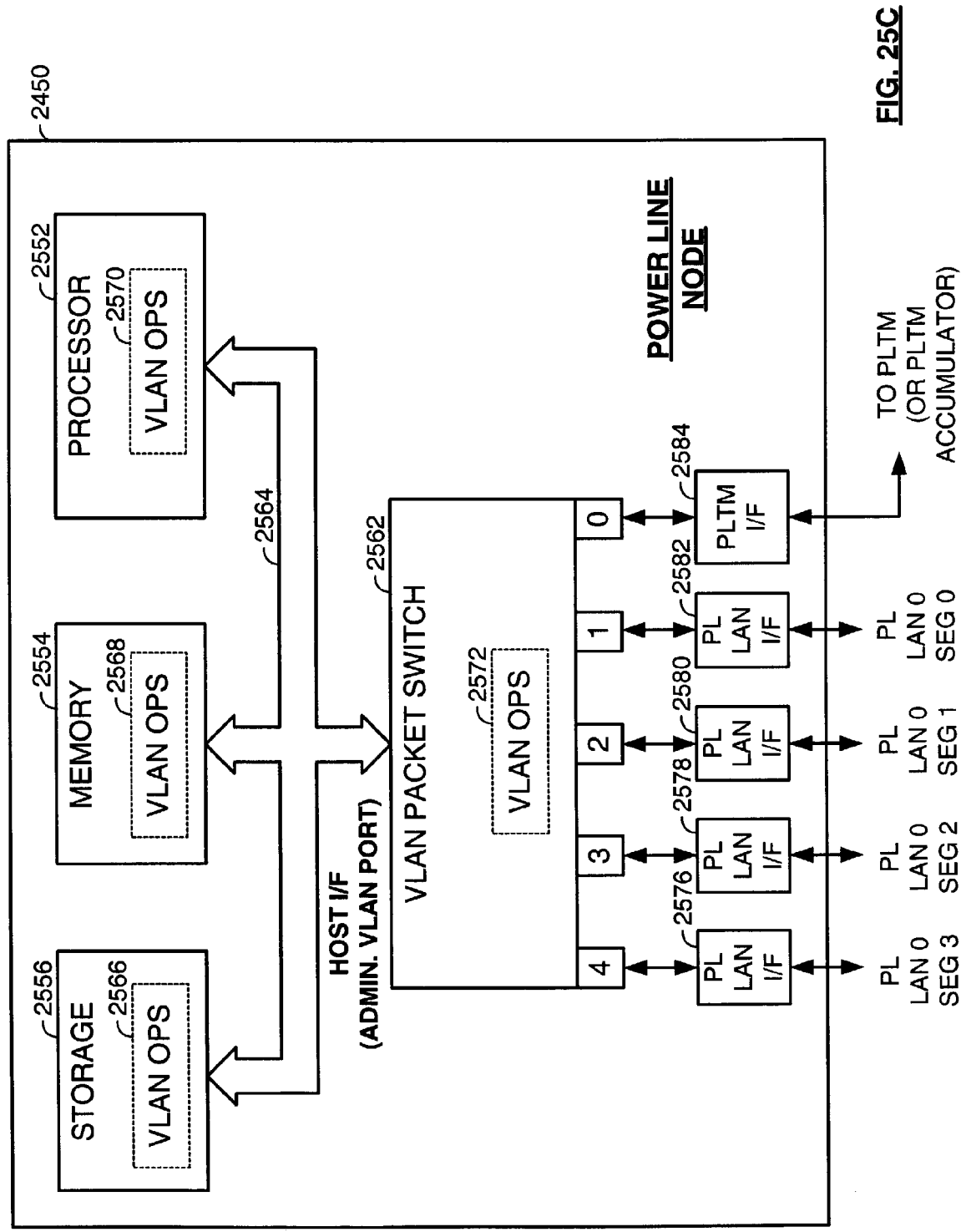
FIG. 25C is a block diagram illustrating a power line node constructed according to the present invention.

FIG. 25C is a block diagram illustrating a power line node 2450 constructed according to the present invention. The power line node 2450 includes a processor 2552, memory 2554, optional storage 2556, and a VLAN data packet switch 2562, these components coupled via a host interface 2564. The VLAN data packet switch 2562 couples to a plurality of power line LAN segments via respective power line LAN interfaces 2576, 2578, 2580, and 2582 at respective ports. The power line node 2450 also couples to a power line termination module (or a power line termination module accumulator) via a power line termination module interface, e.g., a FX fiber interface, and a respective port. An administrative port of the VLAN data packet switch 2562 couples to the host interface 2562 and allows the processor 2552 to service administrative functions. Software that enables the VLAN operations 2566 is initially stored in storage 2556 (when present) as VLAN operations 2566, loaded into memory 2554 as VLAN operations 2568, and executed by the processor 2552 as VLAN operations 2570. The execution of this software by the processor 2552 causes the processor to program/control the operation of the VLAN data packet switch 2562. As programmed/controlled, the VLAN data packet switch 2562 performs VLAN operations 2572 according to the present invention.

According to one of these operations, all data packet data communications that are incoming on the Administrative VLAN are forwarded for servicing by the processor 2552. Operations that access the Administrative VLAN include gateway service provisioning, gateway service updating, gateway software updating, and other administrative functions. The power line node 2450, the power line termination module 2202, and the serviced power line gateway interact on the Administrative VLAN during these operations.

Figure 25D:
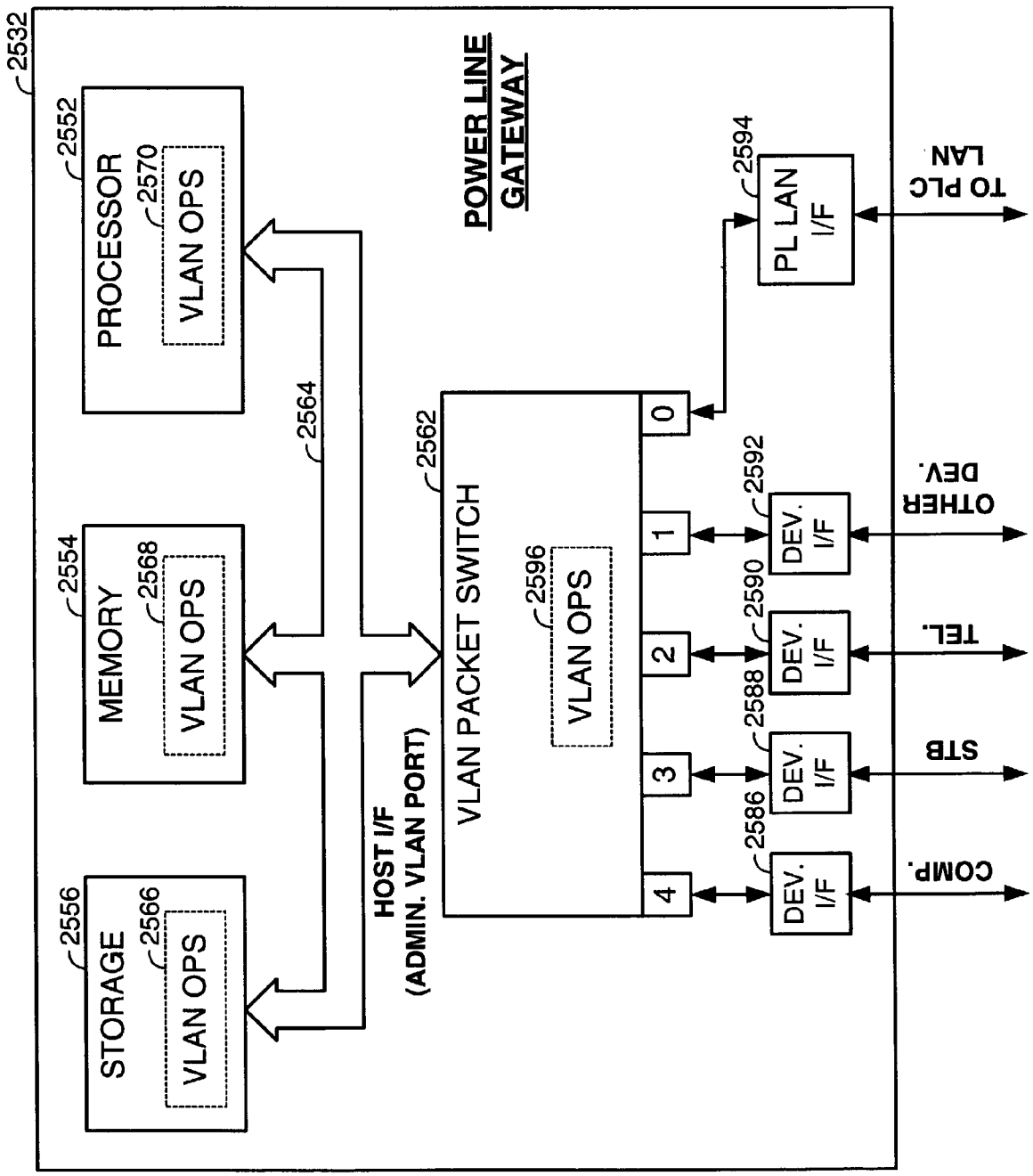
FIG. 25D is a block diagram illustrating a power line gateway constructed according to the present invention.

FIG. 25D is a block diagram illustrating a power line gateway 2532 constructed according to the present invention. As is indicated via common reference numerals, the power line gateway 2532 has a structure that is similar to the power line node 2450. Thus, the power line gateway includes a processor 2552, memory 2554, optional storage 2556, and a VLAN data packet switch 2562, these components coupled via a host interface 2564. The VLAN data packet switch 2562 couples to a plurality of serviced devices, e.g., computer, set top box, telephone, etc., via respective device interfaces 2586, 2588, 2590, and 2592 at respective ports. The power line gateway 2532 also couples to a servicing power line node via a power line LAN interface 2594. An administrative port of the VLAN data packet switch 2562 couples to the host interface 2562 and allows the processor 2552 to service administrative functions. Software that enables the VLAN operations 2566 is initially stored in storage 2556 (when present) as VLAN operations 2566, loaded into memory 2554 as VLAN operations 2568, and executed by the processor 2552 as VLAN operations 2570. The execution of this software by the processor 2552 causes the processor to program/control the operation of the VLAN data packet switch 2562 to perform VLAN operations 2596 according to the present invention. While the VLAN operations 2566, 2568, 2570, and 2596 are similar to those performed by the power line node 2450, they are unique to the function of the power line gateway as has been, and will be described further herein.

Figure 26:
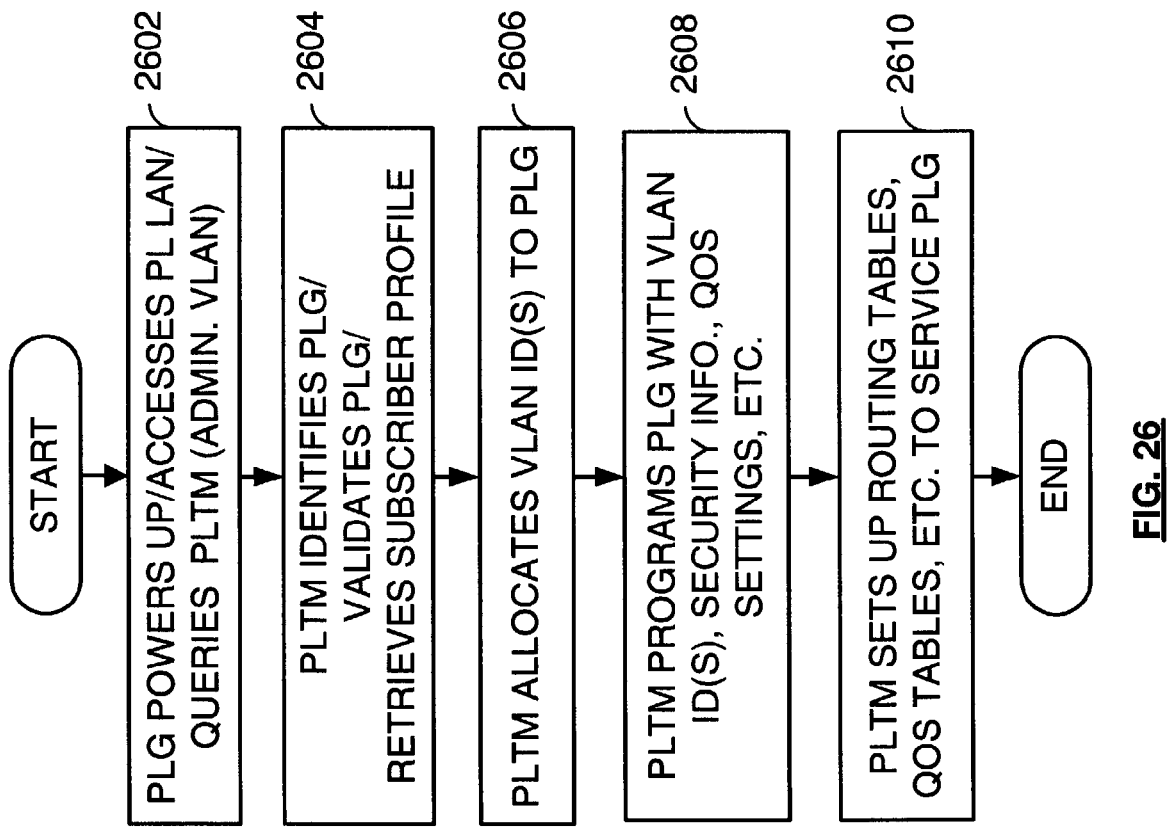
FIG. 26 is a logic diagram illustrating operation according to the present invention in enabling operation of a power line gateway.

FIG. 26 is a logic diagram illustrating operation according to the present invention in enabling operation of a power line gateway. Operation commences when the power line gateway powers up, accesses its coupled power line LAN, and queries the power line termination module (step 2602). In one operation according to the present invention, the power line gateway queries the power line termination module via an Administrative LAN. The Administrative LAN is accessible only by the processor of the power line gateway, by the power line nodes, and by the power line termination module. Thus, a subscriber does not have access to the Administrative LAN.

Once the power line termination module receives the query, the power line termination module identifies the power line gateway, validates the power line and retrieves a subscriber profile for the power line gateway (step 2604). Validation of the power line gateway may be performed according to operations further described with reference to FIG. 27. The subscriber profile will be contained in a database coupled either directly to the power line termination module or that is remotely contained at a separate location such as at the CMS 2390 that is described with reference to FIG. 22.

After the power line termination module has validated the power line gateway, it allocates at least one VLAN ID to the power line gateway (step 2606). As was previously described with reference to FIG. 25B, the power line gateway may service a plurality of devices. When a plurality of devices is serviced by the power line gateway, a plurality of VLAN IDs is allocated to the power line gateway, one per serviced port. In some allocations, a plurality of VLAN IDs is assigned to a single serviced port, as was described with reference to FIG. 25B.

After successful validation of the power line gateway and allocation of at least one VLAN for the power line gateway, the power line termination module programs the power line gateway with the VLAN IDs, security information, quality of service settings for each VLAN ID, and additional information relating to the services that will be provided to the power line gateway (step 2608). Finally, the power line termination module sets up its routing tables, quality of service tables, and other internal components that will enable it to service the power line gateway (step 2610). Also, the power line termination module sets up a servicing power line node, and a servicing power line termination module accumulator when employed, so that it/they will adequately service the power line gateway. From step 2610, operation ends for setting up the particular power line gateway.

Figure 27:
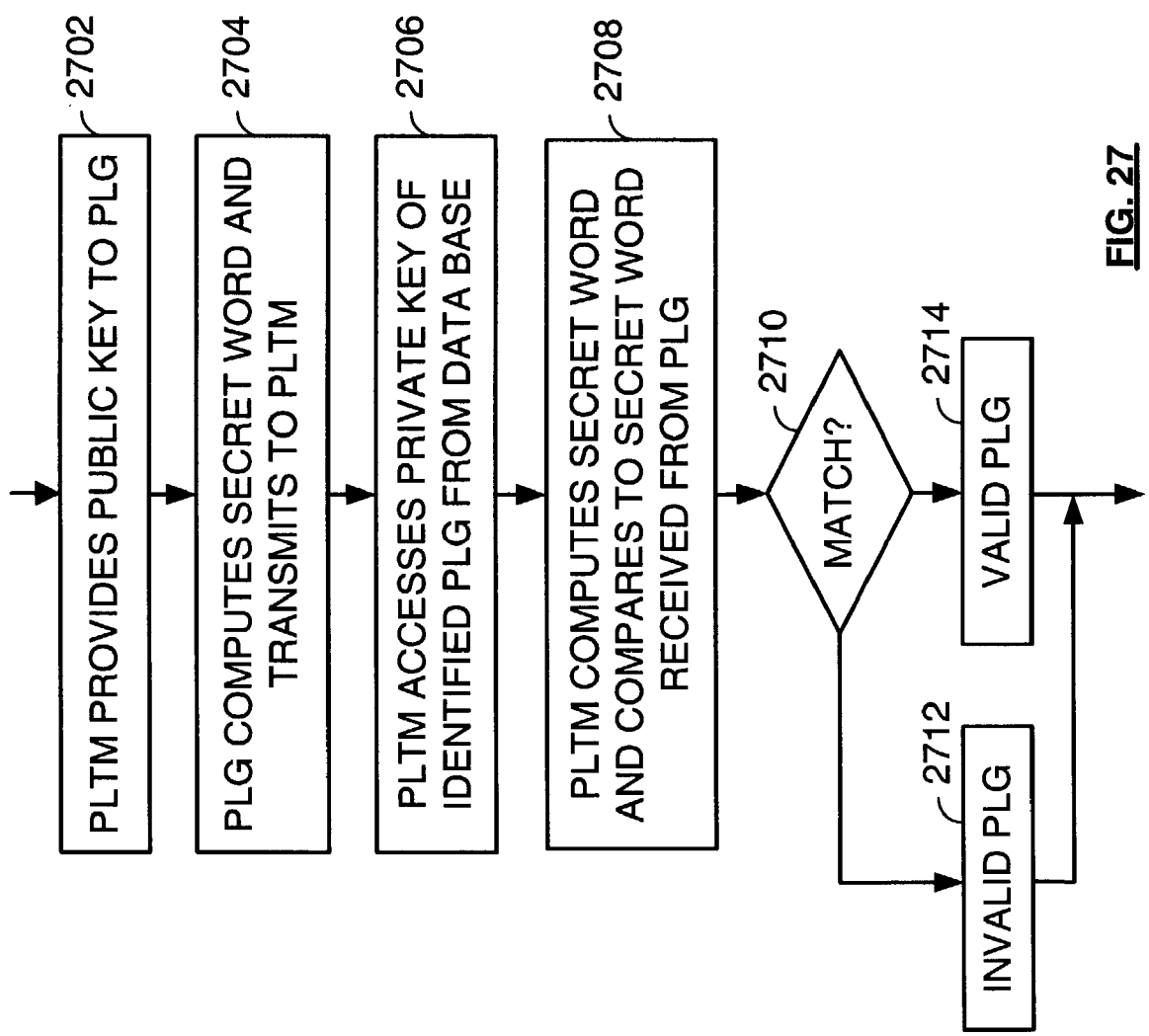
FIG. 27 is a logic diagram illustrating one manner for power line gateway authentication according to the present invention.

FIG. 27 is a logic diagram illustrating one manner for power line gateway authentication according to the present invention. The operation of FIG. 27 may occur at initial registration of the power line gateway, periodically to ensure that the power line gateway is operating correctly, when the power line gateway requests a change in service, during parameter or subscription profile updating of the power line gateway, or during another operation that requires validation as a preface.

As a first operation, the power line termination module provides a public key to the power line gateway (step 2702). The power line gateway then computes a secret word based upon a locally stored private key and the public key provided by the power line termination module. Upon completion of computation of the secret word, the power line gateway transmits the secret word to the power line termination module (step 2704). During this time, the power line termination module accesses a stored private key of the power line gateway from a database such as the CMS 2390 (step 2706). The power line termination module then computes another copy of the secret word based upon the public key and the retrieved private key. The power line termination module then compares the secret word received from the power line gateway with the locally determined secret word (step 2708). If the secret words match, as determined at step 2710, the power line gateway is validated (step 2714). However, if the secret words do not match, as determined at step 2710, the power line gateway is deemed to be invalid (step 2712) and no service is provided to the power line gateway.

Figure 28:
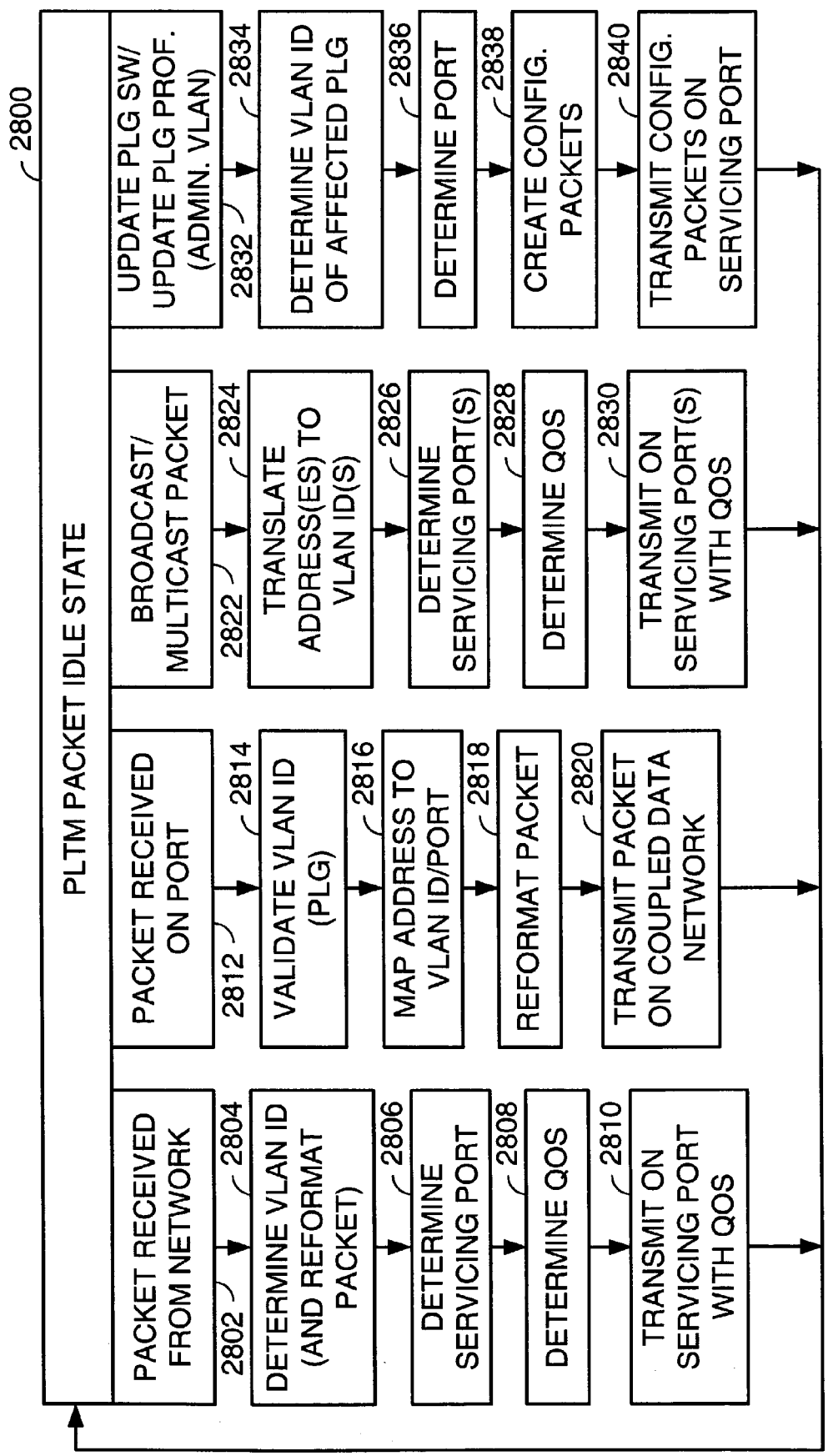
FIG. 28 is a logic diagram illustrating various operations of the power line termination module according to the present invention.

FIG. 28 is a logic diagram illustrating various operations of the power line termination module according to the present invention. The operations described with reference to FIG. 28 are a subset of the complete set of operations that are performed by the power line termination module. Additional operations are also performed by the power line termination module but not described with reference to FIG. 28. At step 2800 the power line termination module remains idle with respect to data packet processing for the power line gateways.

At step 2802, the power line termination module receives a data packet (or voice packet) from the coupled data network that is intended for a serviced power line gateway. Upon receipt of the data packet, the power line termination module determines a VLAN ID based upon an IP address (or MAC address) contained in the data packet and reformats the data packet to include the VLAN ID (step 2804). Then, based upon the IP address (or MAC address) of the data packet, the power line termination module determines a servicing port (step 2806). Further, the power line termination module determines a QoS to be employed for transmission of the data packet (step 2808). Then, based upon the QoS, the power line termination module transmits the data packet on the servicing port (step 2810). Because transmissions intended for a plurality of power line gateways serviced by the port may be competing for capacity of the port, the QoS for each data packet will determine when the data packet will be transmitted from the port of the power line termination module. From step 2810, operation returns to step 2802.

In another operation from step 2802, the power line termination module receives a data packet (or voice packet) on a particular port (step 2812). Upon receipt of this data packet, based upon the VLAN ID of the data packet, the power line termination module validates whether the transmitting power line gateway (based upon the VLAN ID) has access to the services provided by the power line termination module (step 2814). Such validation may require the lookup within a VLAN ID table. Then, based upon the VLAN ID associated with the data packet and the IP address (or MAC address) contained in the data packet, the power line termination module creates an entry in a routing table that associates the IP address (or MAC address) with the VLAN ID and the servicing port (step 2816). Next, the power line termination module reformats the data packet if required (step 2818). For example, reformatting will remove the VLAN ID from the data packet and may include other formatting operations. Then, the data packet is transmitted on the coupled data network (step 2820). From step 2820 operation proceeds again to step 2802.

According to the present invention, the VLAN functionality is also used for broadcast and multicast operations. Broadcast and multicast operations are performed when multiple power line gateways receive a television program, for example, such as a pay-per-view program or premium channels. In such case, the power line termination module receives a broadcast or multicast data packet (step 2822). The power line termination module then translates the IP address contained in the broadcast/multicast data packet to VLAN ID(s) and port ID(s) for each power line gateway port that will receive the broadcast/multicast data packet (step 2824). The power line termination module then determines at least one servicing port upon which to broadcast/multicast a data packet (step 2826). The power line termination module then determines a QoS required for the broadcast/multicast data packet (step 2828). Then, based upon the QoS, the power line termination module transmits the broadcast/multicast data packet on at least one servicing port (step 2830). From step 2830 operation returns to step 2802.

During another operation according to the present invention, the power line termination module updates power line gateway software in/or updates a power line gateway profile (step 2832). In such operations, the power line termination module determines the VLAN ID of the effected power line gateway (step 2834). The power line termination module will then determine the port that services the power line gateway (step 2836). Then, based upon the software update or profile update, the power line termination module will create data packets that will initiate the update (step 2838).

Finally, the power line termination module will transmit the data packets to the power line gateway on a servicing port (step 2840).

Figure 29:
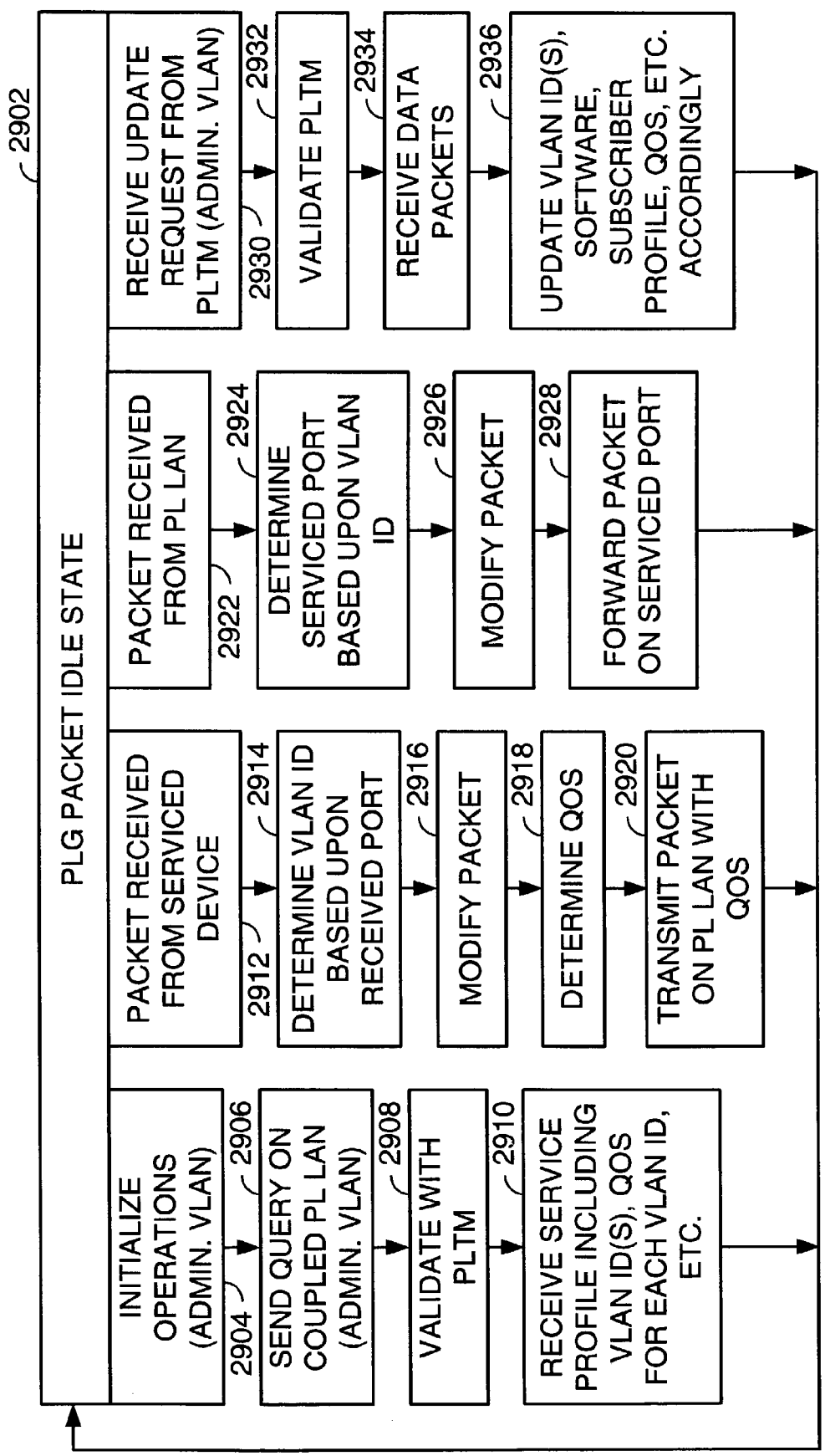
FIG. 29 is a logic diagram illustrating various operations of a power line gateway according to the present invention.

FIG. 29 is a logic diagram illustrating power line gateway operations according to the present invention. After powering up and provisioning, the power line gateway remains in a data packet idle state (step 2902). However, provisioning operations are initially required and are also required when the power line gateway loses its provisioned information (step 2904). In these provisioning operations, the power line gateway first sends a query on a coupled power line LAN that is intended for a servicing power line termination module (step 2906). In one operation according to the present invention, the queries are transmitted on an Administrative VLAN. In response to the configuration queries, the power line termination module validates the power line gateway based upon input from the CMS 2390 (step 2908). One set of validation operations was described with reference to FIG. 27. Then, with validation complete, the power line gateway receives service profile information from the power line termination module (step 2910). This service profile information will include at least one VLAN ID that has been assigned to the power line gateway, quality of service information for each VLAN ID, and additional information as may be required. From step 2910, operation proceeds to step 2902. The operations of steps 2904–2910 are similar to the operations described with reference to FIG. 26.

At step 2912, the power line gateway receives a data packet from a service device, e.g., computer, telephone, set top box, etc. The power line gateway, upon receipt of the data packet, determines a VLAN ID based upon the port on which the data packet was received (step 2914). Then, the power line gateway modifies the data packet to include the VLAN ID (step 2916), determines a QoS for the data packet (step 2918), and accesses the power line LAN to transmit the data packet with the appropriate QoS (step 2920). From step 2920, operation returns to step 2902.

In servicing data communications, the power line gateway receives data packets from the power line LAN (step 2922). Upon receipt of a data packet from the power line LAN, based upon a VLAN ID of the data packet, the power line gateway determines a corresponding port (step 2924). Then, the power line gateway modifies the data packet to remove the VLAN ID (step 2926) and transmits the data packet to a serviced device on the corresponding port (step 2928). From step 2928, operation returns to step 2902.

In another operation according to the present invention, the power line termination module updates the service profile and/or updates the software of the power line gateway. In such case, the power line gateway receives an update request from the power line termination module (step 2930). Upon receipt of this update request, the power line gateway validates the power line termination module (step 2932). Validation of the power line termination module by the power line gateway is preferable in this situation to preclude the invalid tampering with the power line gateway. After the power line termination module has been validated by the power line gateway, the power line gateway receives data packets from the power line termination module that will be used to update the power line gateway (step 2934). Then, based upon these data packets, the power line gateway updates its VLAN IDs, software, subscriber profile, QoS, etc., according to the information contained in the data packets (step 2936). From step 2936, operation proceeds to step 2902.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for operating a last leg utility grid high-speed data communication network to provide high-speed data communication service to a number of power line gateways, the method comprising:

segregating the number of power line gateways serviced by the last leg utility grid high-speed data communication network into a plurality of groups of power line gateways, wherein each group of power line gateways of the plurality of groups of power line gateways receives high-speed data communication service via a respective utility grid segment;

for each group of power line gateways of the plurality of groups of power line gateways, servicing the group of power line gateways with a respective port of a power line termination module;

for each power line gateway of each group of power line gateways of the plurality of groups of power line gateways, establishing a Virtual Local Area Network (VLAN) between the power line gateway and a respective port of the power line termination module; and for each data packet received at the power line termination module that is intended for a serviced power line gateway:

determining a servicing port of the power line termination module for the serviced power line gateway;

determining a VLAN identifier for the serviced power line gateway;

formatting the data packet for transmission to the serviced power line gateway to include the VLAN identifier; and transmitting the data packet to the serviced power line gateway via the servicing port.

2. The method of claim 1, wherein:

the power line termination module includes a plurality of ports;

the power line termination module supports a number of VLANs at each of the plurality of ports;

for each port of the plurality of ports, each VLAN of the number of VLANs supported by the port corresponds to a respective power line gateway; and a first VLAN serviced by a first port of the plurality of ports and a second VLAN serviced by a second port of the plurality of ports have the same VLAN identifier.

3. The method of claim 1, wherein:

the power line termination module includes a plurality of ports;

and each of the plurality of ports of the power line termination module services a VLAN domain.

4. The method of claim 3, wherein VLAN domains corresponding to the plurality of ports of the power line termination module are reused so that the same VLAN identifier is used at multiple ports of the plurality of ports of the power line termination module.

5. The method of claim 1, further comprising using VLAN overlays to service broadcast and multi-cast high-speed data communications to a plurality of power line gateways serviced on a single port of the power line termination module.

6. The method of claim 1, further comprising:
determining a Quality of Service (QoS) level for each VLAN serviced at each port of the power line gateway; and
supporting an assigned QoS level at each port of the power line gateway for each VLAN.

7. The method of claim 6, further comprising:
programming at least one power line gateway with an assigned QoS level; and
the power line gateway limiting access to the last leg utility grid high-speed data communication network based upon the QoS level.

8. The method of claim 1, wherein:
at least one power line gateway is assigned to a plurality of VLANs; and
each of the plurality of VLANs corresponds to service to which a corresponding subscriber receives.

9. The method of claim 1, further comprising:
receiving a first data packet from a power line gateway;
determining a subscriber address from the first data packet;
associating the subscriber address with a VLAN identifier for the power line gateway;
receiving a second data packet intended for the power line gateway that includes the subscriber address;
based upon the subscriber address, determining a VLAN identifier of a power line gateway and a servicing port of a power line termination module corresponding to the subscriber address;
formatting the data packet for transmission to the power line gateway to include the VLAN identifier; and
transmitting the data packet to the power line gateway via the servicing port of the power line termination module.

10. The method of claim 9, wherein the address contained in the data packet is an Internet Protocol (IP) address.

11. The method of claim 9, wherein the address contained in the data packet is a Medium Access Control (MAC) address.

12. The method of claim 1, further comprising downloading software upgrades to at least some of the number of power line gateways.

13. The method of claim 1, further comprising validating the identity of a power line gateway of the number of power line gateways using:
a private key stored in the power line gateway; and
a public key stored in the power line termination module.

14. The method of claim 1, further comprising automatically configuring, by the power line termination module, at least some of the number of power line gateways.

15. The method of claim 1, further comprising:
establishing a configuration VLAN that is not accessible by subscribers of the number of power line gateways;
receiving a service request at the power line termination module from a power line gateway via the configuration VLAN; and
provisioning, by the power line termination module, the power line gateway via the configuration VLAN.

16. The method of claim 15, further comprising updating software of the power line gateway via the configuration VLAN.

17. The method of claim 15, further comprising updating a service profile of the power line gateway via the configuration LAN.

18. The method of claim 1, wherein:
the last leg utility grid high-speed data communication network is a multiple access network; and
the VLAN identifiers provide privacy for a group of power line gateways sharing a port of the power line termination module and a respective utility grid segment.

19. A system for servicing high-speed data communications to a number of power line gateways over a last leg utility grid high-speed data communication network, the system comprising:
a plurality of power line nodes, wherein each power line node of the plurality of power line nodes communicatively couples to at least one respective utility grid segment and services a respective group of power line gateways coupled to the at least one respective utility grid segment; and
a power line termination module communicatively coupled to the plurality of power line nodes comprising:
a high speed interface that communicatively couples to a high-speed data network;
a port interface having a plurality of ports, wherein each port of the plurality of ports communicatively couples to at least one respective power line node and services a respective plurality of power line gateways; and
a processor that executes software instructions that cause the power line termination module to:
establish a Virtual Local Area Network (VLAN) domain for each of the plurality of ports;
for each port of the plurality of ports, assign a unique VLAN identifier to each power line gateway serviced by the port;
receive a first data packet from a power line gateway;
determine a subscriber address from the first data packet;
associate the subscriber address with a VLAN identifier for the power line gateway;
receive a second data packet intended for the power line gateway that includes the subscriber address;
based upon the subscriber address, determine a VLAN identifier of a power line gateway and a servicing port of the power line termination module corresponding to the subscriber address;
format the data packet for transmission to the power line gateway to include the VLAN identifier; and
transmit the data packet to the power line gateway via the servicing port of the power line termination module.

20. The system of claim 19, wherein VLAN domains corresponding to the plurality of ports of the power line termination module are reused so that the same VLAN identifier is used at multiple ports of the plurality of ports of the power line termination module.

21. The system of claim 19, wherein the power line termination module uses VLAN overlays to service broadcast and multi-cast high-speed data communications to a plurality of power line gateways serviced on a single port of the power line termination module.

22. The system of claim 19, wherein the address contained in the data packet is an Internet Protocol (IP) address.

23. The system of claim 19, wherein the address contained in the data packet is a Medium Access Control (MAC) address.

24. The system of claim 19, wherein the processor further executes software instructions that causes the power line termination module to:
  assign a Quality of Service (QoS) level for each VLAN at each port of the power line gateway; and
  support an assigned QoS level at each port of the power line gateway for each VLAN.

25. The system of claim 24, wherein the processor further executes software instructions that causes the power line termination module to program at least one power line gateway with an assigned QoS level such that the power line gateway limits access to the last leg utility grid high-speed data communication network based upon the QoS level.

26. The system of claim 19, wherein the processor further executes software instructions that causes the power line termination module to download a software upgrade to a serviced power line gateway.

27. The system of claim 19, wherein the processor further executes software instructions that causes the power line termination module to automatically configure a serviced power line gateway.

28. A power line node for use in a last leg utility grid high-speed data communication network, the power line node comprising:
  a Virtual Local Area Network (VLAN) data packet switch having a plurality of ports;
  a power line Local Area Network (LAN) interface communicatively coupled on a first side to a first port of the plurality of ports of the VLAN data packet switch and communicatively coupled on a second side to a respective utility grid segment of the last leg utility grid high-speed data communication network;
  a power line termination module interface communicatively coupled on a first side to a second port of the plurality of ports of the VLAN data packet switch and communicatively coupled on a second side to a servicing power line termination module;
  a processor communicatively coupled to a third port of the plurality of ports of the VLAN data packet switch, wherein the processor executes a plurality of instructions that causes the power line node to:
  establish communications via the first port with at least one serviced power line gateway; and
  establish communications via the second port with the servicing power line termination module.

29. The power line node of claim 28, wherein the processor executes a plurality of instructions that causes the power line node to establish a VLAN between the servicing power line termination module and a serviced power line gateway.

30. The power line node of claim 28, wherein the processor executes a plurality of instructions that causes the power line node to interface with the power line termination module and a serviced power line gateway using an administrative VLAN.

31. A power line gateway for use in a last leg utility grid high-speed data communication network, the power line gateway comprising:
  a Virtual Local Area Network (VLAN) data packet switch having a plurality of ports;
  a power line Local Area Network (LAN) interface communicatively coupled on a first side to a first port of the plurality of ports of the VLAN data packet switch and communicatively coupled on a second side to a servicing utility grid segment of the last leg utility grid high-speed data communication network;
  a device interface communicatively coupled on a first side to a second port of the plurality of ports of the VLAN data packet switch and communicatively coupled on a second side to a serviced device; and
  a processor communicatively coupled to a third port of the plurality of ports of the VLAN data packet switch, wherein the processor executes a plurality of instructions that causes the power line gateway to establish communication via the servicing utility grid segment of the last leg utility grid high-speed data communication network with a servicing power line node and a servicing power line termination module.

32. The power line gateway of claim 31, wherein the processor executes a plurality of instructions that causes the power line gateway to establish a VLAN between the first port and a servicing power line termination module.

33. The power line gateway of claim 31, wherein the processor executes a plurality of instructions that causes the power line gateway to interface with the power line termination module via an administrative VLAN.

* * * * *